(12) United States Patent
Yang et al.

(10) Patent No.: US 10,882,925 B2
(45) Date of Patent: Jan. 5, 2021

(54) CATALYSTS THAT PRODUCE POLYETHYLENE WITH BROAD, BIMODAL MOLECULAR WEIGHT DISTRIBUTION

(71) Applicant: ExxonMobil Chemical Patents Inc., Baytown, TX (US)

(72) Inventors: Jian Yang, Houston, TX (US); Gregory J. Karahalis, Houston, TX (US); John R. Hagadorn, Houston, TX (US); Timothy M. Boller, Houston, TX (US); Evan J. Morris, Houston, TX (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 148 days.

(21) Appl. No.: 16/192,654

(22) Filed: Nov. 15, 2018

(65) Prior Publication Data

US 2019/0161561 A1 May 30, 2019

Related U.S. Application Data

(60) Provisional application No. 62/592,228, filed on Nov. 29, 2017.

(51) Int. Cl.
*C07F 17/00* (2006.01)
*C08F 4/6592* (2006.01)
(Continued)

(52) U.S. Cl.
CPC .......... *C08F 4/65927* (2013.01); *B32B 27/08* (2013.01); *C07F 17/00* (2013.01);
(Continued)

(58) Field of Classification Search
CPC ...... C07F 17/00; C08F 4/65927; C08F 21/16; C08F 210/16
See application file for complete search history.

(56) References Cited

U.S. PATENT DOCUMENTS

| 5,447,895 A | 9/1995 | Marks et al. |
| 5,892,081 A | 4/1999 | Suling et al. ................... 556/28 |

(Continued)

FOREIGN PATENT DOCUMENTS

| CN | 103641862 | 6/2016 |
| EP | 0849273 | 5/2003 |

(Continued)

OTHER PUBLICATIONS

U.S. Appl. No. 62/592,217, filed Nov. 29, 2017.

(Continued)

*Primary Examiner* — Caixia Lu
(74) *Attorney, Agent, or Firm* — Catherine L. Bell

(57) ABSTRACT

The present disclosure relates to ansa-metallocene catalyst compounds that include (1) a first indenyl ligand substituted at the 3-position with a substituted or unsubstituted $C_4$-$C_{40}$ hydrocarbyl group, wherein the hydrocarbyl group is branched at the β-position, and (2) a second indenyl ligand substituted at its 3-position with a substituted or unsubstituted alkyl group or a β-branched alkyl group. Catalyst systems prepared with the catalyst compounds, polymerization methods using such catalyst systems, and polyolefins made using the polymerization methods are also described.

41 Claims, 7 Drawing Sheets

(51) Int. Cl.

| | | |
|---|---|---|
| *C08F 210/16* | (2006.01) | |
| *C08F 4/659* | (2006.01) | |
| *C08F 10/02* | (2006.01) | |
| *C08J 5/18* | (2006.01) | |
| *B32B 27/08* | (2006.01) | |
| *C08F 2/34* | (2006.01) | |

(52) U.S. Cl.
CPC ...... *C08F 4/65912* (2013.01); *C08F 4/65916* (2013.01); *C08F 10/02* (2013.01); *C08F 210/16* (2013.01); *C08J 5/18* (2013.01); *C08F 2/34* (2013.01); *C08F 2500/01* (2013.01); *C08F 2500/04* (2013.01); *C08F 2500/05* (2013.01); *C08F 2500/08* (2013.01); *C08J 2323/08* (2013.01)

(56) References Cited

U.S. PATENT DOCUMENTS

| | | |
|---|---|---|
| 5,914,289 A | 6/1999 | Razavi |
| 6,136,936 A | 10/2000 | Dall et al. |
| 6,225,428 B1 | 5/2001 | Razavi |
| 6,569,965 B2 | 5/2003 | Markel et al. |
| 6,573,350 B1 | 6/2003 | Markel et al. |
| 6,664,351 B1 | 12/2003 | Dall et al. |
| 7,026,494 B1 | 4/2006 | Yang et al. |
| 7,297,653 B2 | 11/2007 | Rodriguez |
| 7,799,879 B2 | 9/2010 | Crowther et al. |
| 8,288,487 B2 | 10/2012 | Yang et al. |
| 8,324,126 B2 | 12/2012 | Miranda et al. |
| 8,404,880 B2 | 3/2013 | Kaji et al. |
| 8,598,061 B2 | 12/2013 | Yang et al. |
| 8,609,793 B2 | 12/2013 | Buck et al. |
| 8,637,616 B2 | 1/2014 | Buck et al. |
| 8,865,846 B2 | 10/2014 | Ding et al. |
| 8,933,256 B2 | 1/2015 | Castro et al. |
| 8,975,209 B2 | 3/2015 | Kaji et al. |
| 9,040,642 B2 | 5/2015 | Buck et al. |
| 9,040,643 B2 | 5/2015 | Buck et al. |
| 9,102,821 B2 | 8/2015 | Yang et al. |
| 9,273,159 B2 | 3/2016 | Ding et al. |
| 9,340,630 B2 | 5/2016 | Kaji et al. |
| 2006/0142147 A1 | 6/2006 | Royo et al. |
| 2010/0261860 A1 | 10/2010 | Schulte et al. |
| 2015/0065668 A1 | 3/2015 | Alliger |
| 2016/0347893 A1 | 12/2016 | Kolb et al. |
| 2017/0320972 A1 | 11/2017 | O'Hare et al. |

FOREIGN PATENT DOCUMENTS

| | | |
|---|---|---|
| EP | 2003166 | 12/2008 |
| EP | 3252064 | 12/2017 |
| WO | 99/54369 | 10/1999 |
| WO | 2013/151863 | 10/2013 |
| WO | 2016/171807 | 10/2016 |
| WO | 2016/171809 | 10/2016 |
| WO | 2016/172099 | 10/2016 |
| WO | 2016/094843 | 11/2016 |
| WO | 2016/195424 | 12/2016 |
| WO | 2016/196331 | 12/2016 |
| WO | 2017/010648 | 1/2017 |
| WO | 2018/067259 | 4/2018 |

OTHER PUBLICATIONS

Balboni et al., C2_Symmetric Zirconocenes for High Molecular Weight Amorphous Poly(propylene), Macromolecular Chemistry and Physics, 2001, vol. 202, No. 10, pp. 2010-2028.

Araneda et al., Inorganica Chimica Acta, 2005, vol. 434, pp. 121-126.

Perez-Camacho et al., "Si2Me4-bridged zirconocene dichlorides: crystal and molecular structure of meso-Si2Me4(3-SiMe3—C9H5)2ZrCl2," Journal of Organometallic Chemistry, 1999, vol. 585, No. 1, pp. 18-25.

Ryabov et al., "Palladium-Catalyzed Cross-Coupling Reactions of Bromo-Substituted Group 4 Metallocenes," Organometallics, 2009, vol. 28, No. 13, pp. 3614-3617.

U.S. Appl. No. 15/852,410, filed Dec. 22, 2017.

Bongini et al., "A Hetero Diels-Alder Concerted vs. Aidol Stepwise Mechanism in the Cyclization of Silyloxyazadienes with Aldehydes: A Theoretical Study," European Journal of Inorganic Chemistry, 2006, pp. 972-977.

U.S. Appl. No. 62/577,046, filed Oct. 25, 2017.

Puranen et al., "Rotating Benzyl Substituent in ansa-Bis(indenyl)zirconocenes Controls Propene Polymerization," Organometallics, 2010, vol. 29, No. 18, pp. 4018-4024.

Alonso-Moreno et al, "Synthesis, Characterization, and Catalytic Properties of ansa-Zirconocenes [Zr{1-Me2Si(3-[eta]5-C9H5R)2}Cl2] (R=Me, nPr, NBu, and Bz)," European Journal of Inorganic Chemistry, 2006, vol. 2006, No. 5, pp. 972-979.

CATALYSTS THAT PRODUCE POLYETHYLENE WITH BROAD, BIMODAL MOLECULAR WEIGHT DISTRIBUTION

PRIORITY CLAIM

This application claims priority to and the benefit of U.S. Ser. No. 62/592,228, filed Nov. 29, 2017 and is incorporated herein by reference in its entirety.

FIELD OF THE INVENTION

The present disclosure relates to ansa-metallocene catalyst compounds, to catalyst systems comprising such compounds, and to uses thereof.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Catalysts for olefin polymerization typically have transition metals. For example, some catalysts are ansa-metallocenes, i.e., "bridged" metallocenes that can be activated by alumoxane or an activator containing a non-coordinating anion. Using these catalysts and catalyst systems, polymerization conditions can be adjusted to provide polyolefins having desired properties. There is interest in finding new metallocene catalysts and catalyst systems that provide polymers having specific properties, including high molecular weights, increased conversion or comonomer incorporation, good processability, and uniform comonomer distribution. In particular, there is a need for catalyst systems capable of producing polyolefins, including linear low density polyethylene, having a broad and/or bimodal molecular weight distribution and an improved balance of processability and toughness.

Some metallocene catalyst systems, sometimes referred to as "dual" catalyst systems, utilize a combination of two different metallocene catalyst compounds to produce polyethylene having a broad and/or bimodal MWD. For example, U.S. Pat. Nos. 8,865,846 and 9,273,159 describe dual catalyst systems for producing broad molecular weight distribution polymers. The polymerization processes disclosed therein are said to be for the production of olefin polymers and the disclosed processes can use a dual catalyst system containing a zirconium or hafnium-based metallocene compound and a titanium-based half-metallocene compound containing an indenyl group.

It may be desirable, however, to produce polyolefins, including linear low density polyethylene having a broad and/or bimodal molecular weight distribution, with a catalyst system that utilizes a single catalyst compound, i.e., a catalyst compound corresponding to a single structural formula (although such a catalyst compound may comprise and be used as a mixture of isomers, e.g., stereoisomers). For example, U.S. Pat. Nos. 6,136,936 and 6,664,351 disclose ethylene copolymers with a wide molecular weight distribution and a process and catalyst system for preparing them. Linear low density polyethylene copolymers having a uniform distribution of comonomer units along the polymer chain and a broad molecular weight distribution are said to be achievable by carrying out the polymerization reaction in the presence of a catalyst consisting of a mixture of the racemic and meso isomers of a stereorigid metallocene compound. Examples utilizing mixtures of rac/meso-ethylene-bis(4,7-dimethyl-1-indenyl)zirconium dichloride are shown to produce ethylene/1-olefin copolymers having densities from 0.9062 to 0.9276 g/ml and Mw/Mn values from 3.7 to 8.1. Comparative examples utilizing rac-ethylene-bis (4,7-dimethyl-1-indenyl)zirconium dichloride were shown to produce copolymers having densities of 0.9055 and 0.9112 g/ml and Mw/Mn values of 2.3 and 2.9.

U.S. Pat. Nos. 5,914,289 and 6,225,428 disclose the production of high density polyethylene homopolymers or copolymers having a broad and monomodal molecular weight distribution. The disclosed polymerization process is said to be conducted in the presence of supported metallocene-alumoxane catalysts wherein the metallocene consists of a particular bridged meso or racemic stereoisomer, preferably the racemic stereoisomers. The metallocenes used are said to comprise at least a hydrogenated indenyl or fluorenyl that it is isolated on its support under the form of all its conformers. Examples utilizing ethylenebis(4,5,6,7-tetrahydro-1-indenyl) zirconium dichloride or ethylenebis(indenyl) zirconium dichloride are shown to produce polymers having MWD values of 7.4 and 6.3.

US 2006/0142147 discloses a series of bridged indenyl metallocenes substituted at the 3 position, a catalyst system containing the bridged indenyl metallocenes, and a polymerization process using such catalyst system. Polyethylene copolymers made with the catalysts are said to have narrow to broad bimodal molecular weight distributions depending on proper selection of the indenyl substituent, the number of substituents, and the type of stereoisomeric form used: pure (racemic or meso) or mixtures thereof. Examples utilizing the catalysts are shown to produce copolymers having Mw/Mn values of from 1.87 to 21.7.

Controlling the type and location of substitution on ansa-metallocene compounds so as to potentially control the properties of the polyolefins prepared with the metallocene is of interest. Synthetic routes to substituted metallocene catalysts are known. For example, Balboni, et al., in Macromolecular Chemistry and Physics, 2001, 202, pp. 2010-2028, disclose synthetic routes to $C_2$-symmetric ansa-zirconocene catalysts having 3-isopropyl substituents on the indenyl rings. In WO 2017/010648 metallocene catalyst compounds based on substituted bis(indenyl) zirconium chloride compounds having branched and/or unbranched alkyl groups at various positions on the indenyl rings are disclosed (see, e.g., formula 33 of claim 14 on page 51).

Additional references of interest include: CN 103641862A; EP 0849273; EP 2003166; U.S. Pat. Nos. 5,447,895; 6,569,965; 6,573,350; 7,026,494; 7,297,653; 7,799,879; 8,288,487; 8,324,126; 8,404,880; 8,598,061; 8,609,793; 8,637,616; 8,975,209; 9,040,642; 9,040,643; 9,102,821; 9,340,630; US 2012/0088890; US 2014/0057777; US 2014/0107301; WO 2013/151863; WO 2016/094843; WO 2016/171807; WO 2016/171809; WO 2016/172099; WO 2016/195424; WO 2016/196331; Araneda, et al., Inorganica Chimica Acta, 2005, 434, pp. 121-126; Perez-Camacho, et al., Journal of Organometallic Chemistry, 1999, Vol. 585, pp. 18-25; and Ryabov, et al., Organometallics, 2009, Vol. 28, pp. 3614-3617.

This invention also relates to commonly owned co-pending application U.S. Ser. No. 62/446,007 filed on Jan. 13, 2017, 62/404,506 filed Oct. 5, 2016, and U.S. Ser. No. 62/592,217 filed on Nov. 29, 2017.

There is still a need for new catalyst systems that utilize a single catalyst compound and produce polyolefins having a broad and/or bimodal molecular weight distribution (MWD). Such catalyst compounds and catalyst systems utilizing them, and processes for the polymerization of olefins using such compounds and systems, are disclosed herein.

SUMMARY OF THE INVENTION

The present disclosure relates to ansa-metallocene catalyst compounds represented by Formula (I):

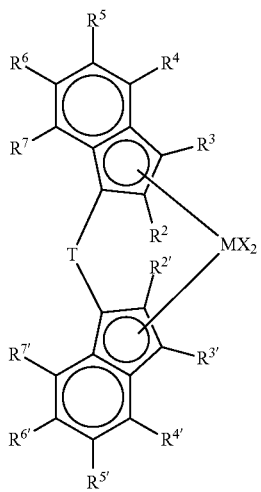

(I)

where M is a group 4 metal,
$R^3$ is a substituted or unsubstituted $C_4$-$C_{40}$ hydrocarbyl group, wherein the $C_4$-$C_{40}$ hydrocarbyl group is branched at the β-position,
$R^{3'}$ is either (1) methyl, ethyl, or a $C_3$-$C_{40}$ group having the formula —$CH_2CH_2R$ where R is an alkyl, aryl, or silyl group, or (2) a β-branched alkyl group represented by Formula (II):

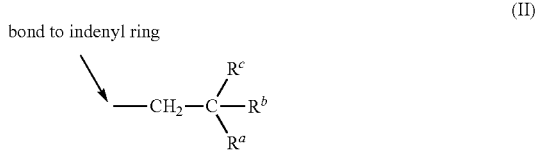

(II)

wherein each $R^a$, $R^b$, and $R^c$ is, independently, hydrogen, a $C_1$ to $C_{20}$ alkyl group, or a phenyl group, and each $R^a$, $R^b$, and $R^c$ is different from any other $R^a$, $R^b$, and $R^c$ such that the catalyst compound has a chiral center on the β-carbon of $R^{3'}$,
each of $R^2$, $R^4$, $R^5$, $R^6$, $R^7$, $R^{2'}$, $R^{4'}$, $R^{5'}$, $R^{6'}$, and $R^{7'}$ is independently hydrogen or a $C_1$-$C_{40}$ substituted or unsubstituted hydrocarbyl, halocarbyl, silylcarbyl, alkoxyl, halogen, or siloxyl, and one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring,
T is a bridging group, and
each X is independently a halide or $C_1$-$C_{50}$ substituted or unsubstituted hydrocarbyl, hydride, amide, alkoxide, sulfide, phosphide, halide, or a combination thereof, or two of X are joined together to form a metallocycle ring, or two of X are joined to form a chelating ligand, a diene ligand, or an alkylidene.

In yet another aspect, embodiments of the present disclosure provide a catalyst system comprising an activator and a catalyst compound of the present disclosure.

In still another aspect, embodiments of the present disclosure provide a polymerization process comprising a) contacting one or more olefin monomers with a catalyst system comprising: i) an activator and ii) a catalyst compound of the present disclosure.

DEFINITIONS AND CONVENTIONS

Figure 1:
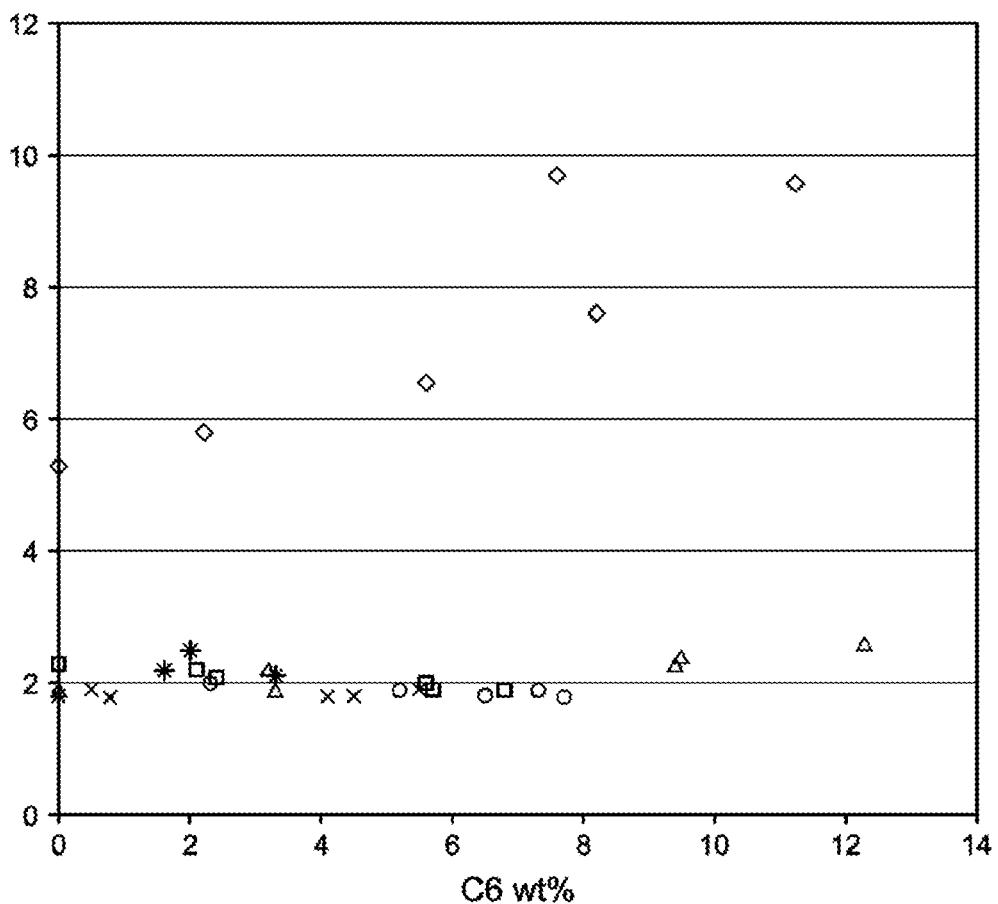
FIG. 1 is a plot of polydispersity index versus 1-hexene incorporation for polyethylenes prepared with the catalyst systems of Example 1 and comparative Examples 2-6.

For the purposes of this disclosure and the claims herein, the definitions and conventions below shall apply.

The numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Ti, Zr, and Hf.

"Catalyst activity" is a measure of how many grams of polymer (P) are produced using a polymerization catalyst comprising W g of catalyst (cat), over a period of time of T hours; and may be expressed by the following formula: P/(T×W) and expressed in units of gP·gcat$^{-1}$hr$^{-1}$.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 weight % to 55 weight % (i.e., 35 weight % to 55 weight %), it is understood that the mer unit in the copolymer is derived from ethylene in the polymerization reaction and said derived units are present at 35 weight % to 55 weight %, based upon the weight of the copolymer.

A "polymer" has two or more of the same or different mer units. A "homopolymer" is a polymer having mer units that are the same. A "copolymer" is a polymer having two or more mer units that are different from each other.

As used herein, Mn is number average molecular weight, Mw is weight average molecular weight, and Mz is z average molecular weight, wt % is weight percent, and mol % is mole percent. Molecular weight distribution (MWD), also referred to as polydispersity or polydispersity index (PDI), is defined to be Mw divided by Mn. Unless otherwise noted, all molecular weight units (e.g., Mw, Mn, Mz) are g/mol.

The following abbreviations may be used herein: Me is methyl, Et is ethyl, Pr is propyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

In chemical or structural formulas, when an "R" group, such as $R^x$, $R^y$, $R^z$, $R^a$, $R^4$, $R^4$ or the like is said to be "hydrogen," it will be understood as a reference to the —H group rather than elemental hydrogen ($H_2$).

A "catalyst system" is a combination of at least one catalyst compound, at least one activator, an optional co-activator, and an optional support material. When catalyst systems are described as comprising neutral stable forms of the components, it will be understood that the ionic form of the component is the form that reacts with the monomers to produce polymers.

An "anionic ligand" is a negatively charged ligand that donates one or more pairs of electrons to a metal ion. A "neutral donor ligand" is a neutrally charged ligand which donates one or more pairs of electrons to a metal ion.

Except with respect to the term "substituted hydrocarbyl," the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. As examples, methyl cyclopentadiene (Cp) is a Cp group substituted with a methyl group, and ethyl alcohol is an ethyl group substituted with an —OH group. The term "substituted hydrocarbyl" means hydrocarbyl radicals in which at least one hydrogen atom of the hydrocarbyl radical has been substituted with at least one non-hydrogen group, such as another hydrocarbyl group (e.g., phenyl), which may impart a branch to the hydrocarbyl group, or substituted with a heteroatom or heteroatom-containing group, such as halogen (e.g., Br, Cl, F or I), or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, and the like, or where at least one heteroatom has been inserted within a hydrocarbyl ring.

The terms "group," "radical," and "substituent" may be used interchangeably.

The term "hydrocarbyl" is defined to be a $C_1$-$C_{100}$ radical that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues.

The term "single catalyst compound" refers to a catalyst compound corresponding to a single structural formula, although such a catalyst compound may comprise and be used as a mixture of isomers, e.g., stereoisomers.

A catalyst system that utilizes a single catalyst compound means a catalyst system that is prepared using only a single catalyst compound in the preparation of the catalyst system. Thus, such a catalyst system is distinguished from, for example, "dual" catalyst systems, which are prepared using two catalyst compounds having different structural formulas, i.e., the connectivity between the atoms, the number of atoms, and/or the type of atoms in the two catalyst compounds is different. Thus, one catalyst compound is considered different from another if it differs by at least one atom, either by number, type, or connection. For example, "bis-indenyl zirconium dichloride" is different from "(indenyl) (2-methylindenyl) zirconium dichloride" which is different from "(indenyl)(2-methylindenyl) hafnium dichloride." Catalyst compounds that differ only in that they are stereoisomers of each other are not considered to be different catalyst compounds. For example, rac-dimethylsilylbis(2-methyl 4-phenyl)hafnium dimethyl and meso-dimethylsilylbis(2-methyl 4-phenyl)hafnium dimethyl are considered to be not different.

The terms "cocatalyst" and "activator" are used herein interchangeably and are defined to be any compound which can activate any one of the catalyst compounds described above by converting the neutral catalyst compound to a catalytically active catalyst compound cation.

Noncoordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. The term non-coordinating anion activator includes neutral activators, ionic activators, and Lewis acid activators. The terms "non-coordinating anion activator" and "ionizing activator" are used interchangeably herein.

The terms "process" and "method" are used interchangeably.

Additional definitions and conventions may be set forth below in other portions of the present disclosure.

DETAILED DESCRIPTION

This disclosure relates to ansa-metallocene catalyst compounds represented by Formula (I) and to catalyst systems and polymerization methods utilizing such ansa-metallocene catalyst compounds:

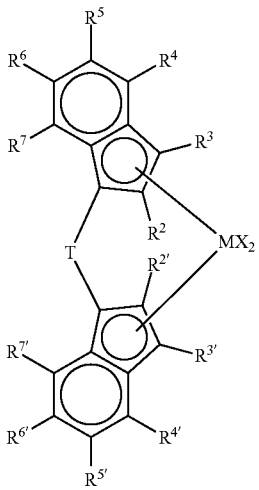
(I)

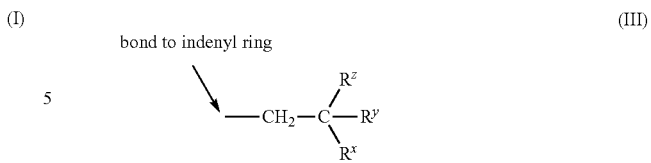
(III)

where each $R^z$ and $R^x$ is, independently, a $C_1$ to $C_{20}$ alkyl group or a phenyl group, and $R^{y'}$ is hydrogen or a $C_1$ to $C_4$ alkyl group. Examples of suitable $C_1$ to $C_{20}$ alkyl groups include methyl, ethyl, propyl, butyl, pentyl, hexyl, heptyl, octyl, and isomers thereof. Examples of suitable $C_1$ to $C_4$ groups include methyl, ethyl, propyl, and butyl, and isomers thereof. Suitable examples of phenyl groups include phenyl and alkyl substituted phenyl. The $C_1$ to $C_4$ alkyl group in Formula (III) is preferably a $C_1$ to $C_2$ alkyl group. In a preferred embodiment, $R^{y'}$ in Formula (II) above is hydrogen, such that $R^3$ is represented by Formula (III) where $R^z$ and $R^x$ are as defined above for Formula (IV):

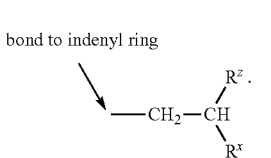
(IV)

In another embodiment, each $R^x$, $R^y$, and $R^z$ is different from any other $R^x$, $R^y$, and $R^z$ such that the catalyst compound has a chiral center on $R^3$. In a preferred embodiment, $R^3$ is represented by Formula (IV), $R^z$ is methyl, $R^x$ is phenyl, and $R^{3'}$ is methyl. In a further embodiment, the catalyst compound is as described in any of foregoing embodiments and each of $R^2$, $R^4$, $R^5$, $R^6$, $R^7$, $R^{2'}$, $R^{4'}$, $R^{5'}$, $R^{6'}$, and $R^{7'}$ is hydrogen.

In still another embodiment, one or more of adjacent groups $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ may be joined to form a completely saturated, partially saturated, or aromatic ring that is fused to an indenyl group. Such ring may be a fused ring or a multicenter fused ring system where the rings may be completely saturated, partially saturated, or aromatic. In a particularly preferred embodiment, $R^5$ and $R^6$ are joined to form a partially saturated 5-membered ring, such that a 3-substituted 1,5,6,7-tetrahydro-s-indacenyl group is formed.

In yet other embodiments, "J" in the catalyst compound of any of the foregoing embodiments is Si and $R^8$ is a $C_1$ to $C_{40}$ hydrocarbyl or a $C_1$ to $C_{40}$ substituted hydrocarbyl group. In such embodiments each $R^8$ is preferably a methyl group.

In yet other embodiments, "M" in any of the catalyst compounds of the foregoing embodiments is Ti, Zr, or Hf, preferably Zr.

In yet other embodiments, each "X" in any of the catalyst compounds of the foregoing embodiments is a halide, preferably chloride.

In any embodiment of the invention, T is a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, In Formula (I), M is a group 4 metal, preferably titanium (Ti), zirconium (Zr), or hafnium (Hf), $R^3$ is a substituted or unsubstituted $C_4$-$C_{40}$ hydrocarbyl group, wherein the $C_4$-$C_{40}$ hydrocarbyl group is branched at the β-position; $R^{3'}$ is either (1) methyl, ethyl, or a $C_3$-$C_{40}$ hydrocarbyl group having the formula —CH$_2$CH$_2$R where R is an alkyl, aryl, or silyl group, or (2) a β-branched alkyl group represented by Formula (II):

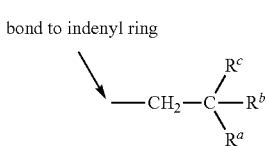
(II)

wherein each $R^a$, $R^b$, and $R^c$ is, independently, hydrogen, a $C_1$ to $C_{20}$ alkyl group, or a phenyl group, and each $R^a$, $R^b$, and $R^c$ is different from any other $R^a$, $R^b$, and $R^c$ such that the catalyst compound has a chiral center on the β-carbon of $R^{3'}$; and each of $R^2$, $R^4$, $R^5$, $R^6$, $R^7$, $R^{2'}$, $R^{4'}$, $R^{5'}$, $R^{6'}$, and $R^{7'}$ is independently hydrogen or a $C_1$-$C_{40}$ substituted or unsubstituted hydrocarbyl, halocarbyl, silylcarbyl, alkoxyl, halogen, or siloxyl, or one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring, T represents the formula (R$^8$)$_2$J or (R$^8$)J$_2$, where J is C, Si, or Ge, and each $R^8$ is independently hydrogen, halogen, a $C_1$ to $C_{40}$ hydrocarbyl or a $C_1$ to $C_{40}$ substituted hydrocarbyl group, and two $R^8$ can form a cyclic structure including completely saturated, partially saturated, aromatic, or fused ring systems, and each X is independently a halide or $C_1$-$C_{50}$ substituted or unsubstituted hydrocarbyl, hydride, amide, alkoxide, sulfide, phosphide, halide, or a combination thereof, or two of X are joined together to form a metallocycle ring, or two of X are joined to form a chelating ligand, a diene ligand, or an alkylidene. Suitable examples of $R^3$ include substituted or unsubstituted $C_4$-$C_{40}$ hydrocarbyl groups that are branched at the β-position such as 2-phenylpropyl, 2-phenylbutyl, 2-methylhexyl, 2,5-dimethylbutyl, and the like.

In one embodiment, $R^3$ is a $C_4$-$C_{40}$ branched hydrocarbyl group represented by Formula (III):

R*₂CSiR*₂, R*₂SiSiR*₂, R*₂SiOSiR*₂, R*₂CSiR*₂CR*₂, R*₂SiCR*₂SiR*₂, R*C=CR*SiR*₂, R*₂CGeR*₂, R*₂GeGeR*₂, R*₂CGeR*₂CR*₂, R*₂GeCR*₂GeR*₂, R*₂SiGeR*₂, R*C=CR*GeR*₂, R*B, R*₂C—BR*, R*₂C—BR*—CR*₂, R*₂C—O—CR*₂, R*₂CR*₂C—O—CR*₂CR*₂, R*₂C—O—CR*₂CR*₂, R*₂C—O—CR*=CR*, R*₂C—S—CR*₂, R*₂CR*₂C—S—CR*₂CR*₂, R*₂C—S—CR*₂CR*₂, R*₂C—S—CR*=CR*, R*₂C—Se—CR*₂, R*₂CR*₂C—Se—CR*₂CR*₂, R*₂C—Se—CR*₂CR*₂, R*₂C—Se—CR*=CR*, R*₂C—N=CR*, R*₂C—NR*—CR*₂, R*₂C—NR*—CR*₂CR*₂, R*₂C—NR*—CR*=CR*, R*₂CR*₂C—NR*—CR*₂CR*₂, R*₂C—P=CR*, R*₂C—PR*—CR*₂, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a C₁-C₂₀ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Preferred examples for the bridging group T include CH₂, CH₂CH₂, SiMe₂, SiPh₂, SiMePh, Si(CH₂)₃, Si(CH₂)₄, O, S, NPh, PPh, NMe, PMe, NEt, NPr, NBu, PEt, PPr, Me₂SiOSiMe₂, and PBu. In a preferred embodiment of the invention in any embodiment of any formula described herein, T is represented by the formula ER$^d$₂ or (ER$^d$₂)₂, where E is C, Si, or Ge, and each R$^d$ is, independently, hydrogen, halogen, C₁ to C₂₀ hydrocarbyl (such as methyl, ethyl, propyl, butyl, pentyl, hexyl, heptyl, octyl, nonyl, decyl, undecyl, or dodecyl) or a C₁ to C₂₀ substituted hydrocarbyl, and two R$^d$ can form a cyclic structure including aromatic, partially saturated, or saturated cyclic or fused ring system. Preferably, T is a bridging group comprising carbon or silica, such as dialkylsilyl, preferably T is selected from CH₂, CH₂₂, C(CH₃)₂, SiMe₂, Me₂Si—SiMe₂, cyclotrimethylenesilylene (Si(CH₂)₃), cyclopentamethylenesilylene (Si(CH₂)₅) and cyclotetramethylenesilylene (Si(CH₂)₄).

Preferably, T represents the formula (R⁸)₂J or (R⁸)J₂, where each J is independently selected from C, Si, or Ge, and each R⁸ is independently hydrogen, halogen, a C₁ to C₄₀ hydrocarbyl or a C₁ to C₄₀ substituted hydrocarbyl group, and two R⁸ can form a cyclic structure including completely saturated, partially saturated, aromatic, or fused ring systems.

In still other embodiments, the catalyst compound represented by Formula (I) corresponds to any one of the structures shown in Table 1:

TABLE 1

Specific Catalyst Compound Structures

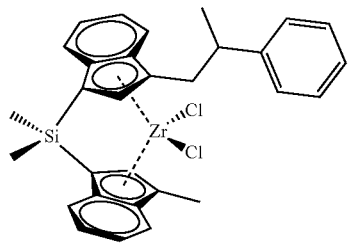

1

TABLE 1-continued

Specific Catalyst Compound Structures

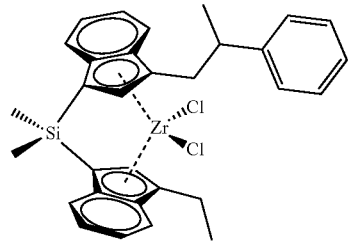

2

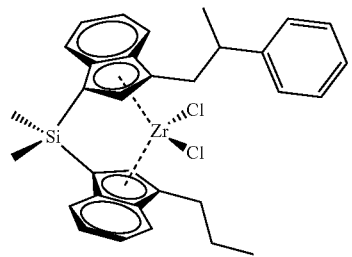

3

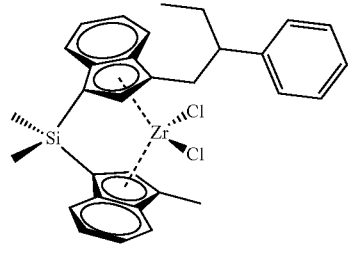

4

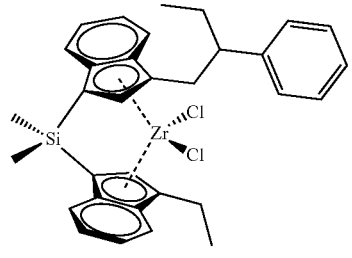

5

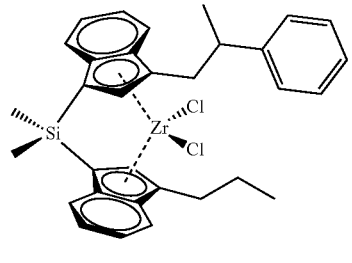

6

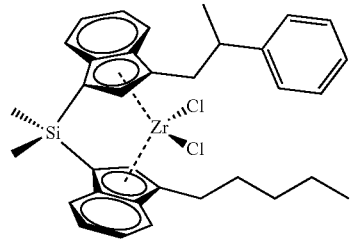

7

TABLE 1-continued
Specific Catalyst Compound Structures
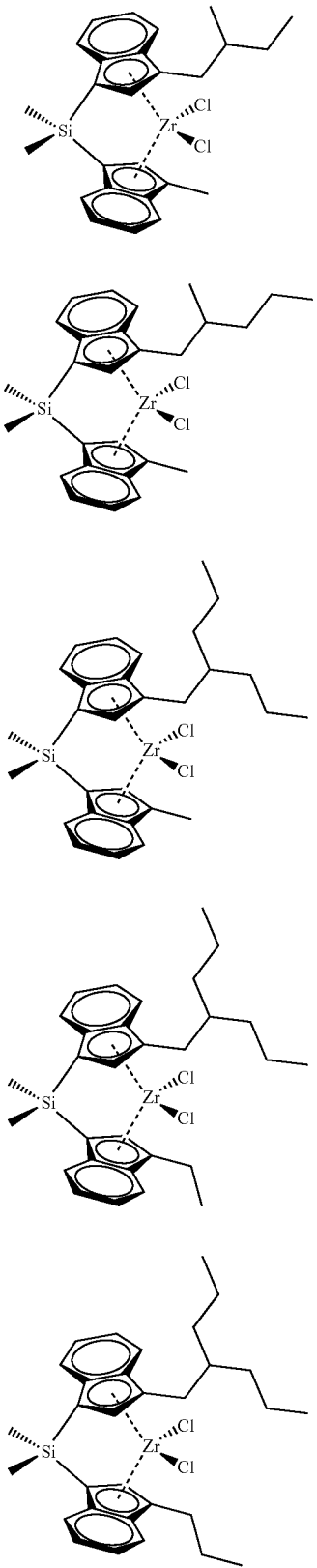
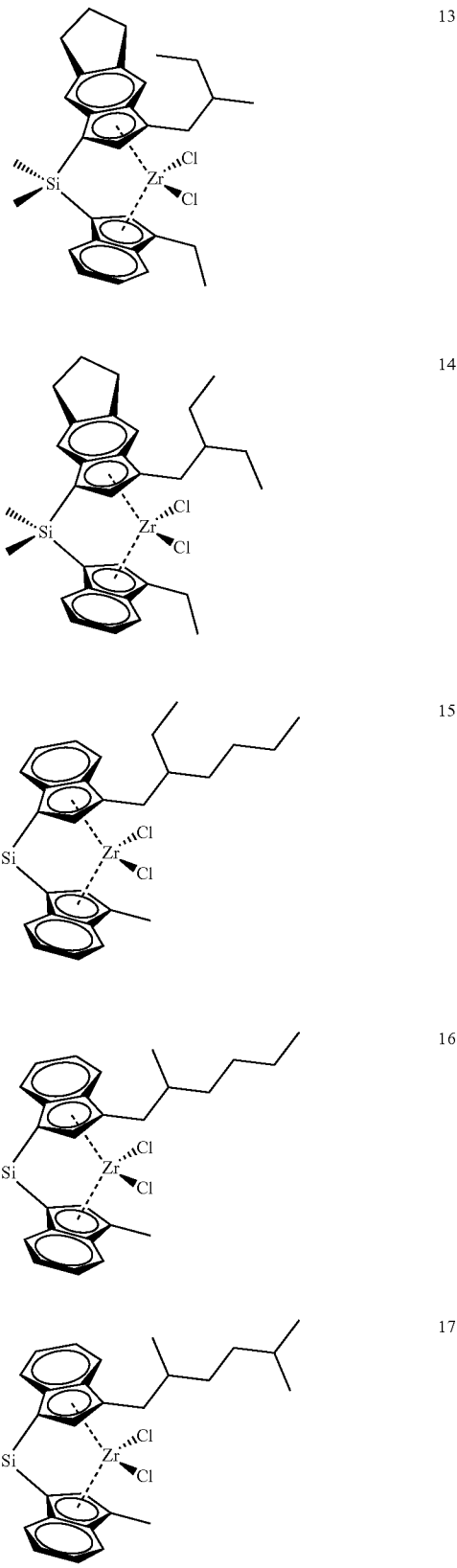

TABLE 1-continued
Specific Catalyst Compound Structures
18
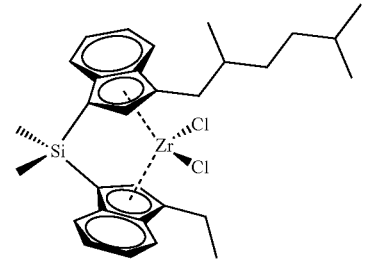
19
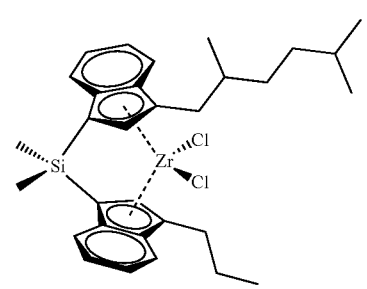
20
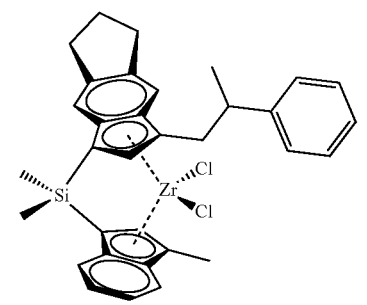
21
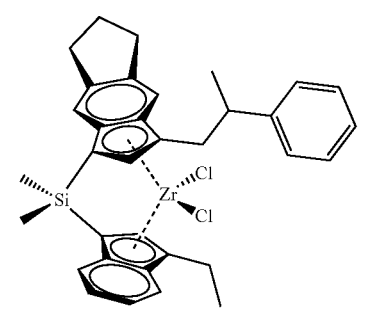
22
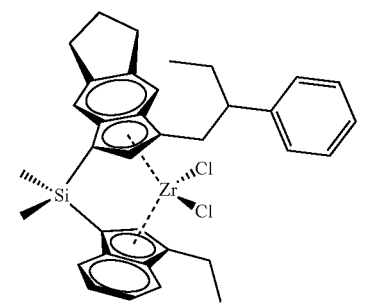
TABLE 1-continued
Specific Catalyst Compound Structures
23
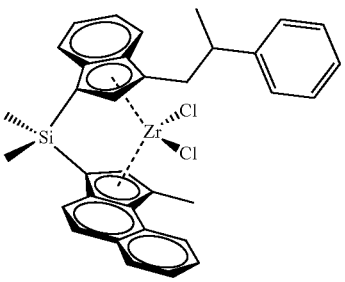
24
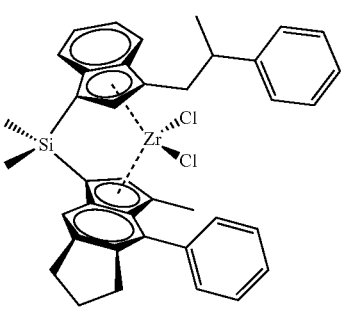
25
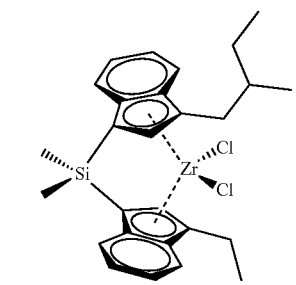
26
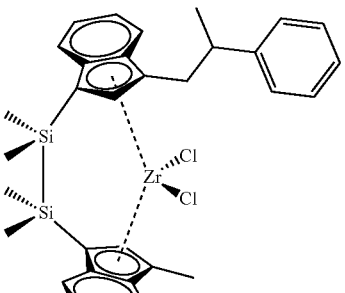
27
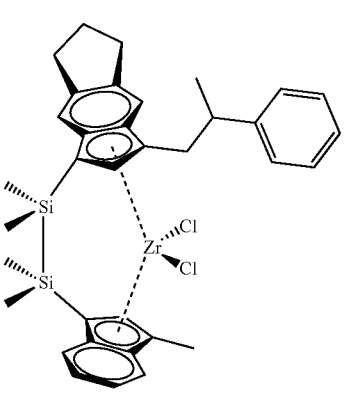

TABLE 1-continued

Specific Catalyst Compound Structures

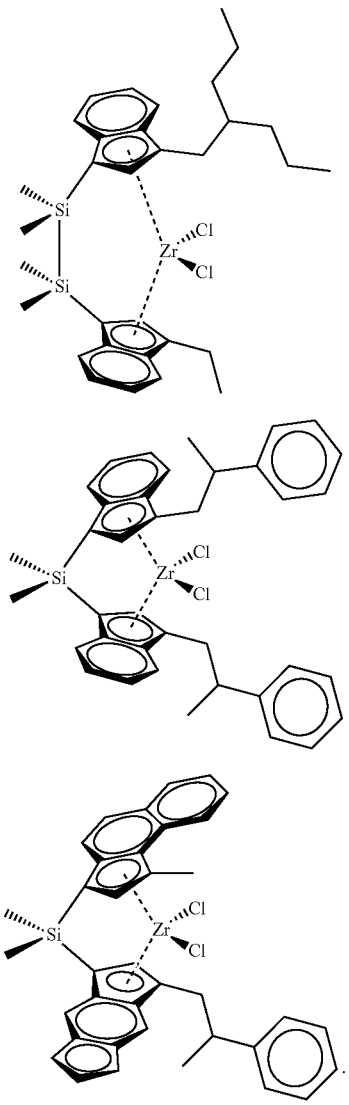

Methods of Preparing the Catalyst Compounds

All air sensitive syntheses are carried out in nitrogen purged dry boxes. All solvents are available from commercial sources. Aluminum alkyls are available as hydrocarbon solutions from commercial sources. Methylalumoxane ("MAO") is available from Albemarle as a 30 wt % solution in toluene.

Generally, the catalyst compounds of this disclosure may be synthesized according to the schematic reaction procedure described in, for example, WO 2016196331 in paragraph [0080], where (i) is a deprotonation via a metal salt of alkyl anion (e.g., n-BuLi) to form an indenide; (ii) is reaction of indenide with an appropriate bridging precursor (e.g., $Me_2SiCl_2$); (iii) is reaction of the above product with AgOTf; (iv) is reaction of the above triflate compound with another equivalent of indenide; (v) is deprotonation via an alkyl anion (e.g., n-BuLi) to form a dianion; (vi) is reaction of the dianion with a metal halide (e.g., $ZrCl_4$).

Catalyst Systems

In one or more embodiments, the catalyst system of the present disclosure comprises an activator and any of the catalyst compounds described above. While the catalyst systems of the present disclosure may utilize any of the catalyst compounds described above in combination with each other or with one or more catalyst compounds not described above, in a preferred embodiment the catalyst systems utilize a single catalyst compound corresponding to one of the catalyst compounds of the present disclosure. In yet other embodiments, the catalyst system is as described in any of the foregoing embodiments, wherein the catalyst system comprises a support material. In still other embodiments, the catalyst system is as described in any of the foregoing embodiments, wherein the support material is silica. In still further embodiments, the catalyst system is as described in any of the foregoing embodiments, wherein the activator comprises one or more of alumoxanes, aluminum alkyls, and ionizing activators.

In another embodiment, the present disclosure relates to a method for preparing a catalyst system comprising the step of contacting the catalyst compound of any of the embodiments described above with an activator, wherein said catalyst compound is a single catalyst compound and said single catalyst compound is the only catalyst compound contacted by an activator in said method. In yet another embodiment, the present disclosure relates to a method of polymerizing olefins comprising contacting at least one olefin with said catalyst system and obtaining a polyolefin. In still another embodiment, the present disclosure relates to a method of polymerizing olefins comprising contacting two or more different olefins with said catalyst system and obtaining a polyolefin. In a further embodiment, the present disclosure relates to a catalyst system comprising the catalyst compound of any of the embodiments described above, wherein said catalyst system consists of a single catalyst compound. In a still further embodiment, the present disclosure relates to a catalyst system comprising the catalyst compound of any of the embodiments described above, wherein said catalyst system consists essentially of a single catalyst compound.

Activators

After the catalyst compounds have been synthesized, catalyst systems may be formed by combining them with activators in any suitable manner, including by supporting them for use in slurry or gas phase polymerization. The catalyst systems may also be added to or generated in solution polymerization or bulk polymerization (in the monomer, i.e., no solvent). The catalyst system typically comprises a catalyst compound as described above and an activator such as alumoxane or a non-coordinating anion activator (NCA). Activation may be performed using alumoxane solution including methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. Another useful alumoxane is solid polymethylaluminoxane as described in U.S. Pat. Nos. 9,340,630; 8,404,880; and 8,975,209. The catalyst systems employed in the present disclosure can use an activator selected from alumoxanes, such as methyl alumoxane, modified methyl alumoxane, ethyl alumoxane, isobutyl alumoxane, and the like. Alternatively, the catalyst systems can use activators that are aluminum alkyls or ionizing activators.

When an alumoxane or modified alumoxane is used, the catalyst compound-to-activator molar ratio is from about 1:3000 to about 10:1; such as about 1:2000 to about 10:1; such as about 1:1000 to about 10:1; such as about 1:500 to about 1:1; such as about 1:300 to about 1:1; such as about 1:200 to about 1:1; such as about 1:100 to about 1:1; such as about 1:50 to about 1:1; such as about 1:10 to about 1:1. When the activator is an alumoxane (modified or unmodified), some embodiments select the maximum amount of activator at a 5000-fold molar excess over the catalyst (per metal catalytic site). The minimum activator-to-catalyst ratio can be 1:1 molar ratio.

Activation may also be performed using non-coordinating anions, referred to as NCA's, of the type well known in the art. NCA may be added in the form of an ion pair using, for example, [DMAH]+ [NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl) borate (i.e., $[PhNMe_2H]B(C_6F_5)_4$) and N,N-dimethylanilinium tetrakis (heptafluoronaphthyl)borate, where Ph is phenyl, and Me is methyl.

In an embodiment of the present disclosure, the non-coordinating anion activator is represented by the following formula (1):

$$(Z)^{d+}(A^{d-}) \qquad (1)$$

wherein Z is (L-H) or a reducible Lewis acid, L is a neutral Lewis base, H is hydrogen and $(L-H)^+$ is a Bronsted acid; $A^{d-}$ is a non-coordinating anion having the charge d−; and d is an integer from 1 to 3.

When Z is (L-H) such that the cation component is $(L-H)^{d+}$, the cation component may include Bronsted acids such as protonated Lewis bases capable of protonating a moiety, such as an alkyl or aryl, from the catalyst precursor, resulting in a cationic transition metal species, or the activating cation $(L-H)^{d+}$ is a Bronsted acid, capable of donating a proton to the catalyst precursor resulting in a transition metal cation, including ammoniums, oxoniums, phosphoniums, siliyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C+)$, where Ar is aryl or aryl substituted with a heteroatom, or a $C_1$ to $C_{40}$ hydrocarbyl, the reducible Lewis acid may be represented by the formula: $(Ph_3C+)$, where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5, or 6, or 3, 4, 5, or 6; n-k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad− components also include diboron compounds as disclosed in U.S. Pat. No. 5,447,895.

In an embodiment in any of the NCA's represented by Formula 1 described above, the anion component Ad− is represented by the formula $[M*k*+Q*n*]d*-$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

The present disclosure also relates to a method to polymerize olefins comprising contacting olefins (such as ethylene and 1-hexene) with a catalyst compound as described above and an NCA activator represented by the Formula (2):

$$R_nM^{**}(ArNHal)_{4-n} \qquad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Zd+ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkylsulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: $(Ar_3C+)$, where Ar is aryl or aryl substituted with a heteroatom, and/or a $C_1$ to $C_{40}$ hydrocarbyl, or the reducible Lewis acid represented by the formula: $(Ph_3C+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)^{d+}$, wherein L is an neutral Lewis base; H is hydrogen; (L-H) is a Bronsted acid; and d is 1, 2, or 3, or $(L-H)^{d+}$ is a Bronsted acid selected from ammoniums, oxoniums, phosphoniums, siliyliums, and mixtures thereof.

Further examples of useful activators include those disclosed in U.S. Pat. Nos. 7,297,653 and 7,799,879.

In an embodiment, an activator useful herein comprises a salt of a cationic oxidizing agent and a noncoordinating, compatible anion represented by the Formula (3):

$$(OX^{e+})_d(A^{d-})_e \qquad (3)$$

wherein $OX^{e+}$ is a cationic oxidizing agent having a charge of e+; e is 1, 2 or 3; d is 1, 2, or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of Ad− include tetrakis (pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis (pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In at least one embodiment, two NCA activators may be used in the polymerization and the molar ratio of the first NCA activator to the second NCA activator can be any ratio. In at least one embodiment, the molar ratio of the first NCA activator to the second NCA activator is 0.01:1 to 10,000:1, or 0.1:1 to 1000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1000:1. In at least one embodiment, the NCA activator-to-catalyst ratio is 0.5:1 to 10:1, or 1:1 to 5:1.

In at least one embodiment, the catalyst compounds can be combined with combinations of alumoxanes and NCA's as known in the art.

In at least one embodiment, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Support Materials

In any of the embodiments herein, the catalyst system may comprise an inert support material. In at least one embodiment, the supported material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $SiO_2$, $Al_2O_3$, $ZrO_2$, $SiO_2$, and combinations thereof.

The support material, such as an inorganic oxide, can have a surface area in the range of from about 10 to about 700 $m^2/g$, pore volume in the range of from about 0.1 to about 4.0 cc/g and average particle size in the range of from about 5 to about 500 μm. In at least one embodiment, the surface area of the support material is in the range of from about 50 to about 500 $m^2/g$, pore volume of from about 0.5 to about 3.5 cc/g and average particle size of from about 10 to about 200 μm. In at least one embodiment, the surface area of the support material is in the range is from about 100 to about 400 $m^2/g$, pore volume from about 0.8 to about 3.0 cc/g and average particle size is from about 5 to about 100 μm. The average pore size of the support material useful in the present disclosure is in the range of from 10 to 1000 Å, such as 50 to about 500 Å, such as 75 to about 350 Å. In some embodiments, the support material is a high surface area, amorphous silica (surface area=300 $m^2/gm$; pore volume of 1.65 $cm^3/gm$). Silicas are marketed under the tradenames of Davison 952 or Davison 955 by the Davison Chemical Division of W.R. Grace and Company. In other embodiments DAVISON 948 can be used. A preferred support material is silica ES70™ silica, which is available from PQ Corporation.

The support material should be dry, that is, substantially free of absorbed water. Drying of the support material can be effected by heating or calcining at about 100° C. to about 1000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of the present disclosure. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In at least one embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the catalyst, activator and support is heated to about 0° C. to about 70° C., such as to about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Polymerization Methods

In embodiments herein, the present disclosure relates to polymerization processes where monomer (such as ethylene), and optionally comonomer (such as 1-hexene), are contacted with a catalyst system comprising an activator and at least one catalyst compound, as described above. The catalyst compound and activator may be combined in any order, and are combined typically prior to contacting with the monomer.

In at least one embodiment, a polymerization method includes a) contacting one or more olefin monomers with a catalyst system comprising: i) an activator and ii) a catalyst compound of the present disclosure. The activator may be an alumoxane or a non-coordination anion activator. The one or more olefin monomers may be ethylene or a mixture of ethylene and one or more 1-olefins comonomers (also referred to as α-olefins or "alpha olefins") such as 1-butene, 1-hexene, and 1-octane.

Monomers useful herein include substituted or unsubstituted $C_2$ to $C_{40}$ alpha olefins, such as $C_2$ to $C_{20}$ alpha olefins, such as $C_2$ to $C_{12}$ α-olefins, such as ethylene, propylene, butene, pentene, hexene, heptene, octene, nonene, decene, undecene, dodecene and isomers thereof. In at least one embodiment, the monomer comprises propylene and an optional comonomers comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

The polymerization method of the present disclosure can be carried out in any suitable manner Any suitable suspension, homogeneous, bulk, solution, slurry, or gas phase polymerization process can be used. Such processes can be run in a batch, semi-batch, or continuous mode. Homogeneous polymerization processes and slurry processes can be performed. (A useful homogeneous polymerization process is one where at least 90 wt % of the product is soluble in the reaction media.) A bulk homogeneous process can be used. (A preferred bulk process is one where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt %, based upon the weight of the solvents.

In specific embodiments of the polymerization method disclosed herein, the method comprises contacting at least one olefin with a catalyst system disclosed herein and obtaining a polyolefin. In still further embodiments, the method comprises contacting two or more different olefins with a catalyst system of the present disclosure and obtaining a polyolefin. Preferably the aforementioned at least one olefin is ethylene. Preferably the aforementioned two or more olefins are ethylene and 1-hexene.

In any of the foregoing embodiments of the polymerization methods disclosed herein, the produced polyolefin can have a PDI of about 3.0 to about 13.0, preferably about 5.0 to about 13.0, and more preferably about 8.0 to about 13.0. In any of the foregoing embodiments of the polymerization methods disclosed herein, the polyolefin can be linear low density polyethylene (LLDPE) and the method is carried out in a gas phase or slurry process. In still further embodiments, the polyolefin is as described in any of the above embodiments and has a bimodal molecular weight distribution.

Polymerizations can be performed at any temperature and/or pressure suitable to obtain the desired polymers, such as ethylene and or ethylene/1-olefin polymers. Typical temperatures and/or pressures include a temperature in the range of from about 0° C. to about 300° C., such as about 20° C. to about 200° C., such as about 35° C. to about 150° C., such as about 40° C. to about 120° C., such as about 45° C. to about 85° C., or about 72° C. to about 85° C.; and at a pressure in the range of from about 0.35 MPa to about 10 MPa, such as about 0.45 MPa to about 6 MPa, such as about 0.9 MPa to about 4 MPa. In a typical polymerization, the run time of the reaction is up to about 60 minutes, alternatively from about 5 to 250 minutes, alternatively from about 10 to 45 minutes. Although the polymerization temperature is not critical, in one embodiment the polymerization method disclosed herein may comprise heating the one or more olefin monomers and a catalyst system of the present disclosure to about 72° C. or about 85° C. and forming an ethylene homopolymer or an ethylene/1-olefin copolymer, such as an ethylene/1-hexene copolymer.

In some embodiments of the polymerization methods disclosed herein, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, or Group 12 or 13 metal alkyls, the latter which are represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also relates to compositions of matter produced by the methods described herein. In at least one embodiment, the methods described herein produce ethylene homopolymers or ethylene copolymers, such as ethylene/1-hexene copolymers, having PDI values of about 3.0 to about 13.0, preferably about 5.0 to about 13.0, and more preferably about 8.0 to about 13.0. In a preferred embodiment, the ethylene homopolymers or ethylene copolymers have a bimodal molecular weight distribution. In further such embodiments, the ethylene copolymers have from 0 to 25 mol % (such as from 0.5 to 20 mol %, such as from 1 to 15 mol %, such as from 3 to 10 mole\%) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 to 25 mol % (such as from 0.5 to 20 mol %, such as from 1 to 15 mol %, such as from 3 to 10 mol %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In still further embodiments, the ethylene copolymers disclosed herein are ethylene/1-hexene copolymers having from about 0.5 to about 11 wt %, or from about 1.0 to about 11 wt %, or from about 2.0 to about 11 wt %, or from about 4.0 to 11 wt %, or from about 5.0 to 11 wt % of incorporated 1-hexene.

In at least one embodiment, the polymer produced herein has a multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In yet further embodiments, the polymers produced as described herein have a $g'_{vis}$ value, as determined by GPC-4D (discussed below) of about 0.9, alternatively about 0.8 to about 1, alternatively about 0.84 to about 0.94. In yet further embodiments, the polymer produced as described herein has some long chain branching (LCB).

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Films and Molded Articles

Any of the foregoing polymers of the present disclosure, such as the foregoing ethylene/1-olefin copolymers or blends thereof, may be used in a variety of end-use applications. Such applications include, for example, mono- or multi-layer blown, mono- or multi-layer cast, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film Films may be subsequently unoriented, uniaxially oriented, or biaxially oriented to the same or different extents. Typically, one or more of the layers of the film are oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polyethylene layer or the two layers can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions. The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers of the film may be modified by corona treatment, electron beam irradiation, gamma irradiation, flame treatment, or microwave. In a preferred embodiment, one or both of the surface layers is modified by corona treatment.

Other applications include the fabrication of molded articles by injection or blow molding, such as for example, blow molded bottles for milk, detergent, or other liquids.

Thus, in at least one aspect the present disclosure provides a mono- or multi-layer blown, cast, extruded, or shrink film comprising any of the polyolefins, preferably a linear low density polyethylene, prepared according to any embodiments of the polymerization methods set forth herein. In another aspect the present disclosure provides an injection or blow molded article comprising any of the polyolefins prepared according to any embodiments of the polymerization methods set forth herein.

This invention further relates to:

1. A catalyst compound represented by Formula (I):

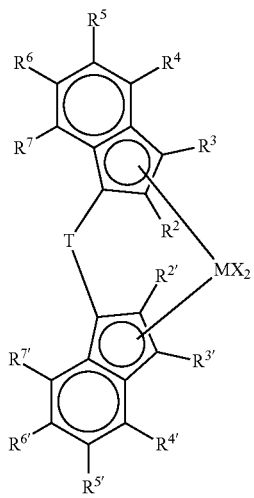

where M is a group 4 metal;
$R^3$ is a substituted or unsubstituted $C_4$-$C_{40}$ hydrocarbyl group, wherein the $C_4$-$C_{40}$ hydrocarbyl group is branched at the β-position;
$R^{3'}$ is either:
(1) methyl, ethyl, or a $C_3$-$C_{40}$ group having the formula —$CH_2CH_2R$ where R is an alkyl, aryl, or silyl group, or
(2) a β-branched alkyl group represented by Formula (II):

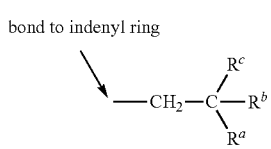

wherein each $R^a$, $R^b$, and $R^c$ is, independently, hydrogen, a $C_1$ to $C_{20}$ alkyl group, or a phenyl group, and each $R^a$, $R^b$, and $R^c$ is different from any other $R^a$, $R^b$, and $R^c$ such that the catalyst compound has a chiral center on the β-carbon of $R^{3'}$;
each of $R^2$, $R^4$, $R^5$, $R^6$, $R^7$, $R^{2'}$, $R^{4'}$, $R^{5'}$, $R^{6'}$, and $R^{7'}$ is independently hydrogen or a $C_1$-$C_{40}$ substituted or unsubstituted hydrocarbyl, halocarbyl, silylcarbyl, alkoxyl, halogen, or siloxyl, or one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring;
T is a bridging group, and
each X is independently a halide or $C_1$-$C_{50}$ substituted or unsubstituted hydrocarbyl, hydride, amide, alkoxide, sulfide, phosphide, halide, or a combination thereof, or two of X are joined together to form a metallocycle ring, or two of X are joined to form a chelating ligand, a diene ligand, or an alkylidene.

2. The catalyst compound of paragraph 1, wherein $R^3$ is a $C_4$-$C_{40}$ branched hydrocarbyl group represented by Formula (III):

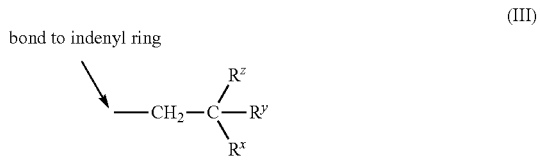

where each $R^z$ and $R^x$ is, independently, a $C_1$ to $C_{20}$ alkyl group or a phenyl group, and $R^y$ is hydrogen or a $C_1$ to $C_4$ alkyl group, preferably a $C_1$ to $C_2$ alkyl group.

3. The catalyst compound of paragraph 1 or 2, wherein T represents the formula $(R^8)_2J$ or $(R^8)J_2$, where each J is independently selected from C, Si, or Ge, and each $R^8$ is independently hydrogen, halogen, a $C_1$ to $C_{40}$ hydrocarbyl or a $C_1$ to $C_{40}$ substituted hydrocarbyl group, and two $R^8$ can form a cyclic structure including completely saturated, partially saturated, aromatic, or fused ring systems.

4. The catalyst compound of paragraph 2 or 3, wherein $R^y$ is hydrogen.

5. The catalyst compound of any of paragraphs 1 to 4, wherein $R^{3'}$ is a β-branched alkyl group represented by Formula (II), $R^a$ is methyl, $R^b$ is hydrogen, and $R^c$ is phenyl.

6. The catalyst compound of any of paragraphs 2 to 5, wherein each $R^x$, $R^y$, and $R^z$ is different from any other $R^x$, $R^y$, and $R^z$ such that the catalyst compound has a chiral center on $R^3$.

7. The catalyst compound of any of paragraphs 2 to 6, wherein $R^z$ is methyl and $R^x$ is phenyl.

8. The catalyst compound of any of paragraphs 1 to 7, wherein one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring.

9. The catalyst compound of paragraph 8, wherein $R^5$ and $R^6$ are joined to form a partially saturated 5-membered ring.

10. The catalyst compound of any of paragraphs 2 to 9, wherein $R^{3'}$ is methyl, $R^z$ is methyl, and $R^x$ is phenyl.

11. The catalyst compound of any of paragraphs 1 to 10, wherein each of $R^2$, $R^4$, $R^5$, $R^6$, $R^7$, $R^{2'}$, $R^{4'}$, $R^{5'}$, $R^{6'}$, and $R^{7'}$ is hydrogen.

12. The catalyst compound of any of paragraphs 1 to 11, wherein J is Si and $R^8$ is a $C_1$ to $C_{40}$ hydrocarbyl or a $C_1$ to $C_{40}$ substituted hydrocarbyl group.

13. The catalyst compound of any of paragraphs 1 to 12, wherein each $R^8$ is a methyl group.

14. The catalyst compound of any of paragraphs 1 to 13, wherein M is Zr.

15. The catalyst compound of any of paragraphs 1 to 14, wherein each X is a halide.

16. The catalyst compound of any of paragraphs 1 to 14, wherein each X is chloride.

17. The catalyst compound of any of paragraph 1, wherein the catalyst compound represented by Formula (I) corresponds to any one of the following structures:

1
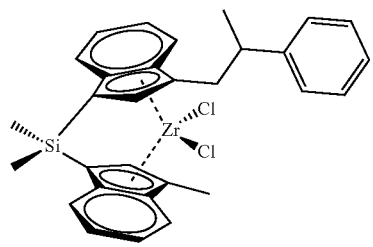

2
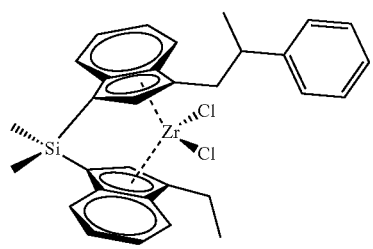

3
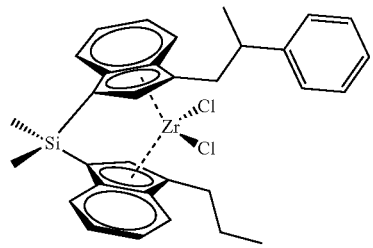

4
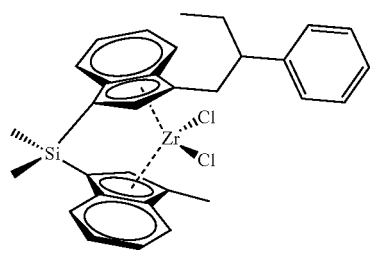

5
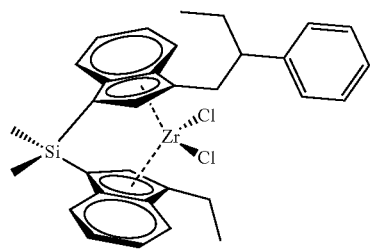

-continued

6
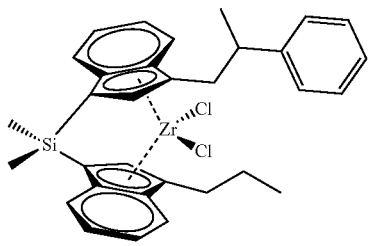

7
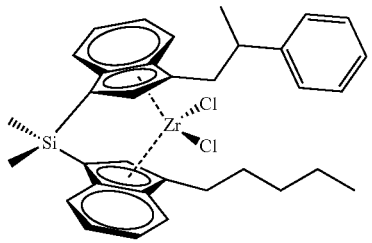

8
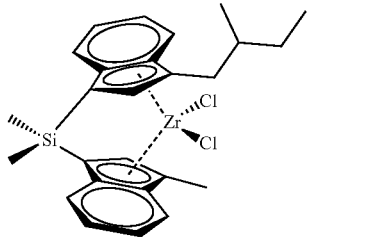

9
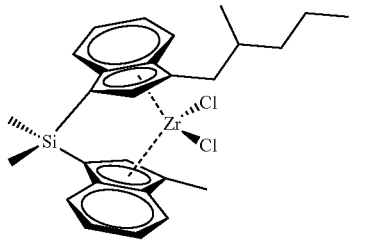

10
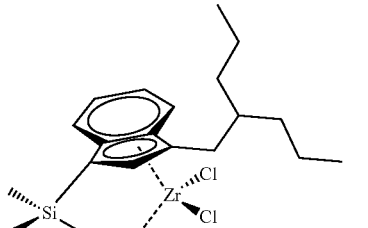

11
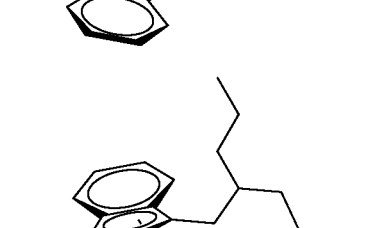

12
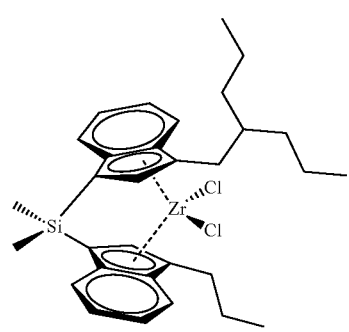
13
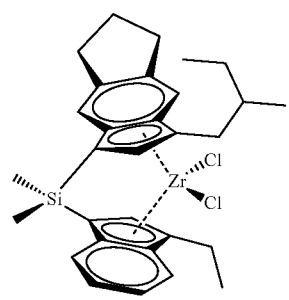
14
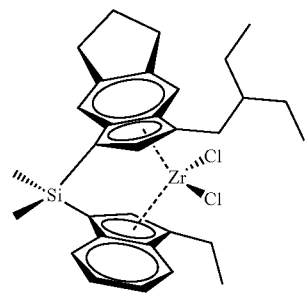
15
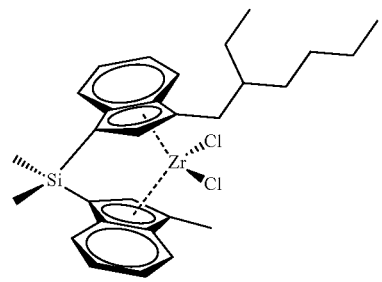
16
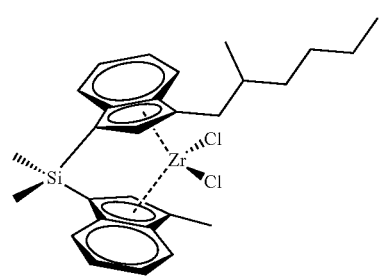
17
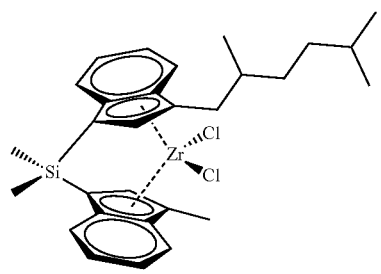
18
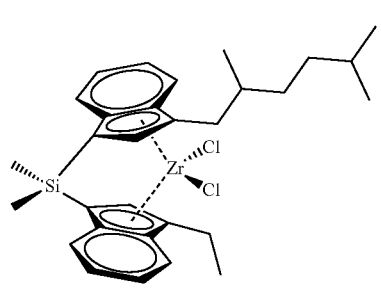
19
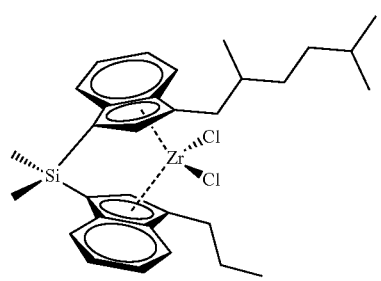
20
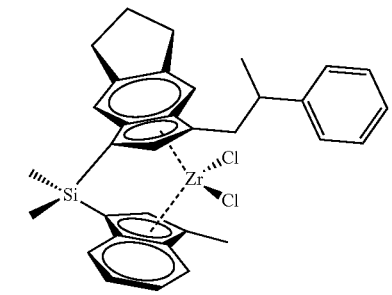
21
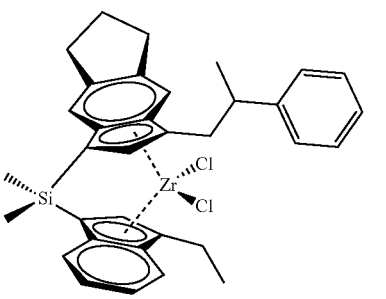

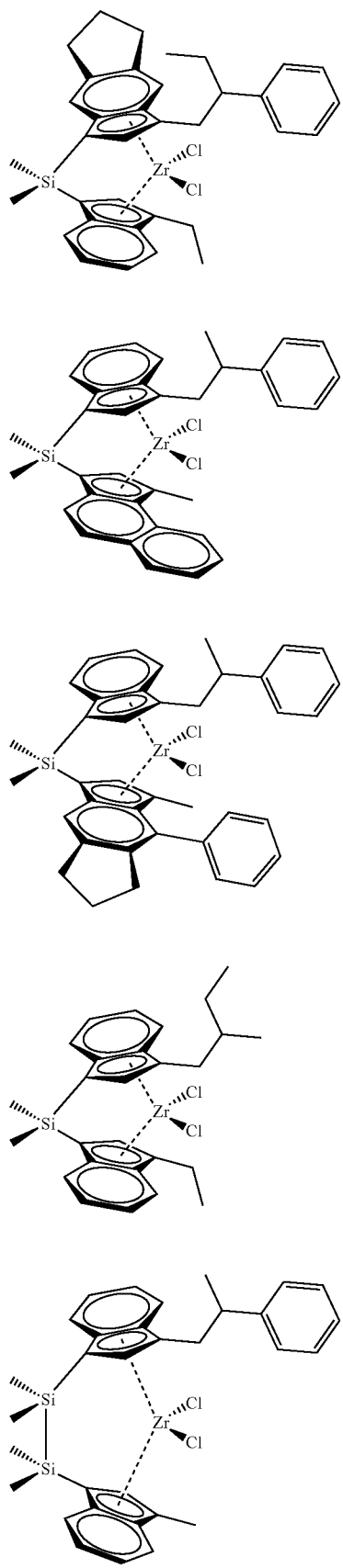

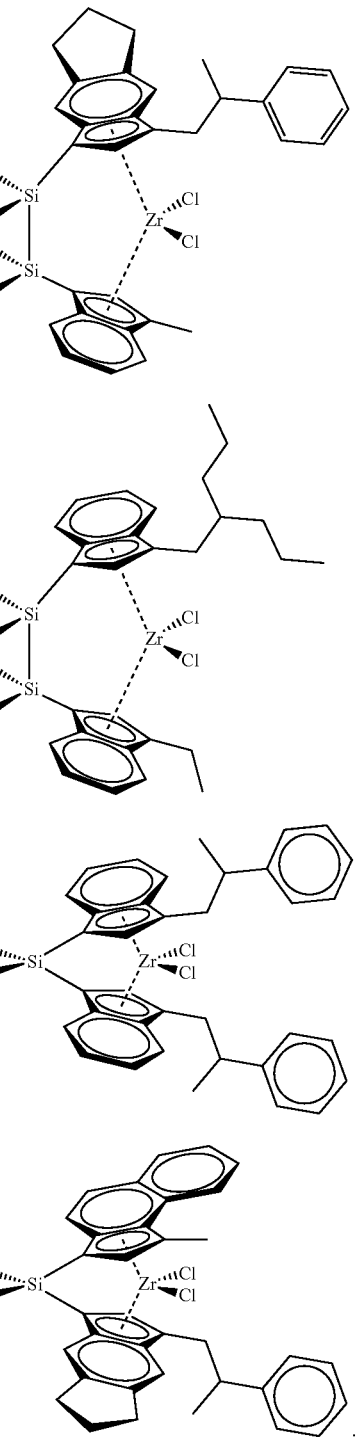

18. A catalyst system comprising an activator and the catalyst compound of any of paragraphs 1 to 17.

19. A catalyst system according to paragraph 18, wherein the catalyst system utilizes a single catalyst compound.

20. The catalyst system of paragraph 18 or 19, wherein the catalyst system comprises a support material.

21. The catalyst system of paragraph 20, wherein said support material is silica.

22. The catalyst system of any of paragraphs 18 to 21, wherein the activator comprises one or more of alumoxanes, aluminum alkyls, and ionizing activators.
23. A method of polymerizing olefins to produce at least one polyolefin composition, the method comprising contacting at least one olefin, preferably two or more different olefins, with the catalyst system of any of paragraphs 18 to 22 and obtaining a polyolefin.
24. The method of paragraph 23, wherein said at least one olefin is ethylene.
25. The method of paragraph 24, said at least one olefin are ethylene and 1-hexene.
26. The method of any of paragraphs 23 to 25, wherein said polyolefin has a bimodal molecular weight distribution.
27. The method of any of paragraphs 23 to 26, wherein said polyolefin has an Mw/Mn of from about 5.0 to about 13.0, alternately from about 8.0 to about 13.0.
28. The method of any of paragraphs 23 to 27, wherein said polyolefin is linear low density polyethylene.
29. The method of any of paragraphs 23 to 28, wherein said polyolefin has a total unsaturation/1000 C greater than 0.7.
30. The method of any of paragraphs 23 to 29, wherein said polyolefin has a weight average molecular weight of 50,000 or higher.
31. The method of any of paragraphs 23 to 30, wherein said method is carried out in a gas phase or slurry process.
32. A mono- or multi-layer blown, cast, extruded, or shrink film comprising a polyolefin prepared according to the method of any of paragraphs 23 to 31.
33. An injection or blow molded article comprising a polyolefin prepared according to the method of any of paragraphs 23 to 31.
34. The method of any of paragraphs 23 to 33, wherein said polyolefin is linear low density polyethylene and the linear low density polyethylene is formed into a biaxially oriented film.
35. A biaxially oriented polyethylene film comprising linear low density polyethylene produced by the method paragraph 34.

Experimental

The experimental methods and analytical techniques utilized in Examples 1-7 below are described in this section.

Chemical structures and isomers of catalyst compounds of the present disclosure were determined by $^1H$ NMR. $^1H$ NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated benzene in the deuterated benzene, which is expected to show a peak at 7.16 ppm.

General Procedure for High Throughput Ethylene/1-Hexene Polymerization and Polymer Characterization (Tables 3-5)

Unless stated otherwise ethylene homopolymerization and ethylene-hexene copolymerizations are carried out in a parallel pressure reactor, as generally described in U.S. Pat. Nos. 6,306,658; 6,455,316; WO 00/09255; and Murphy et al., J. Am. Chem. Soc., 2003, Vol. 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

Preparation of catalyst slurry for high throughput run: In a dry box, 45 mg of supported catalyst is weighed into a 20 mL glass vial. 15 mL of toluene is added to the vial to make a slurry that contained 3 mg supported catalyst/mL slurry. The resulting mixture is vortexed prior to injection.

Starting material preparations: Solvents, polymerization grade toluene and isohexane are supplied by ExxonMobil Chemical Company and thoroughly dried and degassed prior to use. Polymerization grade ethylene is used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) is used as a 2 mmol/L solution in toluene.

Polymerizations are conducted in an inert atmosphere (N2) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves are prepared by purging with dry nitrogen prior to use.

Small Scale Slurry Ethylene/1-Hexene Copolymerization (Tables 3-5)

The reactor is prepared as described above, and then purged with ethylene (or 300 ppm hydrogen/ethylene custom gas for runs in Table 5). Isohexane, 1-hexene and TnOAl (or TIBAL for runs in Table 5) are added via syringe at room temperature and atmospheric pressure. The reactor is then brought to process temperature (85° C.) and charged with ethylene (or 300 ppm hydrogen/ethylene custom gas for runs in Table 5) to process pressure (130 psig=896 kPa) while stirring at 800 RPM. The transition metal compound "TMC" (100 µL of a 3 mg/mL toluene slurry, unless indicated otherwise) is added via syringe with the reactor at process conditions. For runs in Table 3, TnOAl is used as 200 µL of a 20 mmol/L in isohexane solution. For runs in Table 5, TIBAL is used as 100 µL of a 20 mmol/L in isohexane solution. No other reagent is used. Ethylene is allowed to enter (through the use of computer controlled solenoid valves) the autoclaves during polymerization to maintain reactor gauge pressure (+/-2 psig). Reactor temperature is monitored and typically maintained within +/-1° C. Polymerizations are halted by addition of approximately 50 psi $O_2$/Ar (5 mol % $O_2$) gas mixture to the autoclaves for approximately 30 seconds. The polymerizations are quenched after a predetermined cumulative amount of ethylene had been added or for a maximum of 45 minutes polymerization time. In addition to the quench time for each run, the reactors are cooled and vented. The polymer is isolated after the solvent is removed in-vacuo. Yields reported include total weight of polymer and residual catalyst. The resultant polymer is analyzed by Rapid GPC to determine the molecular weight and by DSC to determine the melting point.

General Procedure for Polymerization in Gas Phase Autoclave Reactor (Table 6)

For examples 12-14, a 2 Liter Autoclave reactor (Parker Autoclave Engineers Research Systems) was heated to 105° C. under a continuous purge of anhydrous nitrogen gas (~2-5 SLPM) for 60 minutes to reduce residual oxygen and moisture. Anhydrous sodium chloride, 50-400 g (Fisher, oven-dried 48 hr at 180° C., stored under inert atmosphere in glovebox), was loaded into a 0.5 L Whitey cylinder and charged to the reactor with nitrogen pressure. The reactor was maintained at 105° C. with continued nitrogen purge for 30 minutes. A solid scavenger (5.0 g, SMAO-ES70-875) was loaded to a Whitey sample cylinder and added to the reactor with nitrogen charge. Nitrogen purge was discontinued and the reactor maintained at 105° C. and 70 psig $N_2$ as an impeller rotated the bed for 30 min (100-200 RPM). The reactor was adjusted to desired reactor temperature (60° C.-100° C.) and the nitrogen pressure reduced to ca. 20 psig. Comonomer (1-4 mL of 1-hexene) was charged into the reactor from a syringe pump (Teledyne Isco), followed by 50-500 mL of 10% hydrogen gas (nitrogen balance). The reactor was subsequently pressurized with ethylene monomer to a total pressure of 240 psig. Quantities of comonomer and hydrogen were monitored by gas chromatography and adjusted to desired gas phase ratios of comonomer/ethylene and hydrogen/ethylene.

Solid Catalyst (5.0-100.0 mg, MAO-silica support) was loaded into a small injection tube under inert atmosphere nitrogen in a glovebox. The catalyst injection tube was attached to the reactor and catalyst was quickly charged into the reactor with high pressure nitrogen (300-350 psig), and polymerization was monitored for the desired reaction time (30-300 min). The comonomer and hydrogen were continuously added with mass flow controllers to maintain specific concentrations during the polymerization, as measured by GC. Ethylene monomer was continuously added, maintaining a constant total reactor pressure of 300-350 psig (constant $C_2$ partial pressure of 200-220 psig). After the desired reaction time (1 h), the reactor was vented and cooled to ambient pressure and temperature. The reaction product was collected, dried 60-90 min under nitrogen purge, and weighed for crude yield. The product was transferred to a standard 2 L beaker and washed with 3×2000 mL of distilled water with rapid magnetic stirring to remove sodium chloride and residual silica. Polymer was collected by filtration and oven dried under vacuum at 40° C. for 12 hr, then the weight was measured for final isolated yield. Polymer was analyzed by thermogravimetric analysis to ensure ≤1 wt % residual inorganic material, then was subsequently characterized by standard ASTM methods for density and molecular weight behavior.

Rapid GPC, 1-Hexene Incorporation, and DSC Measurements

To determine various molecular weight related values of the high throughput samples by GPC, high temperature size exclusion chromatography was performed using an automated "Rapid GPC" system. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using a Polymer Char IR4 detector. The molecular weights presented are relative to linear polystyrene standards and are uncorrected. For purposes of this invention only, the Rapid-GPC Mw (weight average molecular weight) data can be divided by 2 to approximate GPC-4D Mw results for ethylene-hexene copolymers.

The amount of hexene incorporated in the polymers (wt %) was estimated by rapid FT-IR spectroscopy on a Bruker Vertex 70 IR in reflection mode. Samples were prepared in a thin film format by evaporative deposition techniques. Weight percent hexene was obtained from the ratio of peak heights in the ranges of 1377-1382 $cm^{-1}$ to 4300-4340 $cm^{-1}$. This method was calibrated using a set of ethylene hexene copolymers with a range of known wt % hexene content.

Differential Scanning Calorimetry (DSC) measurements (DSC-Procedure-1) were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

Extensional Rheology Measurements

Strain hardening, also known as extensional thickening, can be described as the resistance of a polymer melt to stretching. It is observed as a steep increase of elongational viscosity at large strain, which deviates from the linear viscoelastic envelope.

Extensional viscosity measurements were performed using a DHR-rheometer from TA Instruments equipped with Sentmanat Extensional Rheometer (SER) fixture at Hencky strain rates: 0.01, 0.1, 1.0, and 10.0 $s^{-1}$ at temperature of 130° C.

All samples for the extensional rheology measurements have been prepared from granular reactor material using a hot press. Material granules are compressed during 2-5 min at temperatures about 190° C. Through slow cooling in the press stress-free, equilibrated samples are obtained. Homogeneous rectangular plates are cut manually from the compression molded plaque using a razor blade to produce strips with approximate dimensions (18 mm(length)×7 mm(width)×1 mm(thickness)) appropriate for uniaxial extension measurements.

It should be noted that all measurements of stress growth in this study are limited by the design features of the SER fixture. When strain reaches a value of approx. 3.5 strain units the sample starts to overlay on itself thus causing discontinuity of the measured data.

Differential Scanning Calorimetry (DSC-Procedure-2)

Melting Temperature, Tm, is measured by differential scanning calorimetry ("DSC") using a DSCQ200 unit. The sample is first equilibrated at 25° C. and subsequently heated to 180° C. using a heating rate of 10° C./min (first heat). The sample is held at 180° C. for 3 min. The sample is subsequently cooled down to 25° C. with a constant cooling rate of 10° C./min (first cool). The sample is equilibrated at 25° C. before being heated to 180° C. at a constant heating rate of 10° C./min (second heat). The exothermic peak of crystallization (first cool) is analyzed using the TA Universal Analysis software and the crystallization temperature corresponding to 10° C./min cooling rate is determined. The endothermic peak of melting (second heat) is also analyzed using the TA Universal Analysis software and the peak melting temperature (Tm) corresponding to 10° C./min heating rate is determined. In the event of conflict between the DSC Procedure-1 and DSC procedure-2, DSC procedure-2 is used.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80 µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}$=0.67 and $K_{PS}$=0.000175 while $\alpha$ and K are for other materials as calculated and published in literature (Sun, T. et al., *Macromolecules*, 2001, 34, 6812), except that for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively.

$$w2 = f * SCB/1000TC$$

The bulk composition of the polymer from the GPC-IR and GPC-4D analyses is obtained by considering the entire signals of the CH3 and CH2 channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1000TC (bulk $CH_3$end/1000TC) is obtained by weight-averaging the chain-end correction over the molecular-weight range.

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * CH3/1000TC$$

$$\text{bulk } SCB/1000TC = \text{bulk } CH3/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}.$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma\, c_i[\eta]_i}{\Sigma\, c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are weight average unless otherwise noted. All molecular weights are reported in g/mol unless otherwise noted. $C_6$ wt % is determined by IR unless otherwise specified.

Methyl groups per 1000 carbons ($CH_3$/1000 carbons) is determined by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Temperature Rising Elution Fractionation (TREF)

Temperature Rising Elution Fractionation (TREF) analysis was done using a Crystallization Elution Fractionation (CEF) instrument from Polymer Char, S. A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in FIG. 1a of this article, in which $F_c=0$, was used. Pertinent details of the analysis method and features of the apparatus used are as follows.

The solvent used for preparing the sample solution and for elution was 1,2-Dichlorobenzene (ODCB) filtered using a 0.1-μm Teflon filter (Millipore). The sample (6-16 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min.

The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer. The breadth of the composition distribution is characterized by the $T_{75}$-$T_{25}$ value. A TREF curve is produced as described above. Then the temperature at which 75% of the polymer is eluted is subtracted from the temperature at which 25% of the polymer is eluted, as determined by the integration of the area under the TREF curve. The T75-T25 value represents the difference. The closer these temperatures comes together, the narrower the composition distribution.

CFC Procedure

Cross-fractionation chromatography (CFC) analysis was done using a CFC-2 instrument from Polymer Char, S. A., Valencia, Spain. The principles of CFC analysis and a general description of the particular apparatus used are given in the article Ortin, A.; Monrabal, B.; Sancho-Tello, J. *Macromol. Symp.*, 2007, 257, 13. FIG. 1 of the article is an appropriate schematic of the particular apparatus used. Pertinent details of the analysis method and features of the apparatus used are as follows.

The solvent used for preparing the sample solution and for elution was 1,2-Dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3× PLgel 10 µm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography*; Springer, 1999. For polystyrene K=1.38×10$^{-4}$ dl/g and α=0.7; and for polyethylene K=5.05×10$^{-4}$ dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

The exemplified catalyst compounds below were prepared according to the general method described above. The following conditions were used in the polymerization runs of Examples 1-10: isohexane diluent; total reaction volume: 5 mL; polymerization temperature ($T_p$): 85° C.; ethylene partial pressure: 130 psi; no hydrogen added. The conditions used in the polymerization runs of Example 11 are set forth in Table 5.

EXAMPLES

Catalyst Compounds of the Examples

Each of the exemplary catalyst compounds below is designated using the acronym "MCN" for "metallocene."

Catalyst compound MCN1 has the structure shown immediately below:

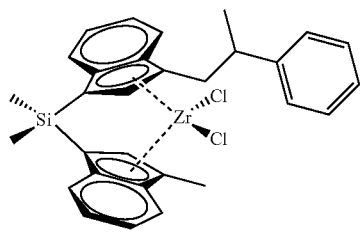

MCN1

MCN1 was obtained and used as a mixture of 4 diastereomers.

Catalyst compound MCN2 (comparative example) has the structure shown immediately below:

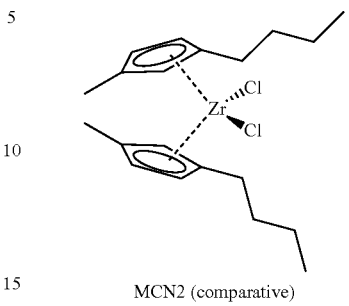

MCN2 (comparative)

MCN2 (mixture of 2 isomers) was obtained from a commercial source.

Catalyst compound MCN3 (comparative example) has the structure shown immediately below:

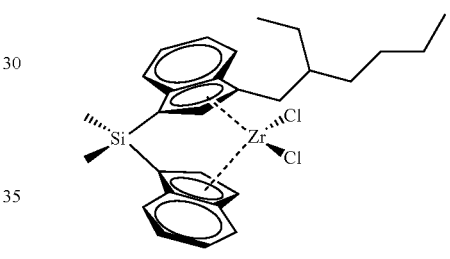

MCN3 (comparative)

MCN3 was obtained and used as a mixture of 4 diastereomers.

Catalyst compound MCN4 (comparative example) has the structure shown immediately below:

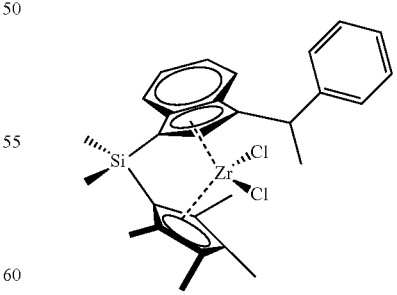

MCN4 (comparative)

MCN4 was obtained and used as a mixture of 2 diastereomers.

Catalyst compound MCN5 (comparative example) has the structure shown immediately below:

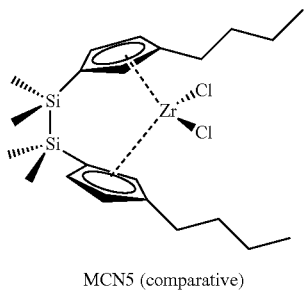

MCN5 (comparative)

MCN5 was obtained and used as a mixture of 2 isomers.

Catalyst compound MCN6 has the structure shown immediately below:

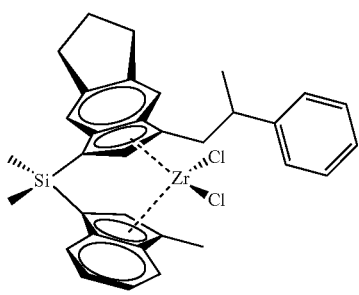

MCN6

MCN6 was obtained and used as a mixture of 4 diastereomers.

Catalyst compound MCN7 has the structure shown immediately below:

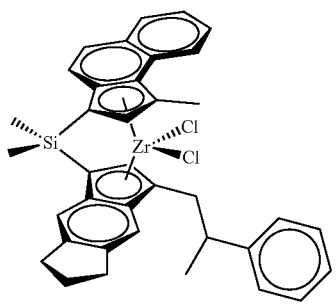

MCN7

MCN7 was obtained and used as a mixture of 4 diastereomers.

Catalyst compound MCN8 has the structure shown immediately below:

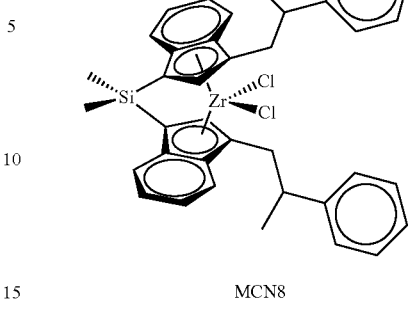

MCN8

MCN8 was obtained and used as a mixture of 6 diastereomers.

Catalyst compound MCN9 has the structure shown immediately below:

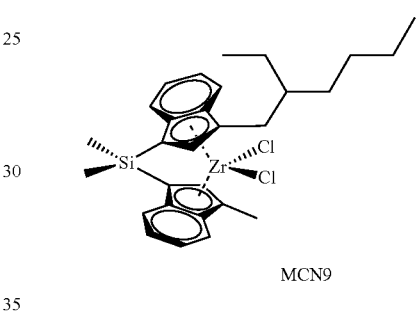

MCN9

MCN9 was obtained and used as a mixture of 4 diastereomers.

Preparation of Example Supported Catalysts

Each of the catalyst compounds MCN1, MCN3, MCN4, MCN5, MCN6, MCN7 and MCN8 was supported on ES70 silica using similar conditions. Catalyst B (comparative) was MCN2 supported on DAVISON 948 silica made in a manner analogous to that described in U.S. Pat. No. 6,180,736.

Table 2 summarizes the supported catalysts.

TABLE 2

| Supported Catalysts Prepared with Catalyst Compounds | |
|---|---|
| Supported Catalyst | Catalyst Compound/Silica |
| Catalyst A | MCN1/ES70 |
| Catalyst B (comparative) | MCN2/DAVISON 948 |
| Catalyst C (comparative) | MCN3/ES70 |
| Catalyst D (comparative) | MCN4/ES70 |
| Catalyst E (comparative) | MCN5/ES70 |
| Catalyst F | MCN6/ES70 |
| Catalyst G | MCN7/ES70 |
| Catalyst H | MCN8/ES70 |
| Catalyst I | MCN9/ES70 |

Experimental

Synthesis

Lithium indenide: To a precooled, stirring solution of indene (29.57 g, 0.255 mol) in hexane (500 mL), n-butyllithium (2.5 M in hexanes, 103 mL, 0.257 mol, 1.01 molar eq.) was added slowly. The reaction was stirred at room temperature for 23 hours. The solid was collected by filtration and washed with hexane (50 mL). The solid was concentrated under high vacuum to afford the product as a white powder (29.984 g).

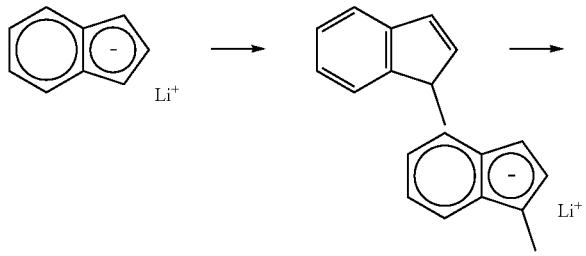

1-Methyl-1H-indene: To a precooled, stirring solution of iodomethane (4.206 g, 0.030 mol) in diethyl ether (60 mL), lithium indenide (1.235 g) was added in portions with diethyl ether (5 mL). The reaction was stirred at room temperature for 4 hours. Volatiles were removed under a stream of nitrogen and then under high vacuum. The residue was extracted with hexane (20 mL) and filtered over Celite. The extract was concentrated under a stream of nitrogen and then under high vacuum. The residue was again extracted with hexane (10 mL) and filtered over Celite. The extract was concentrated under a stream of nitrogen and then under high vacuum to afford a mixture of oil and solid. The oil was filtered over Celite and concentrated under high vacuum to afford the product as a clear, colorless oil (0.397 g).

Alternative synthesis of 1-methyl-1H-indene: To a precooled, stirring solution of iodomethane (3.476 g, 0.024 mol) in tetrahydrofuran (90 mL), a precooled solution of lithium indenide (2.389 g, 0.020 mol) in tetrahydrofuran (20 mL) was added. The reaction was stirred at room temperature for 16.5 hours. Volatiles were removed under a stream of nitrogen and then under high vacuum. The residue was extracted with hexane (40 mL) and filtered over Celite. The extract was concentrated under a stream of nitrogen and then under high vacuum. The residue was extracted again with hexane (10 mL) and filtered over Celite. The extract was concentrated under a stream of nitrogen and then under high vacuum to afford a mixture of oil and solid. The oil was separated from the solid by pipette to afford the product as a clear, colorless oil (0.972 g, mixture of isomers).

Lithium 1-methyl-1H-inden-1-ide: To a precooled, stirring solution of 1-methyl-1H-indene (1.637 g, 0.012 mol) in hexane (20 mL), n-butyllithium (2.5 M in hexanes, 4.9 mL, 0.012 mol, 1.05 eq.) was added. The reaction was stirred at room temperature for 2.5 hours. The reaction was filtered, and the solid was concentrated under high vacuum to afford the product as a white solid, containing diethyl ether (0.01 eq.) and hexane (0.18 eq.) (1.622 g).

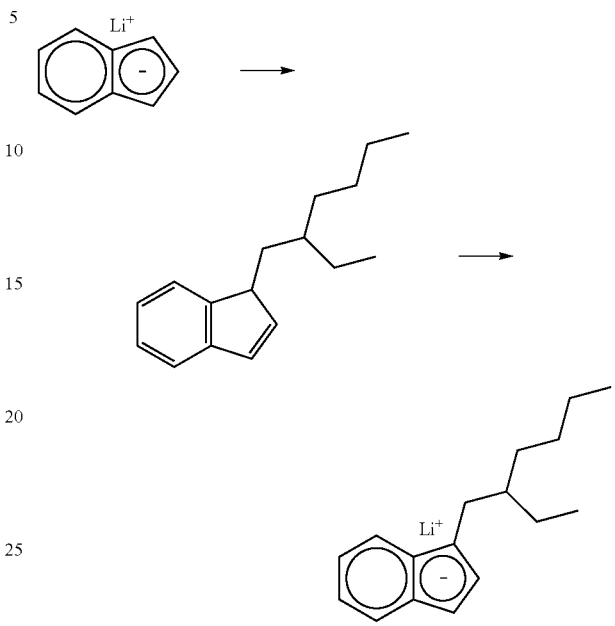

1-(2-ethylhexyl)-1H-indene: To a stirring solution of lithium indenide (2.234 g, 0.018 mol) in tetrahydrofuran (40 mL), 2-ethylhexylbromide (3.3 mL, 0.019 mol, 1.01 eq.) was added. The reaction was stirred and heated to 60° C. for 19 hours. Volatiles were removed under a stream of nitrogen and then under high vacuum. The residue was stirred in hexane (15 mL), to facilitate precipitation, and concentrated under high vacuum. The residue was then extracted with hexane and filtered over Celite. The hexane extract was concentrated under a stream of nitrogen and then under high vacuum to afford the product as an orange oil (3.923 g; 1:1.4 ratio of $sp^2$:$sp^3$ substituted products).

Lithium 1-(2-ethylhexyl)-1H-inden-1-ide: To a precooled, stirring solution of 3-(2-ethylhexyl)-1H-indene (0.886 g, 0.004 mol) in diethyl ether (15 mL), n-butyllithium (2.5 M in hexanes, 1.6 mL, 0.004 mol, 1.03 eq.) was added. The reaction was stirred at room temperature for 2 hours. Volatiles were removed under a stream of nitrogen and then under high vacuum to afford the product as an oil, containing diethyl ether (0.07 eq.) and hexane (0.26 eq.) (1.020 g).

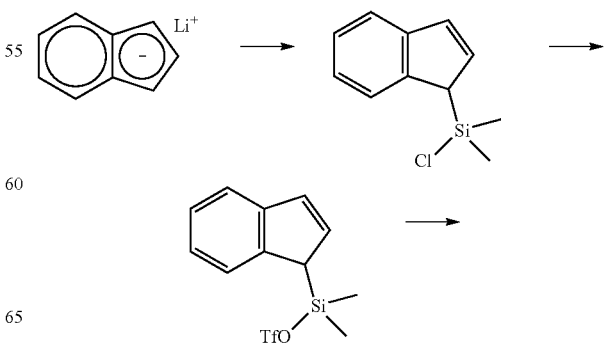

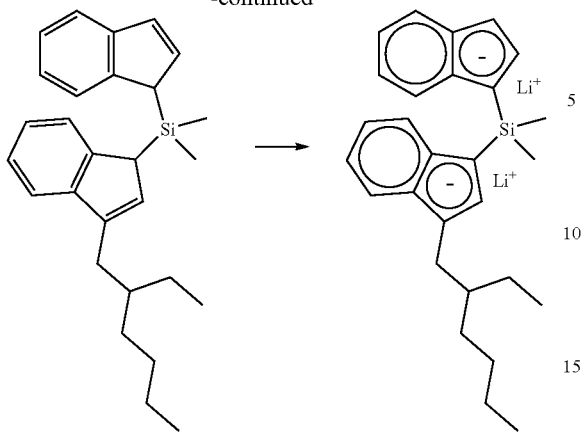

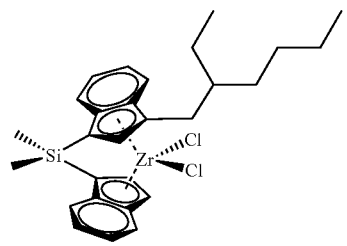

Chloro(1H-inden-1-yl)dimethylsilane: To a stirring solution of dichlorodimethylsilane (8.026 g, 0.062 mol, 15.1 eq.) in diethyl ether (20 mL), lithium indenide (0.503 g, 0.004 mol) was added. The reaction was stirred at room temperature for 15 hours. Volatiles were removed under a stream of nitrogen and then under high vacuum. The residue was extracted with hexane (3×10 mL) and filtered over Celite. The combined hexane extracts were concentrated under a stream of nitrogen and then under high vacuum to afford the product as a colorless liquid (0.752 g).

(1H-Inden-1-yl)dimethylsilyl trifluoromethanesulfonate: To a stirring suspension of silver (I) trifluoromethanesulfonate (0.939 g, 0.004 mol, 1.02 eq.) in toluene (10 mL), a solution of chloro(1H-inden-1-yl)dimethylsilane (0.752 g, 0.004 mol) in toluene (10 mL) was added. The reaction was stirred at room temperature for 15 minutes. The reaction was filtered over Celite. The filtrate was concentrated under high vacuum at 35° C. The residue was extracted with hexane (20 mL) and filtered over Celite. The hexane extract was concentrated under a stream of nitrogen and then under high vacuum to afford the product as a colorless oil, containing hexane (0.46 eq.) (0.932 g).

(3-(2-ethylhexyl)-1H-inden-1-yl)(1H-inden-1-yl)dimethylsilane: To a stirring solution of lithium 3-(2-ethylhexyl)-1H-inden-1-ide (0.677 g, 0.003 mol) in hexane (30 mL), (1H-inden-1-yl)dimethylsilyl trifluoromethanesulfonate (0.932 g, 0.003 mol, 1.01 eq.). The reaction was stirred at room temperature for 18 hours. The reaction was filtered over Celite, and the filtered solid was further extracted with hexane (10 mL). The combined hexane extracts were concentrated under a stream of nitrogen and then under high vacuum to afford the product as an amber oil, containing diethyl ether (0.07 eq.) (1.039 g).

Lithium 1-((1H-inden-1-id-1-yl)dimethylsilyl)-3-(2-ethylhexyl)-1H-inden-1-ide: To a precooled, stirring solution of (3-(2-ethylhexyl)-1H-inden-1-yl)(1H-inden-1-yl)dimethylsilane (1.039 g, 0.003 mol) in diethyl ether (20 mL), n-butyllithium (2.5 M in hexanes, 2.1 mL, 0.005 mol, 2.05 eq.) was added. The reaction was stirred at room temperature for 78 minutes. Volatiles were removed under a stream of nitrogen and then under high vacuum. The residue was stirred in hexane (20 mL) and then cooled to −35° C. The cold hexane supernatant was decanted away, and the remaining solid was concentrated under high vacuum to afford the product, containing diethyl ether (0.67 eq.) (0.750 g).

Dimethylsilyl (3-(2-ethyl-hexyl)-indenyl) (indenyl) zirconium dichloride (MCN3): To a stirring solution of lithium 1-((1H-inden-1-id-1-yl)dimethylsilyl)-3-(2-ethylhexyl)-1H-inden-1-ide (0.750 g, 0.002 mol) in diethyl ether (20 mL), zirconium(IV) chloride (0.436 g, 0.002 mol, 1.15 eq.) was added with diethyl ether (10 mL). The reaction was stirred at room temperature for 3.5 hours. Volatiles were removed under a stream of nitrogen and then under high vacuum. The residue was extracted with dichloromethane (3×10 mL) and filtered over Celite. The combined dichloromethane extracts were concentrated under a stream of nitrogen and then under high vacuum to give a red-brown foam. The foam was extracted with hexane (20 mL). The hexane extract was concentrated under a stream of nitrogen to about half volume and then cooled to −35° C. The precipitate was collected and concentrated under high vacuum to give an orange solid. The orange solid was extracted with hexane (2×5 mL), and the hexane extracts of the orange solid were concentrated under a stream of nitrogen and then under high vacuum to give the first fraction of product (0.175 g, 19%, mixture of four diastereomers). The hexane washed orange solid was concentrated under high vacuum to give the second fraction of product (0.050 g, 5%, mixture of four diastereomers). $^1$H NMR (400 MHz, $CD_2Cl_2$): δ 7.63-6.85 (m, 36H), 6.12 (d, 1H, J=3.3 Hz), 6.12 (d, 1H, J=3.3 Hz), 5.98 (d, 2H, J=3.2 Hz), 5.73 (s, 2H), 5.70 (s, 2H), 2.84-2.59 (m, 6H), 2.48-2.37 (m, 2H), 1.57-1.41 (m, 4H), 1.37 (s, 6H), 1.34-0.73 (m, 74H).

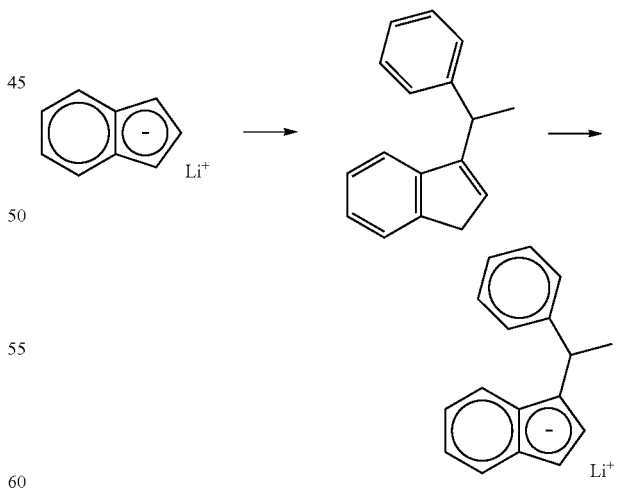

3-(1-Phenylethyl)-1H-indene: To a precooled, stirring solution of lithium indenide (2.087 g, 0.017 mol) in tetrahydrofuran (30 mL), a solution of (1-bromoethyl)benzene (3.163 g, 0.017 mol) in tetrahydrofuran (10 mL) was added. The reaction was stirred and heated to 58° C. for 16 hours. Volatiles were removed under a stream of nitrogen and then under high vacuum. The residue was extracted with pentane (15 mL) and filtered over Celite. The pentane extract was concentrated under a stream of nitrogen and then under high vacuum to afford the product, containing residual tetrahydrofuran (0.15 eq.) (2.678 g, mixture of isomers).

Lithium 1-(1-phenylethyl)-1H-inden-1-ide: To a precooled, stirring solution of 3-(1-phenylethyl)-1H-indene (0.835 g, 0.004 mol, mixture of isomers) in diethyl ether (30 mL), n-butyllithium (2.5 M in hexane, 1.5 mL, 0.004 mol) was added. The reaction was stirred at room temperature for 30 minutes. Volatiles were removed under a stream of nitrogen and then under high vacuum. The residue was washed with pentane and concentrated under high vacuum to afford the product containing residual diethyl ether (0.10 eq.) and pentane (0.15 eq.) (0.902 g).

Lithium 1-(dimethyl(2,3,4,5-tetramethylcyclopenta-2,4-dien-1-ide-1-yl)silyl)-3-(1-phenylethyl)-1H-inden-1-ide: To a precooled, stirring solution of dimethyl(3-(1-phenylethyl)-1H-inden-1-yl)(2,3,4,5-tetramethylcyclopenta-2,4-dien-1-yl)silane (0.688 g, 0.002 mol) in diethyl ether (30 mL), n-butyllithium (2.5M in hexanes, 1.4 mL, 0.004 mol, 2.1 eq.) was added. The reaction was stirred at room temperature for 100 minutes. Volatiles were removed under a stream of nitrogen and then under high vacuum. The residue was washed with pentane (10 mL) and concentrated under high vacuum to afford the product as a white powder, containing diethyl ether (1.49 eq.) and pentane (0.56 eq.) (0.692 g).

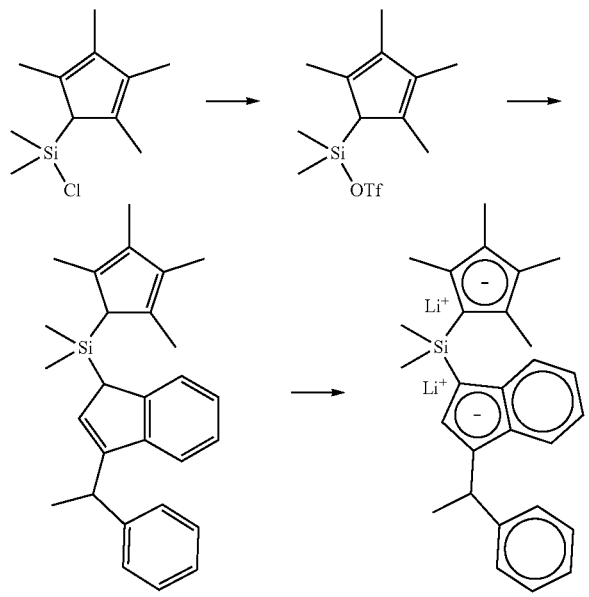

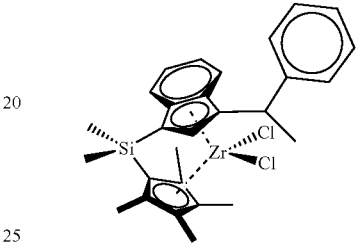

Dimethyl(2,3,4,5-tetramethylocyclopenta-2,4-dien-1-yl) silyl trifluoromethanesulfonate: To a precooled, stirring solution of silver (I) trifluoromethanesulfonate (0.610 g, 0.002 mol, 1.01 eq.) in toluene (15 mL), chlorodimethyl(2,3,4,5-tetramethylcyclopenta-2,4-dien-1-yl)silane (0.505 g, 0.002 mol) was added with toluene (5 mL). The reaction was stirred at room temperature for 65 minutes. The reaction was filtered over Celite. The filtrate was concentrated under high vacuum at 40° C. to afford the product as a clear, colorless oil (0.531 g).

Dimethyl(3-(1-phenylethyl)-1H-inden-1-yl)(2,3,4,5-tetramethylcyclopenta-2,4-dien-1-yl)silane: To a precooled, stirring solution of dimethyl(2,3,4,5-tetramethylcyclopenta-2,4-dien-1-yl)silyl trifluoromethanesulfonate (0.531 g, 0.002 mol) in diethyl ether (15 mL), lithium 1-(1-phenylethyl)-1H-inden-1-ide (0.441 g, 0.002 mol, 1.21 eq.) was added with diethyl ether (10 mL). The reaction was stirred at room temperature for 29 minutes. Volatiles were removed under a stream of nitrogen and then under high vacuum. The residue was extracted with pentane (10 mL, then 20 mL) and filtered over Celite. The combined pentane extracts were concentrated under a stream of nitrogen and then under high vacuum to afford the product as an orange oil, containing pentane (0.19 eq.) (0.688 g).

Dimethylsilyl (3-(1-phenylethyl)-indenyl) (tetramethylcyclopentadienyl) zirconium(IV) dichloride (MCN4): To a precooled, stirring suspension of lithium 1-(dimethyl(2,3,4,5-tetramethylcyclopenta-2,4-dien-1-ide-1-yl)silyl)-3-(1-phenylethyl)-1H-inden-1-ide (0.692 g, 0.001 mol) in diethyl ether (30 mL), zirconium(IV) chloride (0.287 g, 0.001 mol, 1 eq.) was added with diethyl ether (10 mL). The reaction was stirred at room temperature for 19 hours. Volatiles were removed under a stream of nitrogen and then under high vacuum. The residue was extracted with dichloromethane (15 mL) and filtered over Celite. The extract was concentrated under a stream of nitrogen and then under high vacuum to give a yellow-orange foam. The foam was washed with pentane (2×10 mL) and concentrated under high vacuum to afford the product as a yellow powder (0.412 g, 59%, as a 1:1.9 ratio of diastereomers A and B). $^1$H NMR (400 MHz, CD$_2$Cl$_2$): δ 7.97 (dt, 1H, J=8.8, 1.0 Hz, A), 7.50 (dt, 1H, J=8.7, 1.1 Hz, A), 7.41 (dt, 1H, J=8.7, 1.0 Hz, B), 7.34 (ddd, 1H, J=8.8, 6.7, 1.0 Hz, A), 7.28-7.01 (m, 6H from A, 7H from B), 6.95 (ddd, 1H, J=8.6, 6.3, 1.5 Hz, B), 5.98 (s, 1H, B, used for isomer ratio), 5.47 (s, 1H, A, used for isomer ratio), 4.60 (q, 1H, J=7.3 Hz, A), 4.53 (q, 1H, J=6.9 Hz, B), 1.99 (s, 3H, B), 1.97 (s, 3H, B), 1.96 (s, 3H, A), 1.94 (s, 3H, B), 1.93 (s, 3H, A), 1.92 (s, 3H, B), 1.90 (s, 3H, A), 1.89 (d, 3H, J=7.3 Hz, A), 1.72 (s, 3H, A), 1.52 (d, 3H, J=6.9 Hz, B), 1.18 (s, 3H, B), 1.12 (s, 3H, A), 1.05 (s, 3H, B), 0.83 (s, 3H, A).

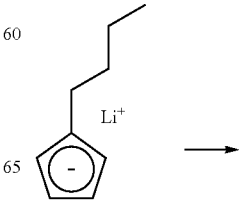

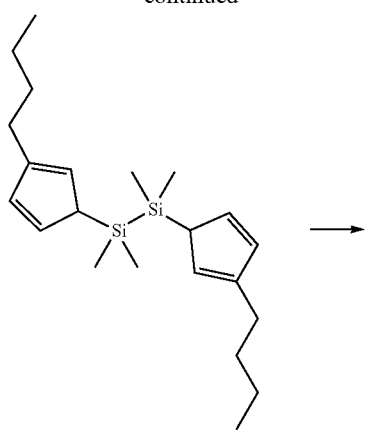

1,2-Bis(3-butylcyclopenta-2,4-dien-1-yl)-1,1,2,2-tetramethyldisilane: To a precooled, stirring solution of lithium 1-butylcyclopentadienide (0.589 g, 4.60 mmol, 2 eq.) in tetrahydrofuran (10 mL), a precooled solution of 1,2-dichloro-1,1,2,2-tetramethyldisilane (0.430 g, 2.30 mmol) in tetrahydrofuran (5 mL) was added. The reaction was stirred at room temperature for 24 hours. Volatiles were removed under a stream of nitrogen and then under high vacuum. The residue was extracted with hexane and filtered over Celite. The extract was concentrated under a stream of nitrogen and then under high vacuum to afford the product (0.542 g).

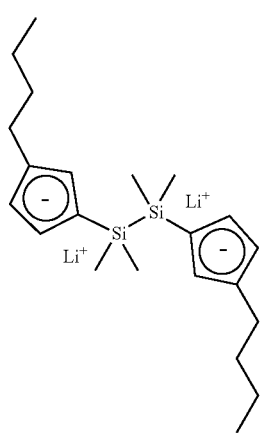

Lithium 1,1'-(1,1,2,2-tetramethyldisilane-1,2-diyl)bis(3-butylcyclopenta-2,4-dien-1-ide): To a precooled, stirring solution of 1,2-bis(3-butylcyclopenta-2,4-dien-1-yl)-1,1,2,2-tetramethyldisilane (0.542 g, 1.5 mmol) in diethyl ether (10 mL), n-butyllithium (2.5 M in hexanes, 1.24 mL, 3.1 mmol, 2.05 eq.) was added. The reaction was stirred at room temperature for 16 hours. Volatiles were removed under a stream of nitrogen and then under high vacuum. The residue was washed with hexane (3×5 mL) and concentrated under high vacuum to afford the product as a solid (0.537 g).

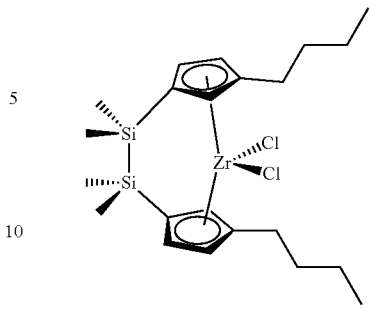

Tetramethyldisilylene Bis(3-n-butylcyclopentadienyl) zirconium(IV) chloride (MCN5): To a precooled, stirring suspension of zirconium (IV) chloride (0.343 g, 1.48 mmol, 1.02 eq.) in diethyl ether (10 mL), a precooled solution of lithium 1,1'-(1,1,2,2-tetramethyldisilane-1,2-diyl)bis(3-butylcyclopenta-2,4-dien-1-ide) (0.537 g, 1.45 mmol) in diethyl ether (20 mL) was added. The reaction was stirred at room temperature for 17 hours. Volatiles were removed under a stream of nitrogen and then under high vacuum. The residue was extracted with hexane. The hexane extract was concentrated under a stream of nitrogen and then high vacuum. The hexane extract was dissolved in hexane and cooled to −35° C. The precipitate was collected and washed with minimal cold hexane (5×1 mL). The cold hexane washed solid was concentrated under high vacuum to afford the product as a white solid (0.087 g, 11%, 1:4 ratio of diastereomers A and B). $^1$H NMR (400 MHz, C$_6$D$_6$): δ 6.50 (t, 2H, J=2.1 Hz, A, used for isomer ratio), 6.48 (dd, 2H, J=3.1, 2.3 Hz, B, used for isomer ratio), 6.33 (t, 2H, J=2.2 Hz, B), 6.26 (dd, 2H, J=3.1, 2.0 Hz, B), 6.25-6.23 (m, 2H, A), 6.19 (dd, 2H, J=3.1, 2.3 Hz, A), 2.99-2.77 (m, 4H of A, 2H of B), 2.73-2.63 (m, 2H, B), 1.62-1.41 (m, 4H each of A and B), 1.33-1.21 (m, 4H each of A and B), 0.90-0.80 (m, 6H each of A and B), 0.28 (s, 6H, A), 0.28 (s, 6H, B), 0.27 (s, 6H, B), 0.24 (s, 6H, A).

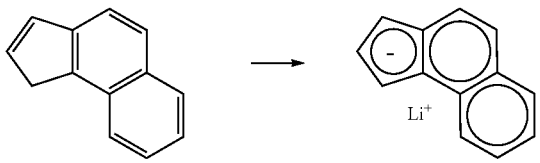

Lithium 1H-cyclopenta[a]naphthalen-1-ide: To a stirring solution of 1H-cyclopenta[a]naphthalene (3.038 g, 0.018 eq.) in diethyl ether (40 mL), n-butyllithium (2.5 M in hexanes, 7.4 mL, 0.019 mol, 1.01 eq.) was added. The reaction was stirred at room temperature for 55 minutes. Volatiles were removed under a stream of nitrogen and then under high vacuum. The residue was washed with hexane (10 mL) and filtered. The filtered solid was collected and concentrated under high vacuum to afford the product as a white solid, containing diethyl ether (0.02 eq.) and hexane (0.02 eq.) (3.110 g).

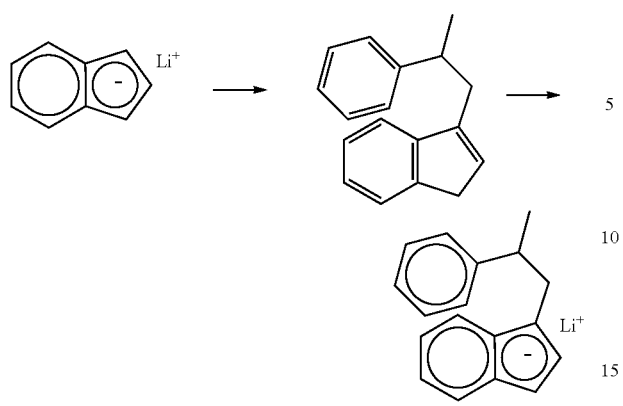
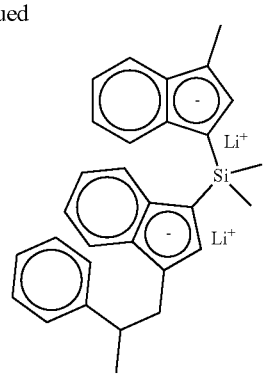

3-(2-Phenylpropyl)-1H-indene: To a precooled, stirring solution of lithium indenide (1.719 g, 0.014 mol) in tetrahydrofuran (30 mL), a solution of (1-bromopropan-2-yl)benzene (2.810 g, 0.014 mol, 1 eq.) in tetrahydrofuran (10 mL) was added. The reaction was stirred and heated to 60° C. for 16.5 hours. Volatiles were removed under a stream of nitrogen and then under high vacuum. The residue was extracted with pentane (20 mL, then 10 mL) and filtered over Celite. The combined pentane extracts were concentrated under a stream of nitrogen and then under high vacuum to afford the product as an amber oil, containing pentane (0.06 eq.) (3.390 g).

Lithium 1-(2-phenylpropyl)-1H-inden-1-ide: To a stirring solution of 3-(2-phenylpropyl)-1H-indene (0.740 g, 0.003 mol) in diethyl ether (20 mL), n-butyllithium (2.5 M in hexanes, 1.3 mL, 0.003 mol, 1.03 eq.) was added. The reaction was stirred at room temperature for 38 minutes. Volatiles were removed under a stream of nitrogen and then under high vacuum to afford the product as an orange oil, containing diethyl ether (0.18 eq.) and hexane (0.35 eq.) (0.808 g).

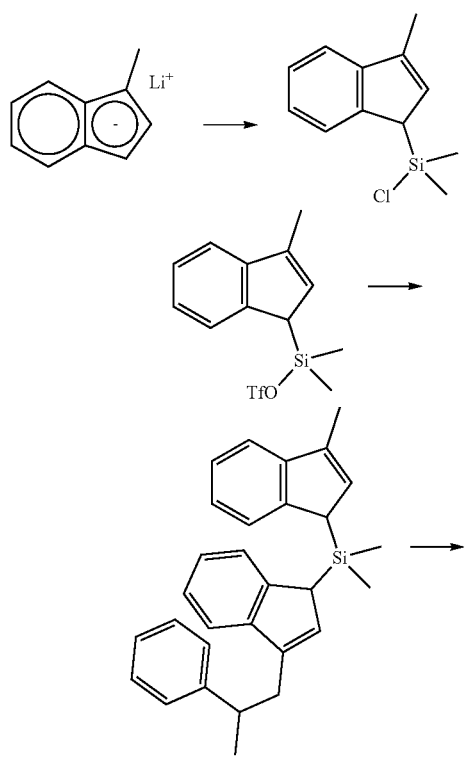

Chlorodimethyl(3-methyl-1H-inden-1-yl)silane: To a stirring solution of lithium 1-methyl-1H-inden-1-ide (0.365 g, 0.002 mol) in diethyl ether (20 mL), dichlorodimethylsilane (4.3 mL, 0.036 mol, 14.9 eq.) was added rapidly. The reaction was stirred at room temperature for 15 minutes. Volatiles were removed under a stream of nitrogen and then under high vacuum. The residue was extracted with hexane (10 mL, then 5 mL) and filtered over Celite. The combined hexane extracts were concentrated under a stream of nitrogen and then under high vacuum to afford the product as an oil (0.428 g).

Dimethyl(3-methyl-1H-inden-1-yl)silyl trifluoromethanesulfonate: To a stirring solution of chlorodimethyl(3-methyl-1H-inden-1-yl)silane (0.428 g, 0.002 mol) in toluene (5 mL), silver (I) trifluoromethanesulfonate was added (0.494 g, 0.002 mol, 1 eq.) was added with toluene (10 mL). The reaction was stirred at room temperature for 30 minutes. The reaction was filtered over Celite. The filtrate was concentrated under high vacuum. The residue was extracted with pentane (15 mL) and filtered over Celite. The pentane extract was concentrated under a stream of nitrogen and then under high vacuum to afford the product as a pale yellow oil (0.481 g).

Dimethyl(3-methyl-1H-inden-1-yl)(3-(2-phenylpropyl)-1H-inden-1-yl)silane: To a stirring solution of lithium 1-(2-phenylpropyl)-1H-inden-1-ide (0.400 g, 0.001 mol, 1 eq.) in diethyl ether (10 mL), a solution of dimethyl(3-methyl-1H-inden-1-yl)silyl trifluoromethanesulfonate (0.481 g, 0.001 mol) in diethyl ether (10 mL) was added. The reaction was stirred at room temperature for 27 minutes. Volatiles were removed under a stream of nitrogen and then under high vacuum. The residue was extracted with pentane (20 mL) and filtered over Celite. The pentane extract was concentrated under a stream of nitrogen and then under high vacuum to afford the product as an oil (0.477 g).

Lithium 1-(dimethyl(3-(2-phenylpropyl)-1H-inden-1-id-1-yl)silyl)-3-methyl-1H-inden-1-ide: To a stirring solution of dimethyl(3-methyl-1H-inden-1-yl)(3-(2-phenylpropyl)-1H-inden-1-yl)silane (0.477 g, 0.001 mol) in diethyl ether (20 mL), n-butyllithium (2.5M in hexanes, 0.91 mL, 0.002 mol, 2.01 eq.) was added. The reaction was stirred at room temperature for 60 minutes. Volatiles were removed under a stream of nitrogen and then under high vacuum to afford the product as an oil, containing diethyl ether (1.71 eq.) and hexane (0.93 eq.) (0.620 g).

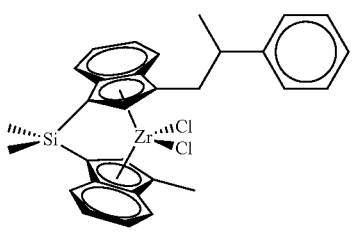

Dimethylsilyl (3-methyl-indenyl) (3-(2-phenyl-propyl)-indenyl) zirconium dichloride (MCN1): To a stirring solution of lithium 1-(dimethyl(3-(2-phenylpropyl)-1H-inden-1-id-1-yl)silyl)-3-methyl-1H-inden-1-ide (0.620 g, 0.001 mol) in diethyl ether (20 mL), zirconium (IV) chloride (0.233 g, 0.001 mol, 1 eq.) was added. The reaction was stirred at room temperature for 4 hours. Volatiles were removed under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to give a brown foam. The foam was washed with pentane (10 mL, then 5 mL) and concentrated under high vacuum to afford the product as an orange powder (0.378 g, 65%, ratio of 1:1.1:1.7:1.8 isomers A, B, C, and D)). $^1$H NMR (400 MHz, $CD_2Cl_2$): δ 7.53-6.83 (m, 52H) 5.72 (s, 1H), 5.71 (s, 2H), 5.57 (s, 1H), 5.54 (s, 1H), 5.48 (s, 1H), 5.33 (s, 1H), 5.15 (s, 1H), 3.22-2.74 (m, 12H), 2.41 (d, 3H, J=0.5 Hz, isomer D, used for isomer ratio), 2.39 (d, 3H, J=0.5 Hz, isomer C, used for isomer ratio), 2.27 (d, 3H, J=0.5 Hz, isomer B, used for isomer ratio), 2.26 (d, 3H, J=0.6 Hz, isomer A, used for isomer ratio), 1.36 (s, 3H), 1.32 (s, 3H), 1.28 (d, 3H, J=6.8 Hz), 1.24 (d, 3H, J=6.8 Hz), 1.21 (d, 3H, J=6.7 Hz), 1.17 (d, 3H, J=6.9 Hz), 1.09 (s, 3H), 1.08 (s, 3H), 1.06 (s, 3H), 0.96 (s, 3H), 0.87 (s, 3H), 0.74 (s, 3H).

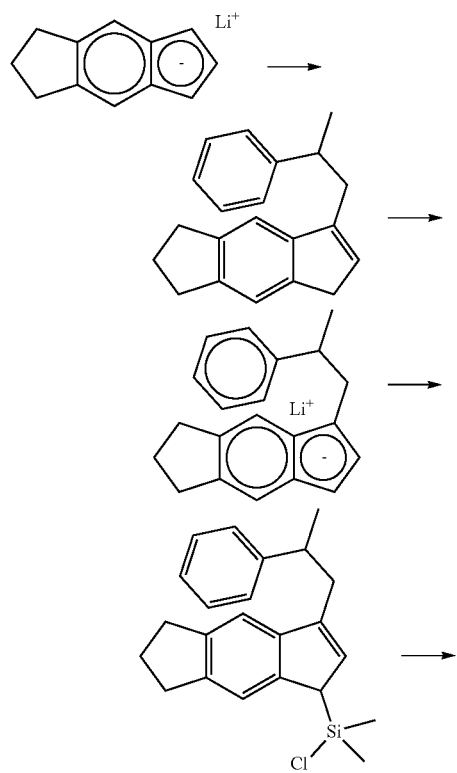

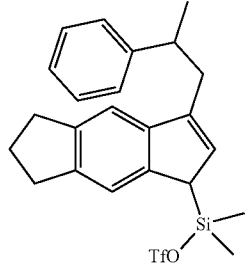

7-(2-Phenylpropyl)-1,2,3,5-tetrahydro-s-indacene: To a stirring solution of lithium 1,5,6,7-tetrahydro-s-indacen-1-ide (1.787 g, 0.006 mol) in tetrahydrofuran (20 mL), (1-bromopropan-2-yl)benzene (1.200 g, 0.006 mol, 1 eq.) was added. The reaction was stirred and heated to 60° C. for 16.5 hours. Volatiles were removed under a stream of nitrogen and then under high vacuum. The residue was stirred in diethyl ether (20 mL) and then concentrated under a stream of nitrogen and then under high vacuum. The residue was extracted with pentane (2×10 mL) and filtered over Celite. The combined pentane extracts were concentrated under a stream of nitrogen and then under high vacuum to afford the product (1.595 g).

Lithium 3-(2-phenylpropyl)-1,5,6,7-tetrahydro-s-indacen-1-ide: To a precooled, stirring solution of 7-(2-phenylpropyl)-1,2,3,5-tetrahydro-s-indacene (0.800 g, 0.003 mol) in diethyl ether (15 mL), n-butyllithium (2.5 M in hexanes, 1.2 mL, 0.003 mol, 1.03 eq.) was added. The reaction was stirred at room temperature for 1.5 hours. Volatiles were removed under a stream of nitrogen and then under high vacuum. The residue was washed with hexane (20 mL) and concentrated under high vacuum to afford the product as an off-white foam, containing diethyl ether (0.03 eq.) and hexane (0.29 eq.) (0.909 g).

Chlorodimethyl(3-(2-phenylpropyl)-1,5,6,7-tetrahydro-s-indacen-1-yl)silane: To a stirring solution of lithium 3-(2-phenylpropyl)-1,5,6,7-tetrahydro-s-indacen-1-ide (0.909 g, 0.003 mol) in diethyl ether (10 mL), dichlorodimethylsilane (5.4 mL, 0.045 mol, 15.1 eq.) was added rapidly. The reaction was stirred at room temperature for 16 hours. Volatiles were removed under a stream of nitrogen and then under high vacuum. The residue was extracted with pentane (2×10 mL) and filtered over Celite. The combined pentane extracts were concentrated under a stream of nitrogen and then under high vacuum to afford the product as an orange oil (0.951 g).

Dimethyl(3-(2-phenylpropyl)-1,5,6,7-tetrahydro-s-indacen-1-yl)silyl trifluoromethanesulfonate: To a stirring solution of chlorodimethyl(3-(2-phenylpropyl)-1,5,6,7-tetrahydro-s-indacen-1-yl)silane (0.951 g, 0.003 mol) in toluene (10 mL), silver (I) trifluoromethanesulfonate (0.657 g, 0.003 mol, 0.99 eq.) was added with toluene (10 mL). The reaction was stirred at room temperature for 15 minutes. The reaction was filtered over Celite and concentrated under high vacuum at 45° C. to afford the product.

Dimethyl(3-methyl-1H-inden-1-yl)(3-(2-phenylpropyl)-1,5,6,7-tetrahydro-s-indacen-1-yl)silane: To a stirring solution of dimethyl(3-(2-phenylpropyl)-1,5,6,7-tetrahydro-s-indacen-1-yl)silyl trifluoromethanesulfonate in diethyl ether (20 mL), lithium 1-methyl-1H-inden-1-ide (0.395 g, 0.003 mol, 1 eq.) was added with diethyl ether (10 mL). The reaction was stirred at room temperature for 2 hours. Volatiles were removed under a stream of nitrogen and then under high vacuum. The residue was extracted with pentane (2×10 mL) and filtered over Celite. The combined pentane extracts were concentrated under a stream of nitrogen and then under high vacuum to afford the product as a foam (0.949 g, two step yield).

Lithium 1-(dimethyl(3-methyl-1H-inden-1-id-1-yl)silyl)-3-(2-phenylpropyl)-1,5,6,7-tetrahydro-s-indacen-1-ide: To a stirring solution of dimethyl(3-methyl-1H-inden-1-yl)(3-(2-phenylpropyl)-1,5,6,7-tetrahydro-s-indacen-1-yl)silane (0.949 g, 0.002 mol) in diethyl ether (20 mL), n-butyllithium (2.5 M in hexanes, 1.7 mL, 0.002 mol, 2.06 eq.) was added. The reaction was stirred at room temperature for 46 minutes. Volatiles were removed under a stream of nitrogen and then under high vacuum. The residue was washed with hexane (10 mL) and concentrated under high vacuum to afford the product as a pale orange foam, containing diethyl ether (0.72 eq.) and hexane (0.35 eq.) (0.890 g).

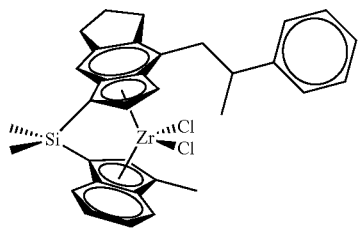

Dimethylsilyl (3-methyl-indenyl) (3-(2-phenyl-propyl)-1,5,6,7-tetrahydro-s-indacenyl) zirconium dichloride (MCN6): To a stirring solution of lithium 1-(dimethyl(3-methyl-1H-inden-1-id-1-yl)silyl)-3-(2-phenylpropyl)-1,5,6,7-tetrahydro-s-indacen-1-ide (0.890 g, 0.002 mol) in diethyl ether (30 mL), zirconium (IV) chloride (0.373 g, 0.002 mol, 1 eq.) was added. The reaction was stirred at room temperature for 2.5 hours. Volatiles were removed under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to give a dark red oil. The oil was stirred in hexane (10 mL) until the precipitation of an orange solid was complete. The solid was collected and concentrated under a stream of nitrogen and then under high vacuum to afford the product as an orange powder (0.598 g, 60%, 1:1.3:3.1:4.5 ratio of isomers A, B, C, and D). $^1$H NMR (400 MHz, $CD_2Cl_2$): δ 7.53-6.83 (m, 44H), 5.73 (s, 1H), 5.71 (s, 1H), 5.62 (s, 1H), 5.54 (s, 1H), 5.46 (s, 1H), 5.45 (s, 1H), 5.23 (s, 1H), 5.06 (s, 1H), 3.20-2.60 (m, 7H), 2.39 (d, 3H, J=0.5 Hz, isomer D, used for isomer ratio), 2.37 (d, 3H, J=0.5 Hz, isomer C, used for isomer ratio), 2.29 (d, 3H, J=0.6 Hz, isomer B, used for isomer ratio), 2.28 (d, 3H, J=0.6 Hz, isomer A, used for isomer ratio), 2.13-1.87 (m, 2H), 1.34 (s, 3H), 1.31 (s, 3H), 1.28 (d, 3H, J=6.7 Hz), 1.23 (d, 3H, J=6.8 Hz), 1.19 (d, 3H, J=6.8 Hz), 1.15 (d, 3H, J=6.9 Hz), 1.07 (s, 3H), 1.07 (s, 3H), 1.04 (s, 3H), 0.94 (s, 3H), 0.85 (s, 3H), 0.72 (s, 3H).

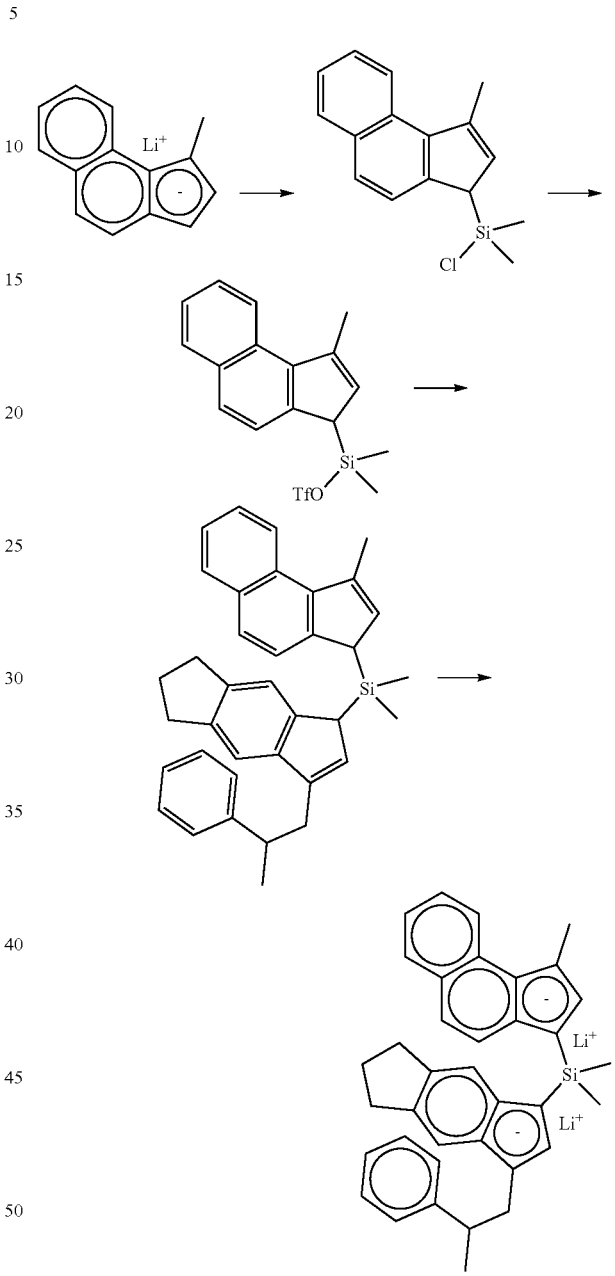

Chlorodimethyl(1-methyl-3H-cyclopenta[a]naphthalen-3-yl)silane: To a stirring solution of lithium 1-methyl-1H-cyclopenta[a]naphthalen-1-ide (containing diethyl ether (0.32 eq.) and 1,2-dimethoxyethane (0.85 eq., 0.458 g, 0.002 mol) in diethyl ether (20 mL), dichlorodimethylsilane (2.9 mL, 0.024 mol, 15.06 eq.) was added rapidly. The reaction was stirred at room temperature for 63 minutes. Volatiles were removed under a stream of nitrogen and then under high vacuum. The residue was extracted with pentane (30 mL) and filtered over Celite. The pentane extract was concentrated under a stream of nitrogen and then under high vacuum to afford the product as an orange oil (0.392 g).

Dimethyl(1-methyl-3H-cyclopenta[a]naphthalen-3-yl)silyl trifluoromethanesulfonate: To a stirring solution of chlorodimethyl(1-methyl-3H-cyclopenta[a]naphthalen-3-yl)silane (0.392 g, 0.001 mol) in toluene (10 mL), silver (I) trifluoromethanesulfonate (0.358 g, 0.001 mol, 0.97 eq.) was added. The reaction was stirred at room temperature for 15 minutes. The reaction was filtered over Celite. The filtrate was concentrated under high vacuum at 45° C. to afford the product as a dark oil, containing diethyl ether (0.02 eq.) (0.492 g).

Dimethyl(1-methyl-3H-cyclopenta[a]naphthalen-3-yl)(3-(2-phenylpropyl)-1,5,6,7-tetrahydro-s-indacen-1-yl)silane: To a stirring solution of dimethyl(1-methyl-3H-cyclopenta[a]naphthalen-3-yl)silyl trifluoromethanesulfonate (0.460 g, 0.001 mol) in diethyl ether (20 mL), a solution of lithium 1-(2-phenylpropyl)-1,5,6,7-tetrahydro-s-indacen-1-ide (0.350 g, 0.001 mol, 1 eq.) in diethyl ether (20 mL) was added. The reaction was stirred at room temperature for 15 hours. Volatiles were removed under a stream of nitrogen and then under high vacuum. The residue was extracted with pentane (40 mL) and filtered over Celite. The pentane extract was concentrated under a stream of nitrogen and then under high vacuum to afford the product as a yellow-white foam (0.542 g).

Lithium 3-(dimethyl(3-(2-phenylpropyl)-6,7-dihydro-s-indacen-1-id-1(5H)-yl)silyl)-1-methyl-3H-cyclopenta[a]naphthalen-3-ide: To a precooled, stirring solution of dimethyl(1-methyl-3H-cyclopenta[a]naphthalen-3-yl)(3-(2-phenylpropyl)-1,5,6,7-tetrahydro-s-indacen-1-yl)silane (0.542 g, 0.001 mol), n-butyllithium (2.5M in hexanes, 0.85 mL, 0.002 mol, 2 eq.) was added. The reaction was stirred at room temperature for 30 minutes. Volatiles were removed under a stream of nitrogen and then under high vacuum. The residue was washed with hexane (10 mL) and concentrated under high vacuum to afford the product as a tan solid, containing diethyl ether (0.98 eq.) and hexane (0.6 eq.) (0.563 g).

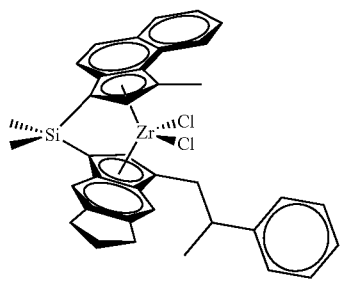

Dimethylsilyl (1-methyl-benz[e]inden-3-yl) (3-(2-phenyl-propyl)-1,5,6,7-tetrahydro-s-indacenyl) zirconium dichloride (MCN7): To a stirring solution of lithium 3-(dimethyl(3-(2-phenylpropyl)-6,7-dihydro-s-indacen-1-id-1(5H)-yl)silyl)-1-methyl-3H-cyclopenta[a]naphthalen-3-ide (0.563 g, 0.87 mmol) in diethyl ether (40 mL), zirconium (IV) chloride (0.203 g, 0.87 mmol, 1 eq.) was added. The reaction was stirred at room temperature for 75 minutes. Volatiles were removed under a stream of nitrogen and then under high vacuum. The residue was extracted with dichloromethane (5 mL, then 10 mL) and filtered over Celite. The combined dichloromethane extracts were concentrated under a stream of nitrogen and then under high vacuum. The extract was stirred in hexane and then concentrated under a stream of nitrogen and then under high vacuum to afford the product as an orange solid (0.589 g, 100%, 1:1:1.1:1.2 ratio of isomers A, B, C, and D). $^1$H NMR (400 MHz, $CD_2Cl_2$): δ 8.26-8.18 (m, 4H), 7.80-6.97 (m, 48H), 5.77 (s, 1H), 5.75 (s, 1H, isomer A, used for isomer ratio), 5.67 (s, 1H, isomer D, used for isomer ratio), 5.57 (s, 1H, isomer C, used for isomer ratio), 5.55 (s, 1H, isomer B, used for isomer ratio), 5.48 (s, 1H), 5.28 (s, 1H), 5.16 (s, 1H), 3.18-2.54 (m, 28H), 2.71 (s, 3H), 2.69 (s, 3H), 2.61 (s, 3H), 2.61 (s, 3H), 2.13-1.86 (m, 8H), 1.35 (s, 3H), 1.32 (s, 3H), 1.27 (d, 3H, J=6.7 Hz), 1.22 (d, 3H, J=6.7 Hz), 1.19 (d, 3H, J=6.8 Hz), 1.13 (d, 3H, J=6.8 Hz), 1.09 (s, 3H), 1.09 (s, 3H), 1.06 (s, 3H), 0.97 (s, 3H), 0.87 (s, 3H), 0.74 (s, 3H).

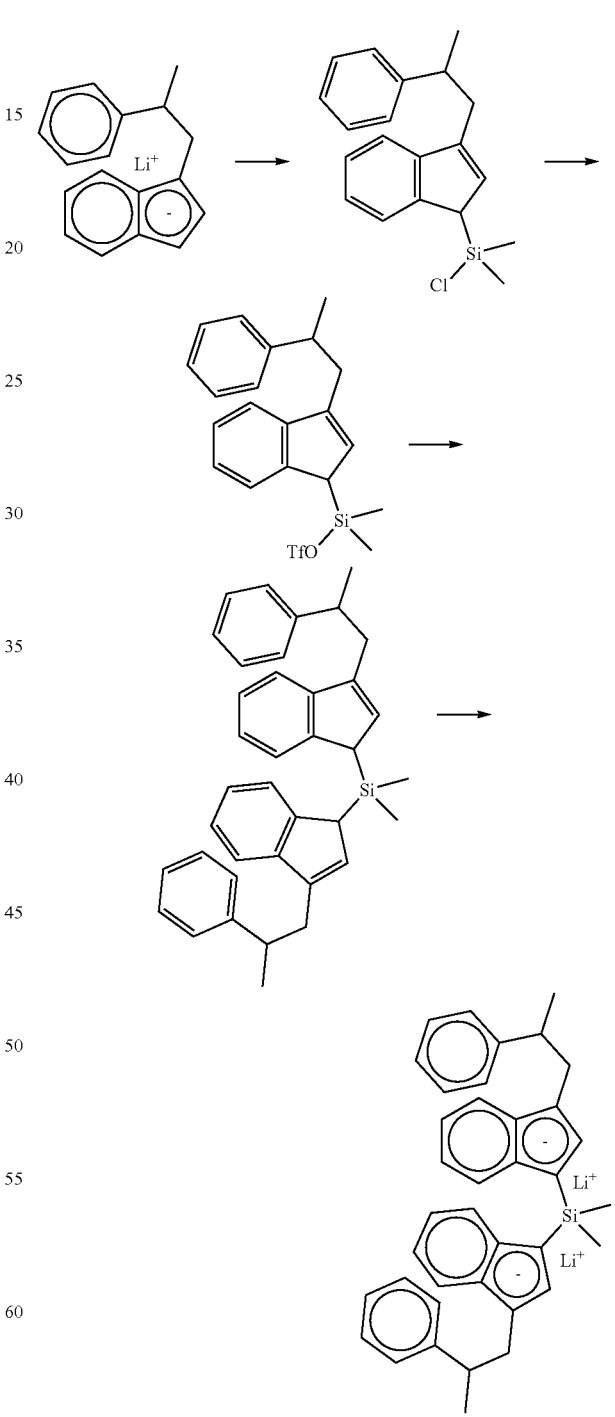

Chlorodimethyl(3-(2-phenylpropyl)-1H-inden-1-yl)silane: To a stirring solution of dichlorodimethylsilane (1.9 mL, 0.016 mol, 14.8 eq.) in diethyl ether (20 mL), lithium 1-(2-phenylpropyl)-1H-inden-1-ide (0.283 g, 0.001 mol) in diethyl ether (7.75 mL) was added. The reaction stirred at room temperature for 37 minutes. Volatiles were removed under a stream of nitrogen and then under high vacuum. The residue was extracted with pentane (10 mL, then 5 mL) and filtered over Celite. The combined pentane extracts were concentrated under a stream of nitrogen and then under high vacuum to afford the product as an orange-yellow oil, containing pentane (0.13 eq.) (0.262 g).

Dimethyl(3-(2-phenylpropyl)-1H-inden-1-yl)silyl trifluoromethanesulfonate: To a stirring solution of chlorodimethyl (3-(2-phenylpropyl)-1H-inden-1-yl)silane (0.262 g, 0.78 mmol) in toluene (10 mL), silver (I) trifluoromethanesulfonate (0.200 g, 0.78 mmol, 1 eq.) was added with toluene (5 mL). The reaction was stirred at room temperature for 55 minutes. The reaction was filtered over Celite, extracting with additional toluene (10 mL). The combined toluene extracts were concentrated under high vacuum at 45° C. to afford the product as a dark oil (0.334 g).

Dimethylbis(3-(2-phenylpropyl)-1H-inden-1-yl)silane: To a stirring solution of dimethyl(3-(2-phenylpropyl)-1H-inden-1-yl)silyl trifluoromethanesulfonate (0.334 g, 0.76 mmol) in diethyl ether (20 mL), a solution of lithium 1-(2-phenylpropyl)-1H-inden-1-ide (0.201 g, 0.76 mmol, 1 eq.) in diethyl ether (5.5 mL) was added. The reaction was stirred at room temperature for 15 hours. Volatiles were removed under a stream of nitrogen and then under high vacuum. The residue was extracted with pentane (20 mL) and filtered over Celite. The pentane extract was concentrated under a stream of nitrogen and then under high vacuum to afford the product (0.321 g).

Lithium 1,1'-(dimethylsilanediyl)bis(3-(2-phenylpropyl)-1H-inden-1-ide): To a stirring solution of dimethylbis(3-(2-phenylpropyl)-1H-inden-1-yl)silane (0.321 g, 0.61 mmol) in diethyl ether (20 mL), n-butyllithium (2.5 M in hexanes, 0.49 mL, 0.001 mol, 2 eq.) was added. The reaction was stirred at room temperature for 1 h. Additional n-butyllithium solution (0.25 mL) was required to promote formation of the product, and the reaction was stirred for 45 minutes. Volatiles were removed under a stream of nitrogen and then under high vacuum to afford the product as an off-white foam containing diethyl ether (1.04 eq.) and hexane (0.69 eq.) (0.409 g).

Dimethylsilyl bis(3-(2-phenyl-propyl)-indenyl) zirconium dichloride (MCN8): To a stirring solution of lithium 1,1'-(dimethylsilanediyl)bis(3-(2-phenylpropyl)-1H-inden-1-ide) (0.409 g, 0.61 mmol) in diethyl ether (30 mL), zirconium (IV) chloride (0.146 g, 0.63 mmol, 1.03 eq.) was added with diethyl ether (5 mL). The reaction was stirred at room temperature for 17 hours. Volatiles were removed under a stream of nitrogen and then under high vacuum. The residue was extracted with dichloromethane (20 mL) and filtered over Celite. The dichloromethane extract was concentrated under a stream of nitrogen and then under high vacuum. The dichloromethane extract was stirred in hexane (10 mL) until the precipitation of an orange solid was complete. The orange solid was collected and concentrated under high vacuum to afford the product as an orange solid (0.121 g, 29%, 1:1.3:1.5:1.6:1.7:3.1 ratio of isomers A, B, C, D, E, and F). $^1$H NMR (400 MHz, CD$_2$Cl$_2$): δ 7.51-6.80 (m, 108H), 5.68 (s, 1H, isomer E, used for isomer ratio), 5.67 (s, 1H), 5.53 (s, 2H, isomer F, used for isomer ratio), 5.44 (s, 2H, isomer C, used for isomer ratio), 5.29 (s, 1H, isomer B, used for isomer ratio), 5.28 (s, 1H), 5.13 (s, 2H, isomer D, used for isomer ratio), 5.05 (s, 2H, isomer A, used for isomer ratio), 3.20-2.69 (m, 36H), 1.36-0.58 (m, 72H).

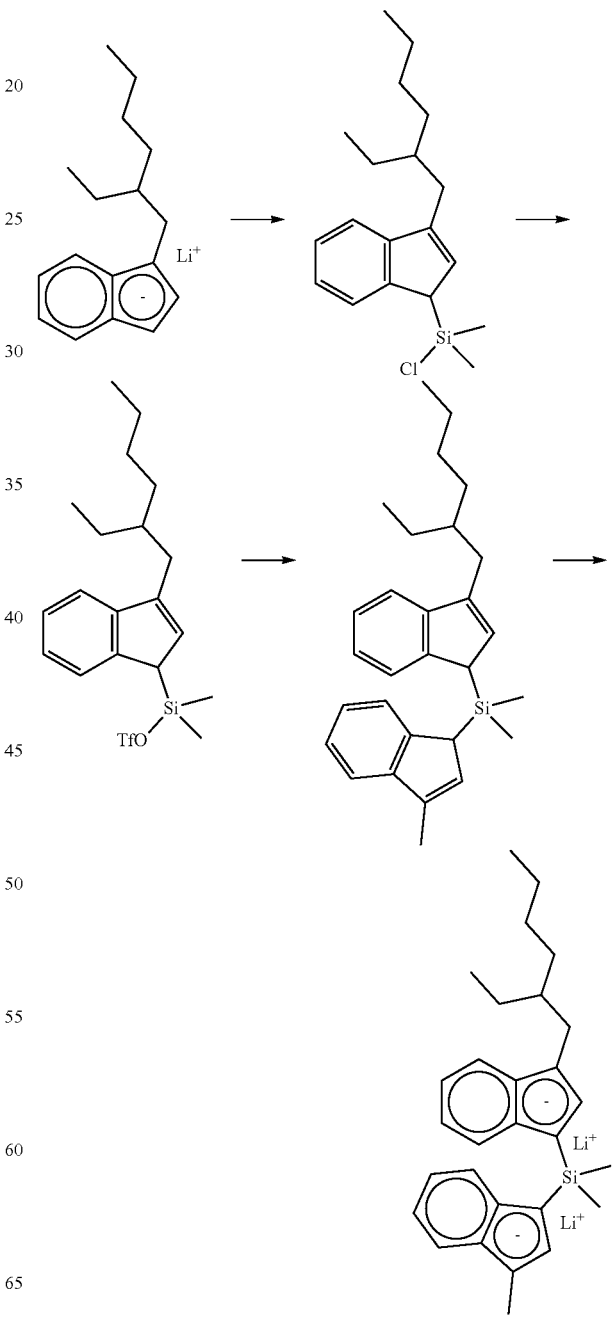

Chloro(3-(2-ethylhexyl)-1H-inden-1-yl)dimethylsilane: To a stirring solution of dichlorodimethylsilane (12.0 mL, 99.5 mmol, 14 eq.) in diethyl ether (20 mL), a solution of lithium 1-(2-ethylhexyl)-1H-inden-1-ide (1.780 g, 7.134 mmol) in diethyl ether (20 mL) was added. The reaction was stirred at room temperature for 16 hours. Volatiles were removed under a stream of nitrogen and then under high vacuum. The residue was extracted with pentane (2×20 mL) and filtered over Celite. The combined pentane extracts were concentrated under a stream of nitrogen and then under high vacuum to afford the product as a yellow oil (2.074 g).

(3-(2-ethylhexyl)-1H-inden-1-yl)dimethylsilyl trifluoromethanesulfonate: To a stirring solution of chloro(3-(2-ethylhexyl)-1H-inden-1-yl)dimethylsilane (2.074 g, 6.462 mmol) in toluene (10 mL), silver (I) trifluoromethane sulfonate (1.661 g, 6.465 mmol, 1 eq.) was added. The reaction was stirred at room temperature for 48 minutes. The reaction was filtered over Celite, extracting with additional toluene (10 mL). The combined toluene extracts were concentrated under high vacuum at 35° C. to afford the product as a brown oil (1.874 g).

(3-(2-ethylhexyl)-1H-inden-1-yl)dimethyl(3-methyl-1H-inden-1-yl)silane: To a stirring solution of lithium 1-methylindenide (0.649 g, 4.768 mmol, 1.1 eq.) in diethyl ether (30 mL), a solution of (3-(2-ethylhexyl)-1H-inden-1-yl) dimethylsilyl trifluoromethanesulfonate (1.874 g, 4.312 mmol) in diethyl ether (40 mL) was added. The reaction was stirred at room temperature for 6 hours. Volatiles were removed under a stream of nitrogen and then under high vacuum. The residue was extracted with pentane and filtered over Celite. The pentane extract was concentrated under a stream of nitrogen and then under high vacuum to afford the product as an orange oil (1.664 g).

Lithium 1-(dimethyl(3-methyl-1H-inden-1-id-1-yl)silyl)-3-(2-ethylhexyl)-1H-inden-1-ide: To a stirring solution of (3-(2-ethylhexyl)-1H-inden-1-yl)dimethyl(3-methyl-1H-inden-1-yl)silane (1.664 g, 4.012 mmol) in diethyl ether (20 mL), n-butyllithium (2.67M in hexanes) was added. The reaction was stirred at room temperature for 127 minutes. Volatiles were removed under a stream of nitrogen and then under high vacuum to afford the product, used without further purification (yield reported in two steps through complex).

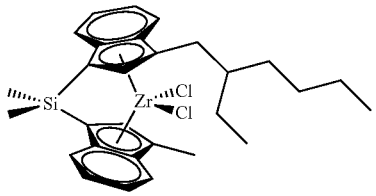

Dimethylsilyl (3-(2-ethyl-hexyl)-indenyl) (3-methyl-indenyl) zirconium dichloride (MCN9): To a stirring solution of lithium 1-(dimethyl(3-methyl-1H-inden-1-id-1-yl)silyl)-3-(2-ethylhexyl)-1H-inden-1-ide (see above) in diethyl ether (40 mL), zirconium (IV) chloride (0.935 g, 4.013 mmol, 1 eq.) was added with diethyl ether (20 mL). The reaction was stirred at room temperature for 18.5 hours. Volatiles were removed under a stream of nitrogen and then under high vacuum. The residue was extracted with dichloromethane (2×20 mL) and filtered over Celite. The combined dichloromethane extracts were concentrated under a stream of nitrogen and then under high vacuum to give a red-orange solid. The solid was washed with pentane (20 mL) and concentrated under high vacuum to afford the product as an orange solid (1.242 g, 53% over 2 steps as a mixture of four diastereomers). $^1$H NMR (400 MHz, $CD_2Cl_2$): δ 7.59-6.83 (m, 32H); 5.76-5.53 (m, 8H), 2.94-2.43 (m, 8H), 2.41-2.28 (m, 12H), 1.58-1.40 (m, 4H), 1.40-0.70 (m, 80H).

General Supportation Procedure

SMAO, also referred to as SMAO-ES70-875: Methylalumoxane treated silica was prepared in a manner similar to the following:

In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

ES-70-875 silica is ES70™ silica (PQ Corporation, Conshohocken, Pa.) that has been calcined at approximately 875° C. Typically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

For each sample, the desired amount of catalyst (40 µmol catalyst/g SMAO) was transferred to a 20 mL glass vial. Then, toluene (about 3 g) was added. Finally, SMAO (0.5 g) was added. The contents of the vial were mixed (60-90 minutes) on a shaker. The contents of the vial were allowed to settle. The supernatant was decanted into solvent waste. If necessary, the remnants of each vial were stored in a freezer (−35° C.) until needed.

The vials were uncapped and loaded into the sample trays in a SpeedVac. The SpeedVac was set to run at 45° C. for 45 min at 0.1 vacuum setting. Once complete, the vials were removed, and the powder contents of each vial were poured into a separate pre-weighed 4 mL vial. The vials were capped, sealed with electrical tape, and stored in the dry box freezer for future use.

Catalyst B (comparative) was a DAVISON 948 silica supported catalyst made in a manner analogous to that described in U.S. Pat. No. 6,180,736 using MCN2.

Polymerization Examples 1-9

Polymerization examples 1-9 were homopolymerizations or ethylene/1-hexene copolymerizations carried out in a small scale slurry batch reactor using 0.3 mg of supported catalyst. In each of Examples 1-9 below, the indicated supported catalyst was tested in multiple polymerization runs using varying amounts of 1-hexene without hydrogen.

For each run of Examples 1 through 9, the volume of 1-hexene used, the polymerization time (in seconds), the polymer yield (grams), and the catalyst activity (grams of polymer/grams catalyst·hr) are set forth below in Table 3. For the polymer produced in each of these runs, the following polymer properties were determined: DSC melting point (Tm, ° C.), C6 content (weight %), and gel permeation chromatography (GPC) measurements of weight average molecular weight (Mw), number average molecular weight (Mn), and polydispersity index (PDI=Mw/Mn). These data are set forth in Table 4.

TABLE 3

Polymerization Run Data for Examples 1-9

| Example | Catalyst | Run | 1-Hexene (µL) | Time (s) | Yield (g) | Activity (g/g · h) |
|---|---|---|---|---|---|---|
| 1 | A | 1-1 | 0 | 974 | 0.0942 | 1163 |
|  | A | 1-2 | 60 | 429 | 0.0988 | 2772 |
|  | A | 1-3 | 180 | 390 | 0.1018 | 3138 |
|  | A | 1-4 | 240 | 516 | 0.1001 | 2335 |
|  | A | 1-5 | 300 | 711 | 0.1020 | 1726 |
|  | A | 1-6 | 360 | 820 | 0.1022 | 1500 |
| 2 (comparative) | B | 2-1 | 0 | 2498 | 0.0887 | 427 |
|  | B | 2-2 | 60 | 1386 | 0.0928 | 805 |
|  | B | 2-3 | 60 | 1332 | 0.0905 | 817 |
|  | B | 2-4 | 180 | 1001 | 0.0963 | 1157 |
|  | B | 2-5 | 180 | 927 | 0.0975 | 1265 |
|  | B | 2-6 | 240 | 871 | 0.0961 | 1327 |
| 3 (comparative) | C | 3-1 | 0 | 785 | 0.0942 | 1443 |
|  | C | 3-2 | 60 | 301 | 0.1057 | 4224 |
|  | C | 3-3 | 60 | 276 | 0.1066 | 4639 |
|  | C | 3-4 | 180 | 472 | 0.1034 | 2635 |
|  | C | 3-5 | 180 | 449 | 0.1019 | 2730 |
|  | C | 3-6 | 240 | 533 | 0.1082 | 2440 |
| 4 (comparative) | D | 4-1 | 0 | 2435 | 0.0916 | 452 |
|  | D | 4-2 | 60 | 1458 | 0.0913 | 753 |
|  | D | 4-3 | 60 | 1370 | 0.0894 | 785 |
|  | D | 4-4 | 180 | 968 | 0.0933 | 1159 |
|  | D | 4-5 | 180 | 951 | 0.094 | 1189 |
|  | D | 4-6 | 240 | 901 | 0.0957 | 1277 |
| 5 (comparative) | E | 5-1 | 0 | 804 | 0.0857 | 1282 |
|  | E | 5-2 | 60 | 614 | 0.0912 | 1785 |
|  | E | 5-3 | 60 | 639 | 0.0946 | 1781 |
|  | E | 5-4 | 180 | 305 | 0.1008 | 3980 |
| 6 (comparative)* | B | 6-1 | 0 | 2286 | 0.0931 | 490 |
|  | B | 6-2 | 60 | 1336 | 0.0959 | 863 |
|  | B | 6-3 | 180 | 834 | 0.093 | 1341 |
|  | B | 6-4 | 240 | 853 | 0.0982 | 1384 |
|  | B | 6-5 | 300 | 1024 | 0.098 | 1151 |
|  | B | 6-6 | 360 | 1201 | 0.0992 | 993 |
| 7 | F | 7-1 | 0 | 820 | 0.0899 | 1319 |
|  | F | 7-2 | 60 | 457 | 0.0959 | 2525 |
|  | F | 7-3 | 180 | 339 | 0.0940 | 3335 |
|  | F | 7-4 | 240 | 347 | 0.1000 | 3470 |
|  | F | 7-5 | 300 | 528 | 0.1019 | 2320 |
|  | F | 7-6 | 360 | 418 | 0.1033 | 2969 |
| 8 | G | 8-1 | 0 | 1195 | 0.085 | 855 |
|  | G | 8-2 | 60 | 530 | 0.0943 | 2140 |
|  | G | 8-3 | 180 | 244 | 0.0999 | 4931 |
|  | G | 8-4 | 240 | 257 | 0.1027 | 4807 |
|  | G | 8-5 | 300 | 263 | 0.1037 | 4748 |
|  | G | 8-6 | 360 | 320 | 0.1026 | 3859 |
| 9 | H | 9-1 | 0 | 1130 | 0.093 | 989 |
|  | H | 9-2 | 60 | 759 | 0.0938 | 1487 |
|  | H | 9-3 | 180 | 1004 | 0.0624 | 747 |
|  | H | 9-4 | 0 | 1094 | 0.0928 | 1020 |
|  | H | 9-5 | 60 | 695 | 0.0977 | 1691 |
|  | H | 9-6 | 180 | 726 | 0.0794 | 1316 |
| 10 | I | 10-1 | 0 | 771 | 0.0883 | 1377 |
|  | I | 10-2 | 60 | 299 | 0.1023 | 4119 |
|  | I | 10-3 | 120 | 257 | 0.1067 | 4992 |
|  | I | 10-4 | 150 | 257 | 0.1039 | 4863 |
|  | I | 10-5 | 180 | 256 | 0.0999 | 4685 |
|  | I | 10-6 | 210 | 342 | 0.1018 | 3583 |

*Additional comparative run using Catalyst B.

TABLE 4

Polymer Properties for Examples 1-9

| Example | Catalyst | Run | Tm (° C.) | $C_6$ (wt %) | Average $C_6$ (wt %)† | Mw* | Mn* | PDI* |
|---|---|---|---|---|---|---|---|---|
| 1 | A | 1-1 | 132.7 | 0.0 | — | 165897 | 31034 | 5.3 |
|  | A | 1-2 | 124.9 | 2.2 | — | 178020 | 30781 | 5.8 |
|  | A | 1-3 | 118.1 | 5.6 | — | 174764 | 26580 | 6.6 |
|  | A | 1-4 | 115.6 | 7.6 | — | 175165 | 18038 | 9.7 |
|  | A | 1-5 | 113.8 | 8.2 | — | 165347 | 21642 | 7.6 |
|  | A | 1-6 | 111.2 | 11.2 | — | 138355 | 14410 | 9.6 |
| 2 (comparative) | B | 2-1 | 136.4 | 0.0 | — | 595381 | 264421 | 2.3 |
|  | B | 2-2 | 125.4 | 2.1 | 2.2 | 482338 | 223939 | 2.2 |
|  | B | 2-3 | 125.6 | 2.4 | — | 462870 | 218017 | 2.1 |
|  | B | 2-4 | 117.9 | 5.6 | 5.6 | 505142 | 252255 | 2.0 |
|  | B | 2-5 | 117.9 | 5.7 | — | 546395 | 289367 | 1.9 |
|  | B | 2-6 | 115.8 | 6.8 | — | 588707 | 305332 | 1.9 |
| 3 (comparative) | C | 3-1 | 133.7 | 0.0 | — | 161194 | 82837 | 1.9 |
|  | C | 3-2 | 121.3 | 3.3 | 3.3 | 149610 | 79338 | 1.9 |
|  | C | 3-3 | 121.1 | 3.2 | — | 130375 | 59663 | 2.2 |
|  | C | 3-4 | 112.8 | 9.5 | 9.4 | 126041 | 52874 | 2.4 |
|  | C | 3-5 | 112.9 | 9.4 | — | 123863 | 54029 | 2.3 |
|  | C | 3-6 | 110.0 | 12.3 | — | 114236 | 43517 | 2.6 |
| 4 (comparative) | D | 4-1 | 134.5 | 0.0 | — | 213627 | 117432 | 1.8 |
|  | D | 4-2 | 126.4 | 0.8 | 0.7 | 201422 | 113941 | 1.8 |
|  | D | 4-3 | 126.4 | 0.5 | — | 195865 | 105193 | 1.9 |
|  | D | 4-4 | 119.5 | 4.1 | 4.3 | 212784 | 117234 | 1.8 |
|  | D | 4-5 | 119.7 | 4.5 | — | 216682 | 123496 | 1.8 |
|  | D | 4-6 | 118.0 | 5.5 | — | 212994 | 112489 | 1.9 |
| 5 (comparative) | E | 5-1 | 136.2 | 0.0 | — | 731028 | 324702 | 2.3 |
|  | E | 5-2 | 124.5 | 2.0 | 1.8 | 688610 | 275394 | 2.5 |
|  | E | 5-3 | 124.2 | 1.6 | — | 625363 | 281296 | 2.2 |
|  | E | 5-4 | 118.9 | 3.3 | — | 834890 | 401967 | 2.1 |
| 6 (comparative)** | B | 6-1 | 135.5 | 0.0 | — | 582120 | 249816 | 2.3 |
|  | B | 6-2 | 125.0 | 2.3 | — | 445402 | 224890 | 2.0 |

TABLE 4-continued

Polymer Properties for Examples 1-9

| Example | Catalyst | Run | Tm (° C.) | $C_6$ (wt %) | Average $C_6$ (wt %)† | Mw* | Mn* | PDI* |
|---|---|---|---|---|---|---|---|---|
| | B | 6-3 | 116.9 | 5.2 | — | 503049 | 270886 | 1.9 |
| | B | 6-4 | 114.7 | 6.5 | — | 511683 | 284654 | 1.8 |
| | B | 6-5 | 112.9 | 7.7 | — | 532890 | 300264 | 1.8 |
| | B | 6-6 | 111.4 | 7.3 | — | 567381 | 300355 | 1.9 |
| 7 | F | 7-1 | 131.6 | 0.0 | — | 177517 | 28974 | 6.1 |
| | F | 7-2 | 125.1 | 3.5 | — | 218777 | 22678 | 9.6 |
| | F | 7-3 | 119.2 | 5.8 | — | 151261 | 12742 | 11.9 |
| | F | 7-4 | 117.5 | 7.9 | — | 137520 | 15919 | 8.6 |
| | F | 7-5 | 116.8 | 9.3 | — | 140374 | 17962 | 7.8 |
| | F | 7-6 | 113.3 | 12.5 | — | 114691 | 11718 | 9.8 |
| 8 | G | 8-1 | 133.5 | 0.0 | — | 199637 | 45488 | 4.4 |
| | G | 8-2 | 124.7 | 2.3 | — | 246286 | 52991 | 4.6 |
| | G | 8-3 | 118.7 | 4.5 | — | 248897 | 43364 | 5.7 |
| | G | 8-4 | 116.1 | 4.9 | — | 238290 | 43453 | 5.5 |
| | G | 8-5 | 114.6 | 7.4 | — | 219933 | 41638 | 5.3 |
| | G | 8-6 | 111.3 | 9.5 | — | 194910 | 42222 | 4.6 |
| 9 | H | 9-1 | 133.1 | 0.0 | — | 162256 | 32821 | 4.9 |
| | H | 9-2 | 125.5 | 4.7 | — | 138635 | 21233 | 6.5 |
| | H | 9-3 | 120.7 | 6.6 | — | 135954 | 19820 | 6.9 |
| | H | 9-4 | 133.3 | 0.0 | — | 167975 | 31293 | 5.4 |
| | H | 9-5 | 125.4 | 3.7 | — | 146504 | 24481 | 6.0 |
| | H | 9-6 | 119.7 | 5.8 | — | 138406 | 24613 | 5.6 |
| 10 | I | 10-1 | 135.1 | 0.0 | — | 222026 | 96501 | 2.3 |
| | I | 10-2 | 125.2 | 2.6 | — | 199647 | 93538 | 2.1 |
| | I | 10-3 | 121.1 | 5.1 | — | 191398 | 58282 | 3.3 |
| | I | 10-4 | 119.1 | 5.8 | — | 197124 | 60344 | 3.3 |
| | I | 10-5 | 118.6 | 6.3 | — | 194300 | 64766 | 3.0 |
| | I | 10-6 | 117.1 | 7.5 | — | 207724 | 63849 | 3.3 |

†Average $C_6$ wt. % refers to the average result of two polymerization runs using the same 1-hexene feed.
*Mw, Mn, and PDI values in Table 4 were determined using the Rapid GPC method.
**Additional comparative run using Catalyst B.

Polymerization Example 11

Figure 2:
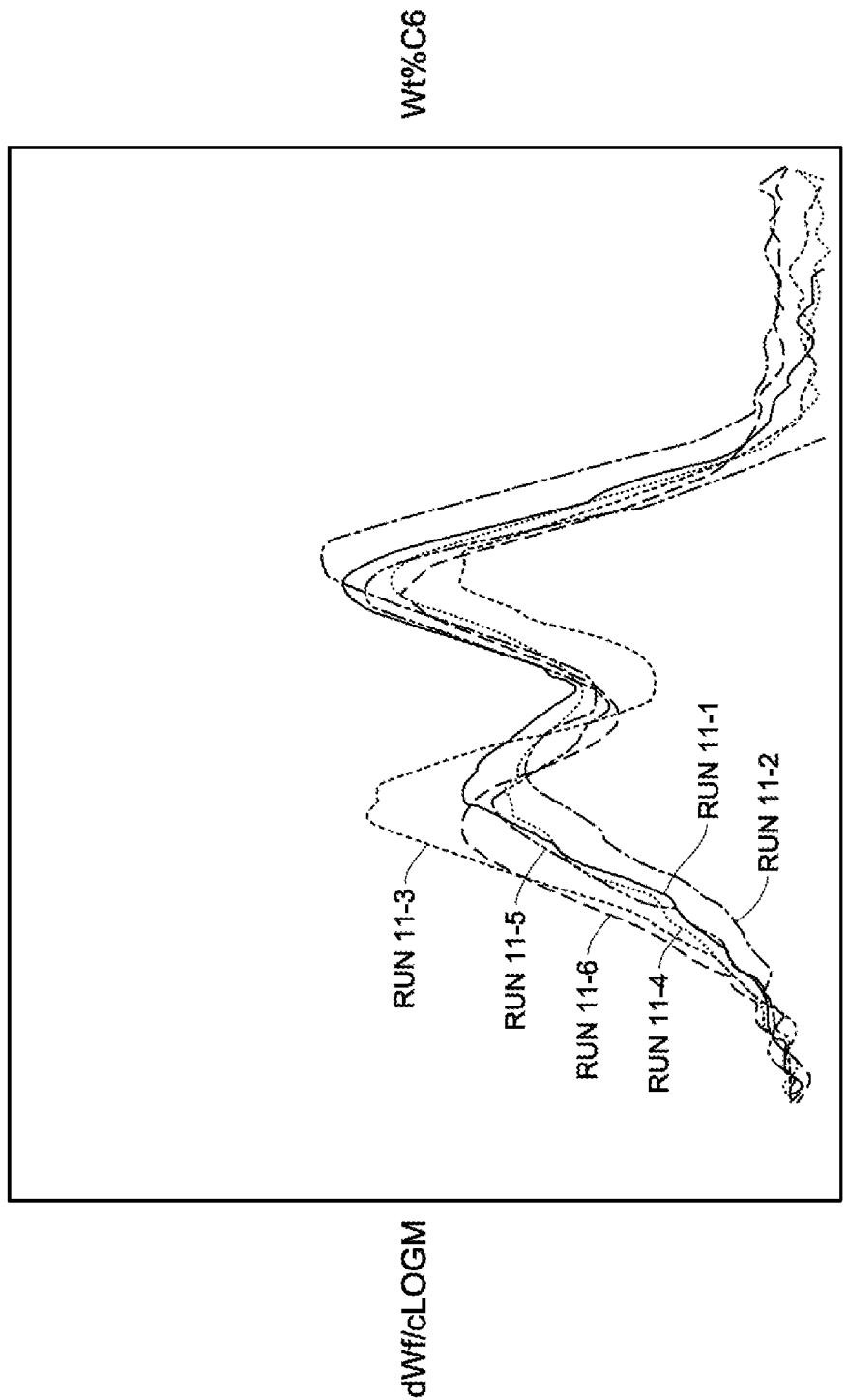
FIG. 2 is an overlay of GPC traces for the polymers produced in Example 11.

In Example 11, multiple ethylene/1-hexene copolymerization runs with Catalyst A were made at two different polymerization temperatures in the presence of hydrogen (using 300 ppm $H_2$/ethylene custom gas). The polymers produced in each run were analyzed for Mw and PDI using Rapid GPC. The polymerization temperature, 1-hexene feed amount, weight average molecular weight, and PDI for the polymers produced are summarized in Table 5 for each run. Rapid GPC traces corresponding to the polymer produced in each run are shown in FIG. 2.

TABLE 5

Run Conditions and Rapid GPC Results for Example 11

| Example | Catalyst | Run | Temp (° C.) | 1-Hexene (µL) | Mw | PDI |
|---|---|---|---|---|---|---|
| 11 | A | 11-1 | 85 | 35 | 152900 | 9.8 |
| | A | 11-2 | 85 | 85 | 225800 | 8.3 |
| | A | 11-3 | 85 | 150 | 130300 | 12.4 |
| | A | 11-4 | 72 | 60 | 143300 | 11.2 |
| | A | 11-5 | 72 | 140 | 137800 | 8.3 |
| | A | 11-6 | 72 | 245 | 106200 | 13.4 |

As illustrated by Examples 1, 7-9, and comparative Examples 2-6, at similar levels of 1-hexene incorporation the polyethylenes produced by the inventive catalysts have significantly higher PDI values (i.e., broader MWD) than the polyethylenes produced by comparative Catalysts B, C, D, and E (see also plots for Example 1 and comparative Examples 2-6 in FIG. 1).

Comparative Example 3 shows that supported Catalyst C, which has a β-branched hydrocarbyl at the 3-position of one indenyl group, but only a hydrogen at the 3-position of the other indenyl group, produced a polyethylene with in general narrower MWD (PDI 1.9-2.6) and lower Mw (114,000-161,000) than that produced by inventive Catalyst I with a Me group at the 3-position of the other indenyl group (PDI 2.1-3.3, Mw 191,000-222,000) This difference illustrates the concept that catalyst compounds of the present disclosure, which have a β-branched hydrocarbyl for $R^3$ in combination with an alkyl group (as opposed to hydrogen) for $R^{3'}$ can produce ethylene/1-hexene copolymers having a higher Mw and broader molecular weight distribution than those produced with an analogous catalyst compound not having both of these features. Also, when using 2-phenyl-propyl group (featuring a Ph and Me at the β-carbon center vs. Et and nBu in Catalyst C and I) as the β-branched hydrocarbyl group at the 3-position, the inventive catalysts A, F, and G can produce polyethylene with significantly broader MWD (PDI 5.3-9.7 for A, PDI 6.1-11.9 for F and PDI 4.4-5.7 for G), all under similar polymerization conditions.

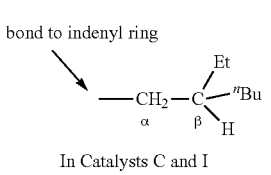

In Catalysts C and I

-continued

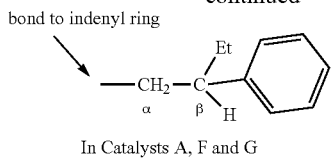

In Catalysts A, F and G

Example 11 shows that inventive Catalyst A can produce polyethylenes having broad, bimodal molecular weight distributions over a range of polymerization temperatures and 1-hexene feed amounts.

Polymerization Examples 12-14

Figure 3A:
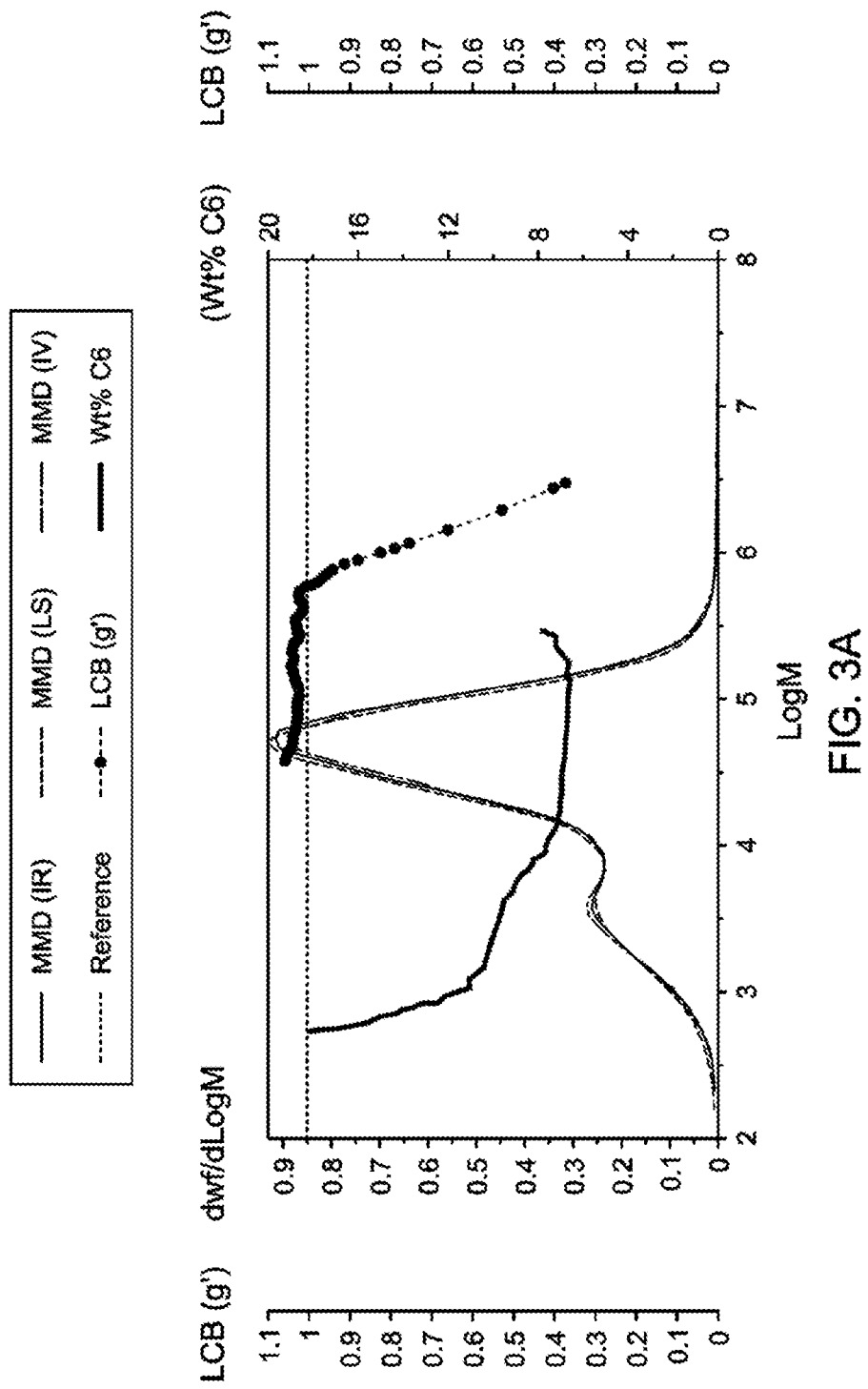
FIG. 3A is a graph showing GPC-4D data for the polyethylene prepared according to Example 12.
Figure 3B:
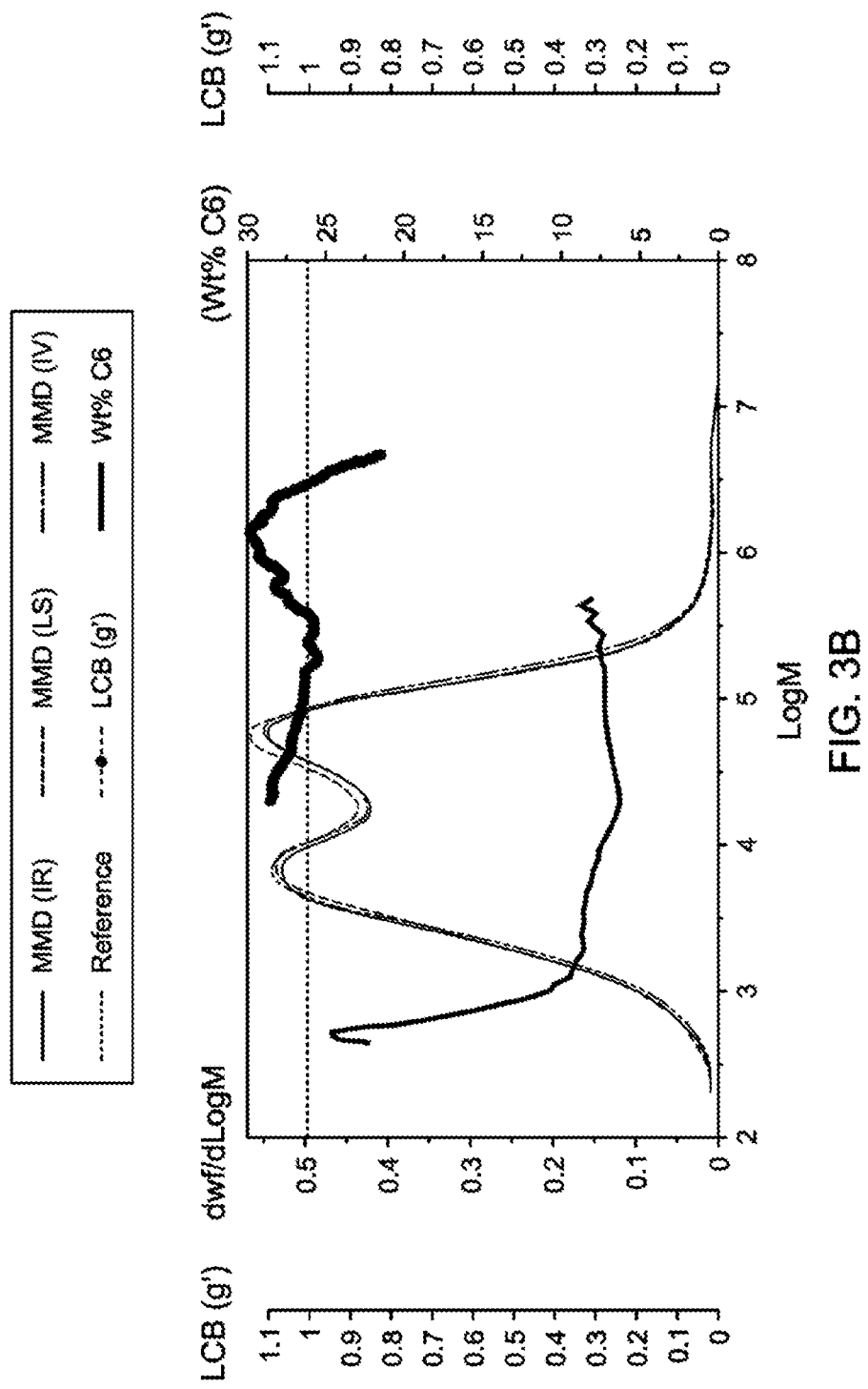
FIG. 3B is a graph showing GPC-4D data for the polyethylene prepared according to Example 13.
Figure 3C:
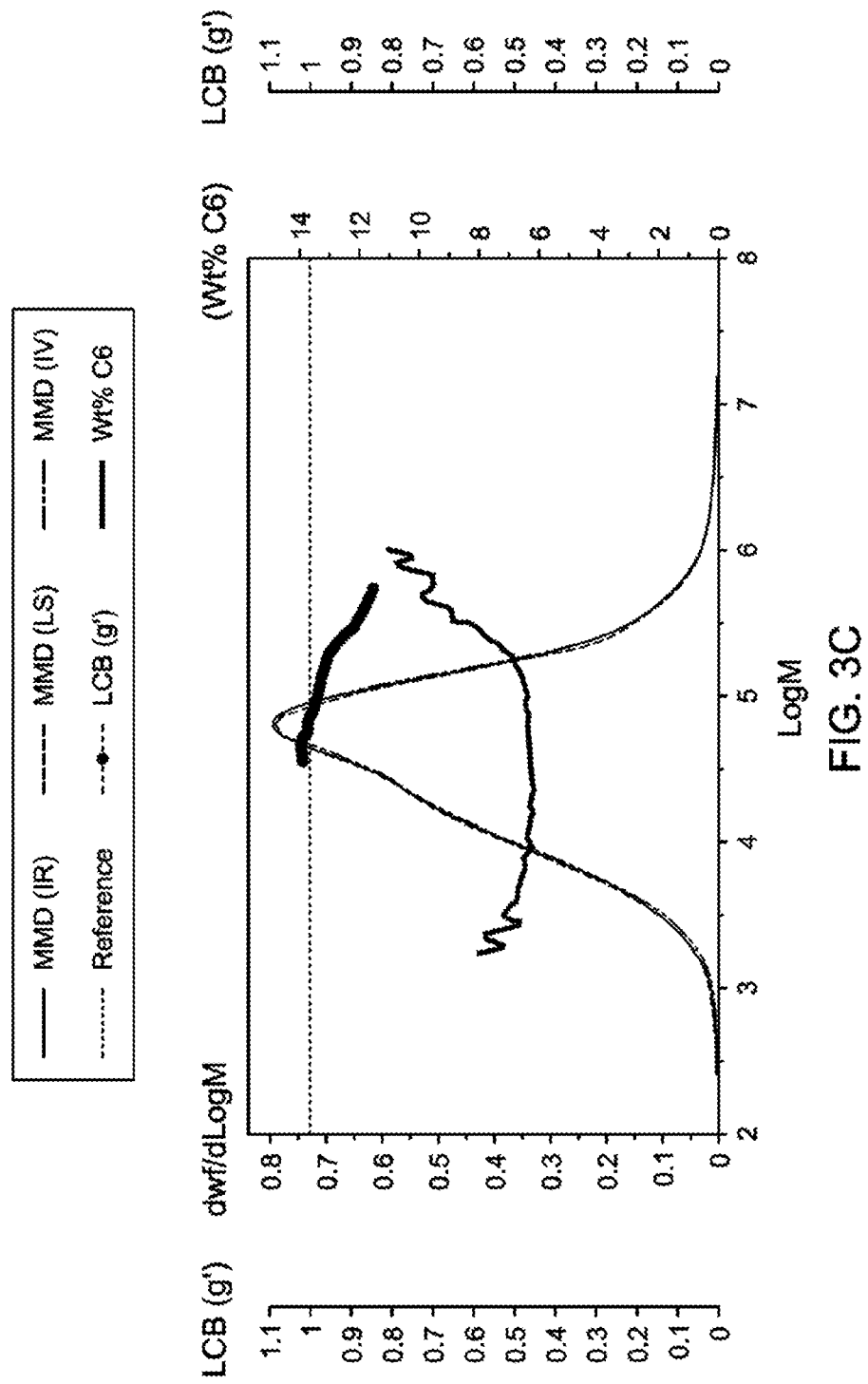
FIG. 3C is a graph showing GPC-4D data for the polyethylene prepared according to Example 14.

In Examples 12-14 polymerization runs were conducted in a lab-scale gas-phase reactor utilizing Catalyst A, F, or G. Polyethylenes having a broad or bimodal MWD were produced by all three catalysts. GPC-4D analysis was carried out on the polyethylenes produced by each catalyst. The results are set forth in Table 6 and their respective GPC-4D plots are shown in FIGS. 3A-C. Catalyst F produced polyethylenes having a broader MWD than Catalyst A under similar polymerization conditions. The polymers have $g'_{vis}$ values of 0.84, 0.94, and 0.92, all considerably lower than 1.0, indicative of the presence of long-chain branching. $^1$H NMR data for the produced polymers are set forth in Table 7 and show that Catalysts A, F, G yielded polymers with considerable levels of chain unsaturation (0.77-1.76 total unsaturation/1000 C).

Figure 4:
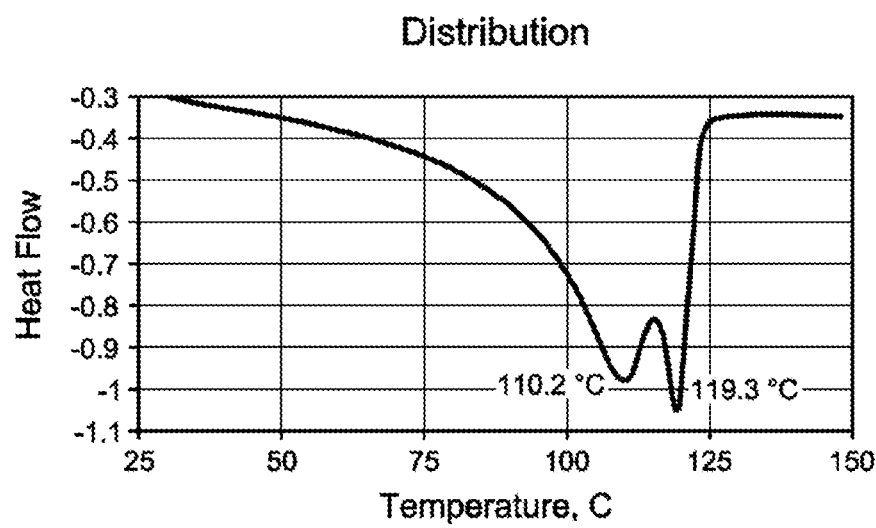
FIG. 4 is a graph showing DSC second melt of the polyethylene prepared according to Example 13.
Figure 5:
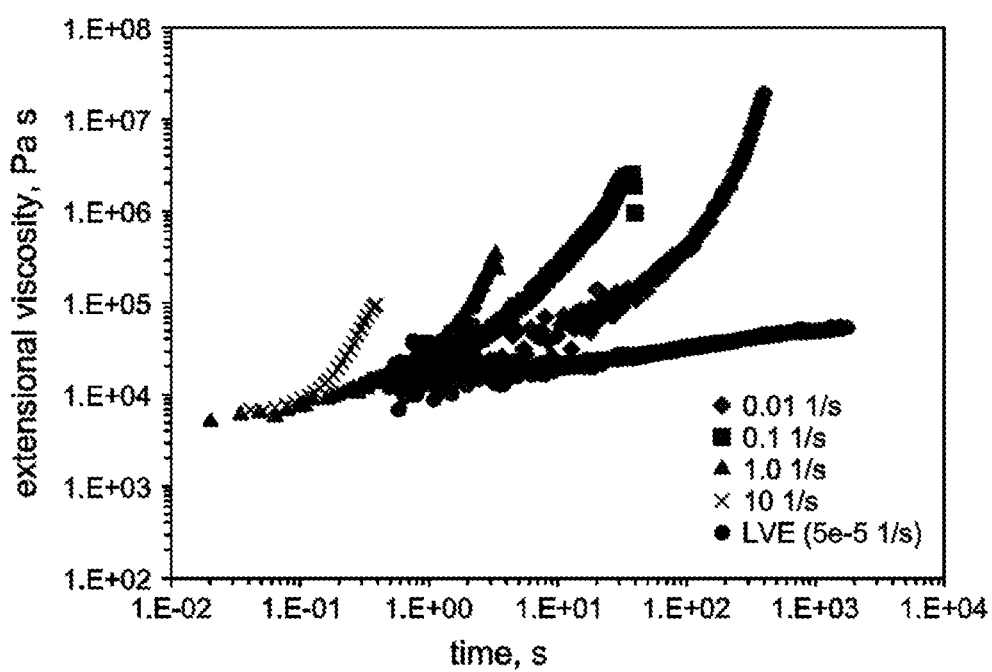
FIG. 5 is a graph showing Extensional rheology recorded at 130° C. for the polyethylene prepared according to Example 13.

The GPC-4D for the resin in Example 13 by Catalyst F is shown in FIG. 3B. One can describe the resin as having a bimodal (broad) MWD, and a small degree of long chain branching at very high molecular weight based on g'. This resin possesses an extraordinarily high $M_z$ (1.67×10$^6$ g/mol), and average hexene content (7.3 wt %) is consistent with a LLDPE product. The melting endotherm (second melt) is shown in FIG. 4. The extensional rheology is shown in FIG. 5. The resin exhibits exceptional strain hardening at all strain rates likely due to the very high value of $M_z$ coupled with indication of a small quantity long chain branching in the high molecular weight tail.

Figure 6:
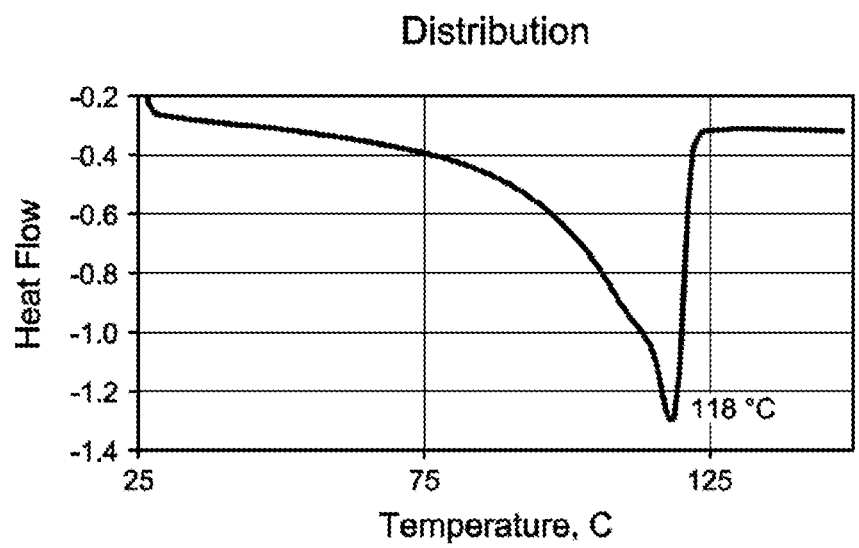
FIG. 6 is a graph showing DSC second melt of the polyethylene prepared according to Example 14.
Figure 7:
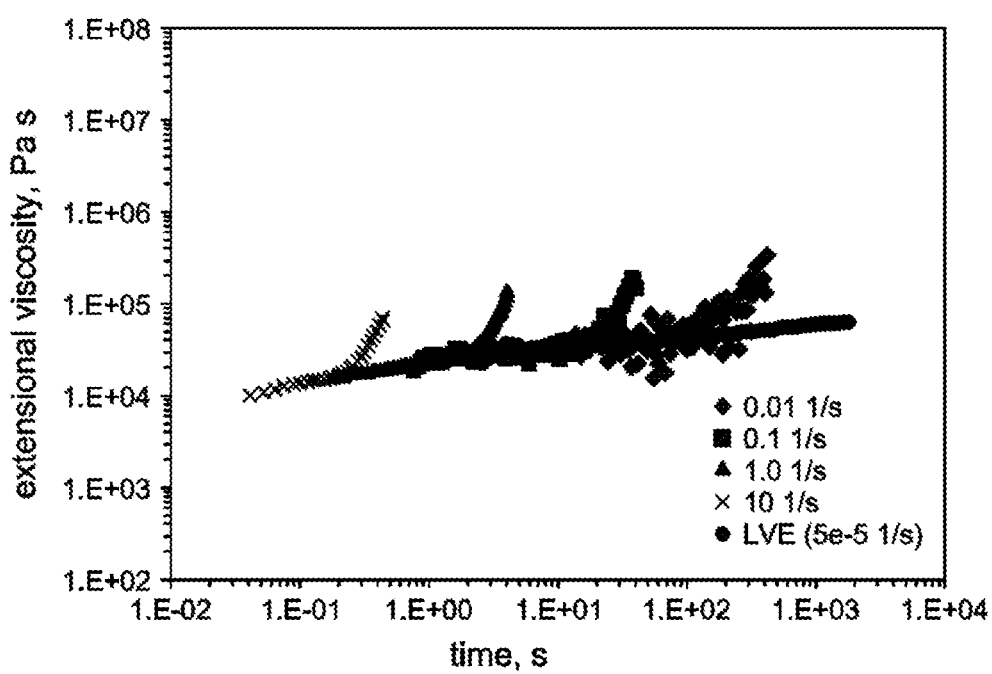
FIG. 7 is a graph showing Extensional rheology recorded at 130° C. for the polyethylene prepared according to Example 14.

The GPC-4D for the resin in Example 14 by Catalyst G in shown in FIG. 3C. One can describe the resin as having a broad MWD, a somewhat broad comonomer distribution with higher comonomer content in the high molecular weight tail, and a modest degree of long chain branching at high molecular weight based on g' (0.94). This resin possesses a large $M_z$ (~1×10$^6$ g/mol), albeit not as large as resin in Example 13. Average hexene content (6.9 wt %) is consistent with a LLDPE product. The melting endotherm (second melt) is shown in FIG. 6. The extensional rheology is shown in FIG. 7. The resin exhibits moderate strain hardening likely due to the combined impacts of high $M_z$ coupled with indication of long chain branching.

TABLE 6

GPC-4D Data for Polyethylenes Produced in Lab-Scale Gas-Phase Reactor at 85° C.

| Example | Catalyst | Condition | Cat (mg) | Yield (g) | Activity (g/g · h) | C$_6$ (wt. %, by GPC4D) | Mw (g/mol) | Mw/Mn | g'$_{vis}$ | T75-T25 (° C.) |
|---|---|---|---|---|---|---|---|---|---|---|
| 12 | A | 2 H2/C2 (ppm/mol); 0.02 C6/C2 (mol/mol) | 36.8 | 52.8 | 1435 | 7.4 | 68330 | 8.5 | 0.84 | 17.5 |
| 13 | F | 2 H2/C2 (ppm/mol); 0.02 C6/C2 (mol/mol) | 46.2 | 102.2 | 2212 | 7.3 | 69164 | 11.3 | 0.94 | 24.5 |
| 14 | G | No added H2; 0.016 C6/C2 (mol/mol) | 17 | 59.1 | 3476 | 6.9 | 101293 | 6.1 | 0.92 | 13.6 |

TABLE 7

$^1$H NMR Characterization of Polyethylenes Produced in Examples 12-14

| Example | Catalyst | Methyl/ 1000 C. | Vinylenes/ 1000 C. | Trisubstituted Olefins/1000 C. | Vinyls/ 1000 C. | Vinylidenes/ 1000 C. | Total Unsaturation/ 1000 C. |
|---|---|---|---|---|---|---|---|
| 12 | A | 14.7 | 0.07 | 0.28 | 0.42 | 0.53 | 1.30 |
| 13 | F | 16.5 | 0.05 | 0.25 | 0.66 | 0.8 | 1.76 |
| 14 | G | 12 | 0.21 | 0.21 | 0.34 | 0.01 | 0.77 |

All documents described herein are incorporated by reference herein for purposes of all jurisdictions where such practice is allowed, including any priority documents, related application and/or testing procedures, but only to the extent that such documents are not inconsistent with the text of the present disclosure. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including."

We claim:

1. A catalyst compound represented by Formula (I):

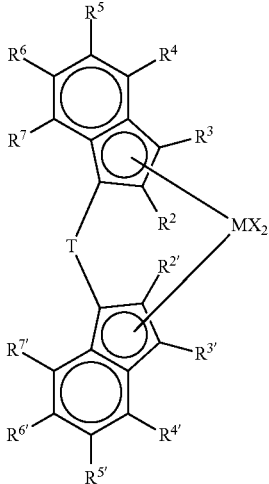

(I)

where M is a group 4 metal;

$R^3$ is a substituted or unsubstituted $C_4$-$C_{40}$ hydrocarbyl group, wherein the $C_4$-$C_{40}$ hydrocarbyl group is branched at the β-position;

$R^{3'}$ is either:

(1) methyl, ethyl, or a $C_3$-$C_{40}$ group having the formula —$CH_2CH_2R$ where R is an alkyl, aryl, or silyl group, or (2) a β-branched alkyl group represented by Formula (II):

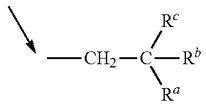

(II)

wherein each $R^a$, $R^b$, and $R^c$ is, independently, hydrogen, a $C_1$ to $C_{20}$ alkyl group, or a phenyl group, and each $R^a$, $R^b$, and $R^c$ is different from any other $R^a$, $R^b$, and $R^c$ such that the catalyst compound has a chiral center on the β-carbon of $R^{3'}$;

each of $R^2$, $R^4$, $R^5$, $R^6$, $R^7$, $R^{2'}$, $R^{4'}$, $R^{5'}$, $R^{6'}$, and $R^{7'}$ is independently hydrogen, a $C_1$-$C_{40}$ substituted or unsubstituted hydrocarbyl, halocarbyl, silylcarbyl, alkoxyl, halogen, or siloxyl, or one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring;

T is a bridging group, and each X is independently a halide or $C_1$-$C_{50}$ substituted or unsubstituted hydrocarbyl, hydride, amide, alkoxide, sulfide, phosphide, halide, or a combination thereof, or two of X are joined together to form a metallocycle ring, or two of X are joined to form a chelating ligand, a diene ligand, or an alkylidene.

2. The catalyst compound of claim 1, wherein $R^3$ is a $C_4$-$C_{40}$ branched hydrocarbyl group represented by Formula (III):

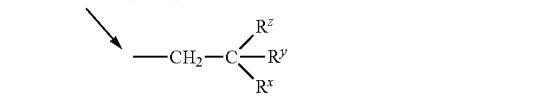

(III)

where each $R^z$ and $R^x$ is, independently, a $C_1$ to $C_{20}$ alkyl group or a phenyl group, and $R^y$ is hydrogen or a $C_1$ to $C_4$ alkyl group, preferably a $C_1$ to $C_2$ alkyl group.

3. The catalyst compound of claim 1, wherein T represents the formula $(R^8)_2J$ or $(R^8)J_2$, where each J is independently selected from C, Si, or Ge, and each $R^8$ is independently hydrogen, halogen, a $C_1$ to $C_{40}$ hydrocarbyl or a $C_1$ to $C_{40}$ substituted hydrocarbyl group, and two $R^8$ optionally form a cyclic structure including completely saturated, partially saturated, aromatic, or fused ring systems.

4. The catalyst compound of claim 2, wherein $R^y$ is hydrogen.

5. The catalyst compound of claim 1, wherein $R^{3'}$ is a β-branched alkyl group represented by Formula (II), $R^a$ is methyl, $R^b$ is hydrogen, and $R^c$ is phenyl.

6. The catalyst compound of claim 2, wherein each $R^x$, $R^y$, and $R^z$ is different from any other $R^x$, $R^y$, and $R^z$ such that the catalyst compound has a chiral center on $R^3$.

7. The catalyst compound of claim 2, wherein $R^z$ is methyl and $R^x$ is phenyl.

8. The catalyst compound of claim 1, wherein one or more of $R^4$ and $R^5$, $R^5$ and $R^6$, $R^6$ and $R^7$, $R^{4'}$ and $R^{5'}$, $R^{5'}$ and $R^{6'}$, and $R^{6'}$ and $R^{7'}$ are joined to form a completely saturated, partially saturated, or aromatic ring.

9. The catalyst compound of claim 8, wherein $R^5$ and $R^6$ are joined to form a partially saturated 5-membered ring.

10. The catalyst compound of claim 2, wherein $R^{3'}$ is methyl, $R^z$ is methyl, and $R^x$ is phenyl.

11. The catalyst compound of claim 1, wherein each of $R^2$, $R^4$, $R^5$, $R^6$, $R^7$, $R^{2'}$, $R^{4'}$, $R^{5'}$, $R^{6'}$, and $R^{7'}$ is hydrogen.

12. The catalyst compound of claim 1, wherein J is Si and $R^8$ is a $C_1$ to $C_{40}$ hydrocarbyl or a $C_1$ to $C_{40}$ substituted hydrocarbyl group.

13. The catalyst compound of claim 1, wherein each $R^8$ is a methyl group.

14. The catalyst compound of claim 1, wherein M is Zr.

15. The catalyst compound of claim 1, wherein each X is a halide.

16. The catalyst compound of claim 1, wherein each X is chloride.

17. The catalyst compound of claim 1, wherein the catalyst compound represented by Formula (I) corresponds to any one of the following structures:

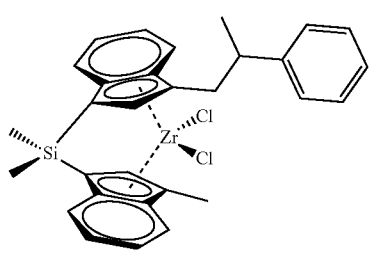

1

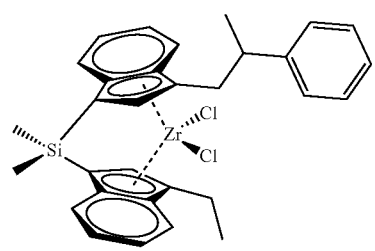
2
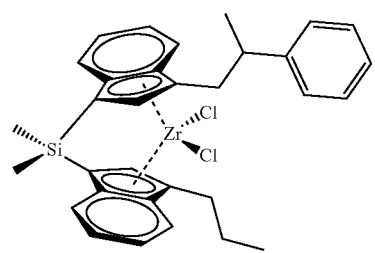
3
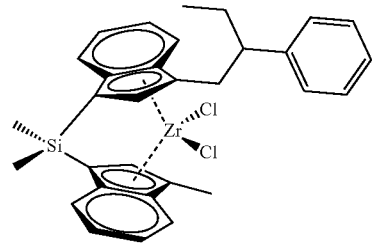
4
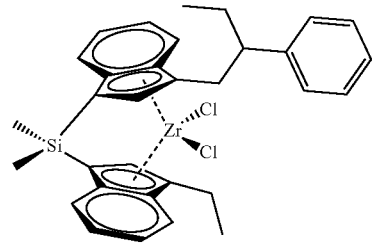
5
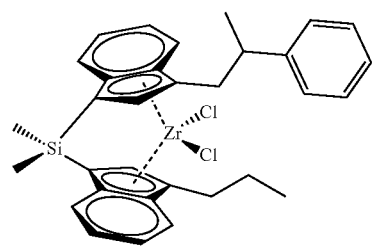
6
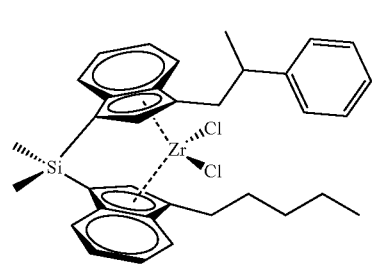
7
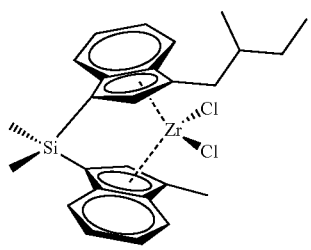
8
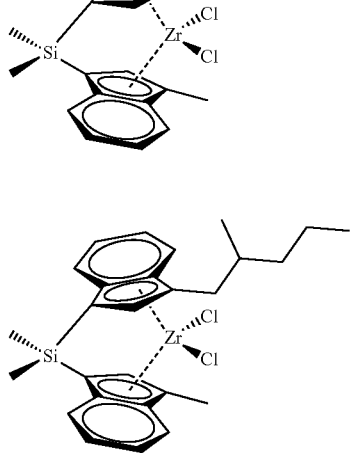
9
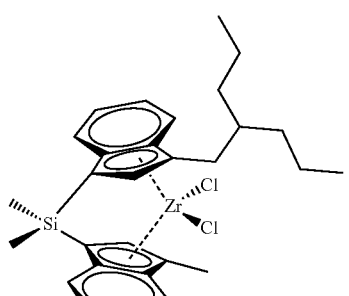
10
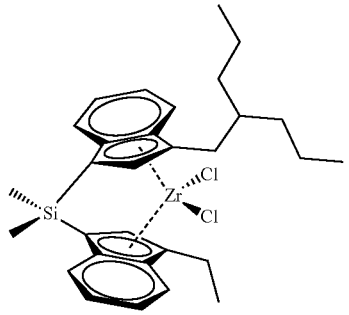
11
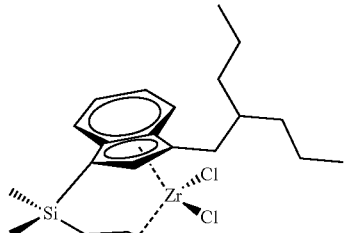
12

13
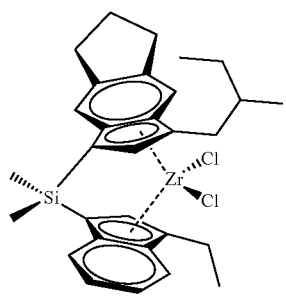
14
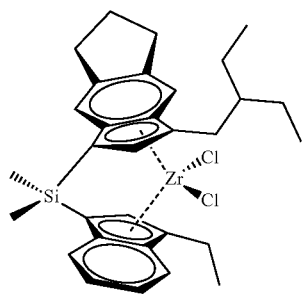
15
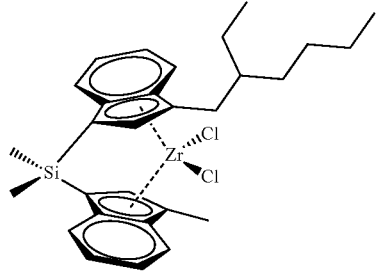
16
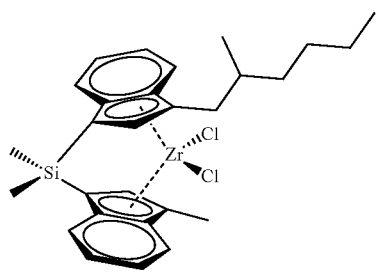
17
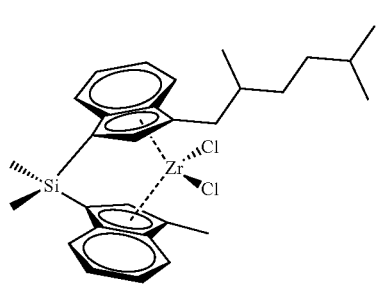
18
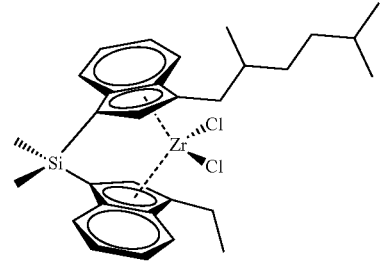
19
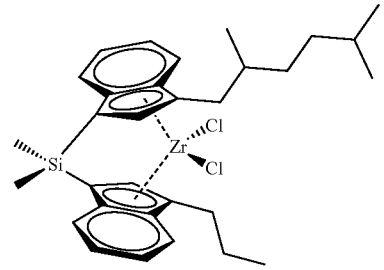
20
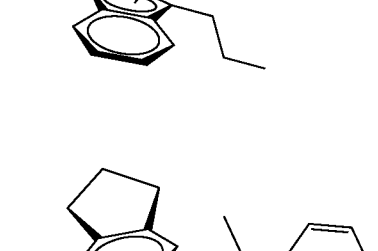
21
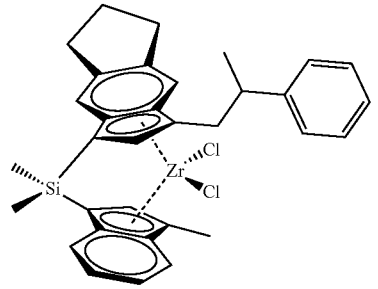
22
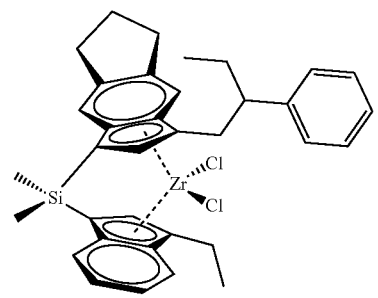

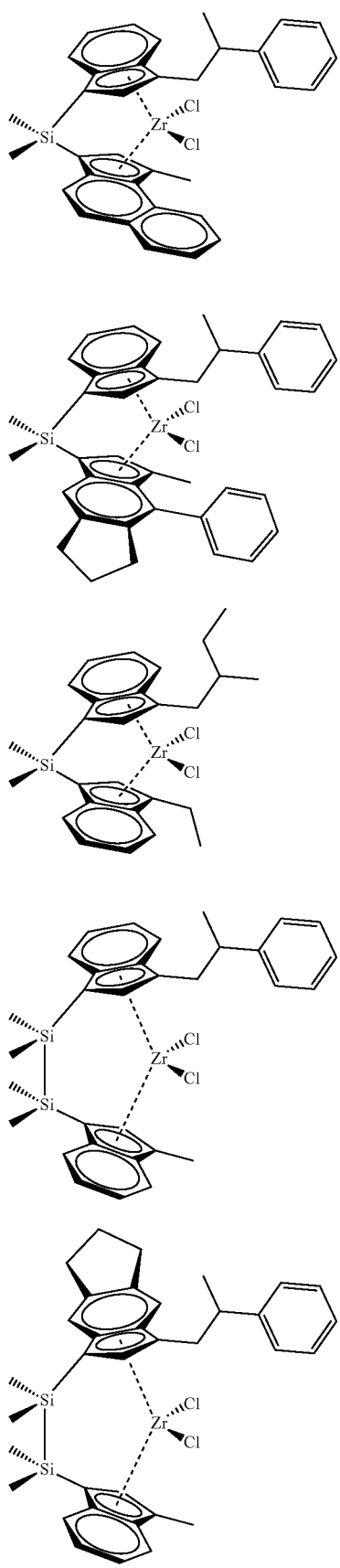

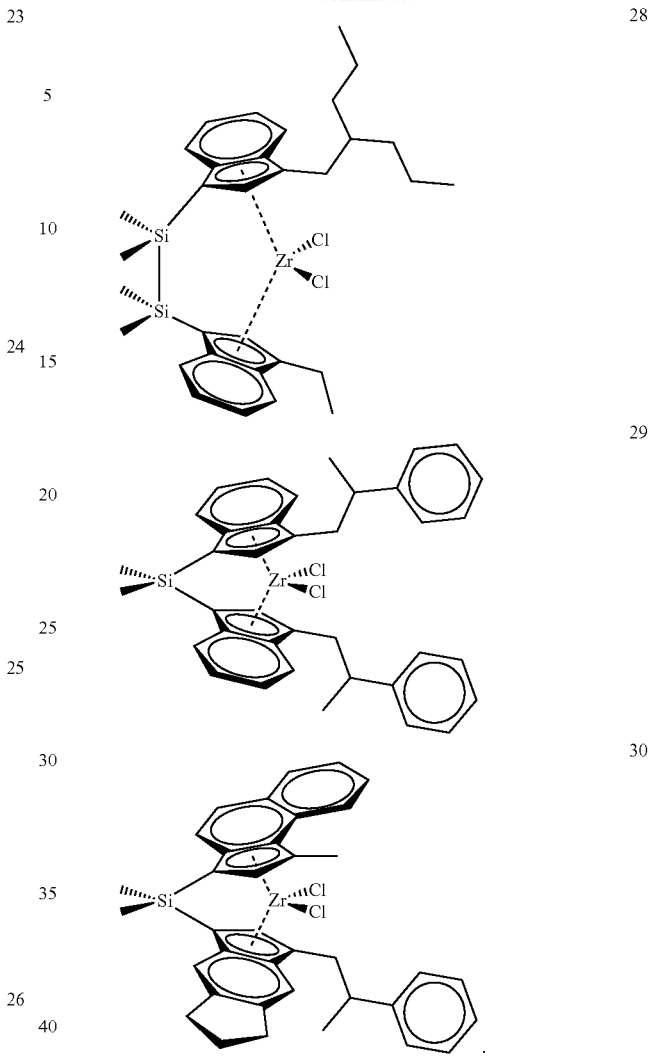

18. A catalyst system comprising an activator and the catalyst compound of claim 1.

19. A catalyst system according to claim 18, wherein the catalyst system utilizes a single catalyst compound.

20. The catalyst system of claim 18, wherein the catalyst system comprises a support material.

21. The catalyst system of claim 20, wherein said support material is silica.

22. The catalyst system of claim 18, wherein the activator comprises one or more of alumoxanes, aluminum alkyls, and ionizing activators.

23. A method of polymerizing olefins to produce at least one polyolefin composition, the method comprising:
   contacting at least one olefin with the catalyst system of claim 18; and
   obtaining a polyolefin.

24. A method of polymerizing olefins to produce at least one polyolefin composition, the method comprising:
   contacting two or more different olefins with the catalyst system of claim 18; and
   obtaining a polyolefin.

25. The method of claim 23, wherein said at least one olefin is ethylene.

26. The method of claim 24, wherein said two or more olefins are ethylene and 1-hexene.

27. The method of claim 23, wherein said polyolefin has a bimodal molecular weight distribution.

28. The method of claim 23, wherein said polyolefin has an MW/Mn of from about 5.0 to about 13.0.

29. The method of claim 23, wherein said polyolefin has an Mw/Mn of from about 8.0 to about 13.0.

30. The method of claim 23, wherein said polyolefin is linear low density polyethylene.

31. The method of claim 23, wherein said polyolefin has a total unsaturation/1000 C greater than 0.7.

32. The method of claim 23, wherein said polyolefin has a weight average molecular weight of 50,000 g/mol or higher.

33. The method of claim 23, wherein said method is carried out in a gas phase or slurry process.

34. The method of claim 23, wherein the method further comprises forming the polyolefin into a mono- or multi-layer blown, cast, extruded, or shrink film.

35. The method of claim 23, wherein the method further comprises forming the polyolefin into an injection or blow molded article.

36. A catalyst system comprising an activator and the catalyst compound of claim 2.

37. A catalyst system comprising an activator and the catalyst compound of claim 17.

38. The catalyst system of claim 36, wherein the activator comprises one or more of alumoxanes, aluminum alkyls, and ionizing activators.

39. The catalyst system of claim 37, wherein the activator comprises one or more of alumoxanes, aluminum alkyls, and ionizing activators.

40. The method of claim 30, wherein the linear low density polyethylene is formed into a biaxially oriented film.

41. The method of claim 23, wherein the method further comprises forming the polyolefin into a biaxially oriented film wherein said polyolefin is linear low density polyethylene.

* * * * *